United States Patent
Orii

(10) Patent No.: US 8,255,442 B2
(45) Date of Patent: Aug. 28, 2012

(54) PARALLEL EFFICIENCY CALCULATION METHOD AND APPARATUS

(75) Inventor: Shigeo Orii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 408 days.

(21) Appl. No.: 12/508,760

(22) Filed: Jul. 24, 2009

(65) Prior Publication Data

US 2009/0287753 A1 Nov. 19, 2009

Related U.S. Application Data

(62) Division of application No. 10/619,462, filed on Jul. 16, 2003, now Pat. No. 7,587,437.

(30) Foreign Application Priority Data

Jul. 22, 2002 (JP) ................................. 2002-212387

(51) Int. Cl.
*G06F 15/00* (2006.01)
*G06F 11/30* (2006.01)
(52) U.S. Cl. ........................................ 708/200; 702/182
(58) Field of Classification Search .................. 708/200; 702/182
See application file for complete search history.

(56) References Cited

U.S. PATENT DOCUMENTS

| | | | |
|---|---|---|---|
| 5,414,849 A | 5/1995 | Yamamoto | |
| 5,684,947 A | 11/1997 | Horie | |
| 5,724,602 A | 3/1998 | Tanaka et al. | |
| 5,797,027 A | 8/1998 | Kajiura | |
| 5,903,730 A * | 5/1999 | Asai et al. ..................... | 709/224 |

(Continued)

FOREIGN PATENT DOCUMENTS

JP 09-265459 10/1997
(Continued)

OTHER PUBLICATIONS

Online Manual Fujitsu, "UXP/V Analyzer User's Guide V20", http://10.83.169.11/apl_group/vpp_manual/html/C/lang/langAnalyzer/anahtml/sec0s4.ht . . . $2^{nd}$ Edition, pp. 13-31, Sep. 30, 1999.

(Continued)

*Primary Examiner* — Chuong D Ngo
(74) *Attorney, Agent, or Firm* — Staas & Halsey LLP

(57) ABSTRACT

This invention is to provide a parallel efficiency calculation method, which can be applied, even in a case where a load balance is not kept, to many parallel processings including a heterogeneous computer system environment, and quantitatively correlates a parallel efficiency with a load balance contribution ratio and a virtual parallelization ratio, as parallel performance evaluation indexes, and parallel performance impediment factor contribution ratios. A parallel efficiency $E_p(p)$ is calculated by using a load balance contribution ratio $Rb(p)$ representing a load balance degree between respective processors included in a parallel computer system, a virtual parallelization ratio $Rp(p)$ representing a ratio, with respect to time, of a portion calculated in parallel by the respective processors to processings executed in the parallel computer system, and a parallel performance impediment factor contribution ratio $Rj(p)$ representing a ratio of a processing time of a portion of each parallel performance impediment factor to a total processing time of all the processors included in the parallel computer system as follows:

$$E_p(p) = R_b(p) \cdot \frac{1}{R_p(p)} \cdot \left(1 - \sum_{j=1}^{jOthers} R_j(p)\right) \quad (4\text{-}4)$$

J is the parallel performance impediment factor number.

12 Claims, 29 Drawing Sheets

U.S. PATENT DOCUMENTS

| | | | |
|---|---|---|---|
| 6,308,316 B1 * | 10/2001 | Hashimoto et al. | 717/127 |
| 7,024,667 B2 | 4/2006 | Orii | |
| 7,039,906 B1 | 5/2006 | Trelewicz et al. | |
| 7,307,613 B2 | 12/2007 | Teshirogi | |
| 7,587,437 B2 | 9/2009 | Orii | |
| 2009/0287753 A1 | 11/2009 | Orii | |

FOREIGN PATENT DOCUMENTS

| | | |
|---|---|---|
| JP | 2000-298593 | 10/2000 |

OTHER PUBLICATIONS

Garatani, Kazuteru, et al., "Performance Analysis of Parallel FEM Code: GeoFEM", Transactions of JSCES, Paper No. 20000022, Nov. 15, 1998.

Gary, et al., Parallel Computing for RF Scattering Calculations, Jul. 1989, IEEE Transactions on Magnetics, vol. 25, No. 4, pp. 2884-2889.

Vincenzo Piuri, Institute of Electrical and Electronics Engineers: "Static Evaluation of Concurrency Degree in Multitask Environments", International Conference on Computers and Applications, Beijing, June 23- 27, 1987, Washington, IEEE Computer Soc. Press, US, vol. Conf. 2, Jun. 1987, pp. 674-681, XP000757331.

M. E. Crovella et al., "Parallel Performance Prediction Using Lost Cycles Analysis" Supercomputing '94., Proceedings Washington, DC, USA Nov. 14-18, 1994, Los Alamitos, CA, USA,IEEE Comput. Soc, Nov. 14, 1994, pp. 600-609, XPO10100520.

Xiaodong Zhang et al., "Latency Metric: An Experimental Method for Measuring and Evaluating Parallel Program and Architecture Scalability", Journal of Parallel and Distributed Computing, Elsevier, Amsterdam, NL, vol. 22, No. 3, Sep. 1, 1994, pp. 392-410, XP000477422.

Young Yan et al., "Software Support for Multiprocessor Latency Measurement and Evaluation", IEEE Transactions on Software Engineering, IEEE Service Center, Los Alamitos, CA, US, vol. 23, No. 1, Jan. 1997, pp. 4-16, XP000697644.

J.R. Zorgas et al., "Measuring the Scalability of Parallel Computer Systems", Nov. 13, 1989, Proceedings of the Supercomputing Conference. Reno, Nov. 13-17, 1989, New York, IEEE, US, pp. 832-841, XP00090956.

U.S. Appl. No. 10/619,462, filed Jul. 16, 2003, Shigeo Orii, Fujitsu Limited.

European Search Report.

Communication issued in U.S. Appl. No. 10/619,462, mailed Jun. 19, 2009.

Notice of Allowance issued in U.S. Appl. No. 10/619,462, mailed Apr. 30, 2009.

Office Action issued in U.S. Appl. No. 10/619,462, mailed Dec. 11, 2008.

Advisory Action issued in U.S. Appl. No. 10/619,462, mailed Sep. 23, 2008.

Final Office Action issued in U.S. Appl. No. 10/619,462, mailed Jun. 6, 2008.

Office Action issued in U.S. Appl. No. 10/619,462, mailed Nov. 23, 2007.

Restriction Requirement issued in U.S. Appl. No. 10/619,462, mailed Oct. 11, 2007.

Office Action mailed Jul. 3, 2012, in U.S. Appl. No. 12/508,768.

* cited by examiner

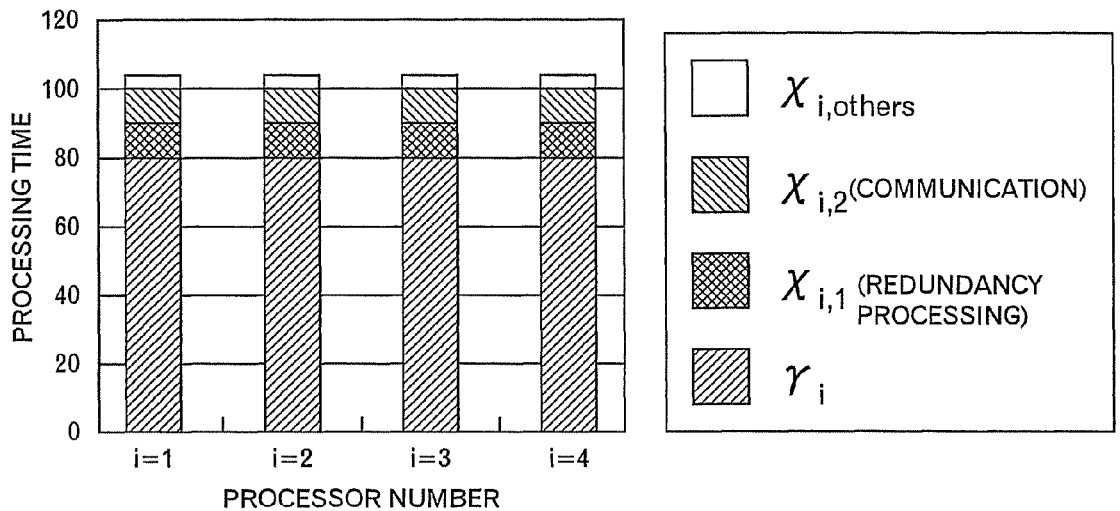
FIG.1
$$\boxed{\gamma_i(p) \mid \chi_{i,1}(p) \mid \cdots \mid \chi_{i,j_{Others}}(p)}$$
$$\boxed{\gamma_{i+1}(p) \mid \chi_{i+1,1}(p) \mid \cdots \mid \chi_{i+1,j_{Others}}(p)}$$
FIG.2
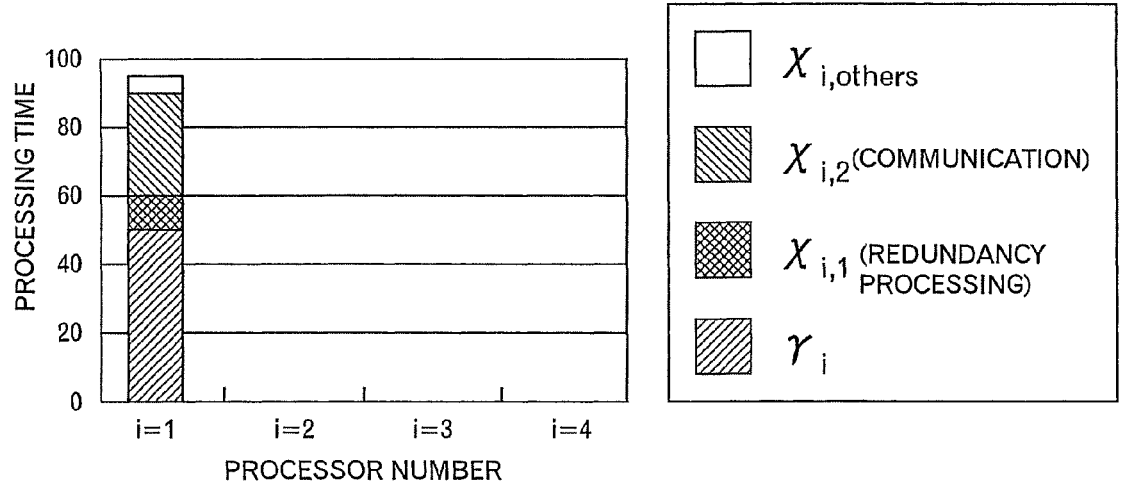
FIG.3

| | $R_b(4)$ | $R_C(4)$ | $R_{TC}$ | $R_p(4)$ | $E_p(4)$ | $E_p(4) \cdot p$ |
|---|---|---|---|---|---|---|
| CASE1 | 0.7931 | 0.1957 | — | 1 | 0.6379 | 2.552 |
| CASE2 | 0.8448 | 0.1837 | 0.0612 | 1 | 0.6379 | 2.552 |
FIG.8
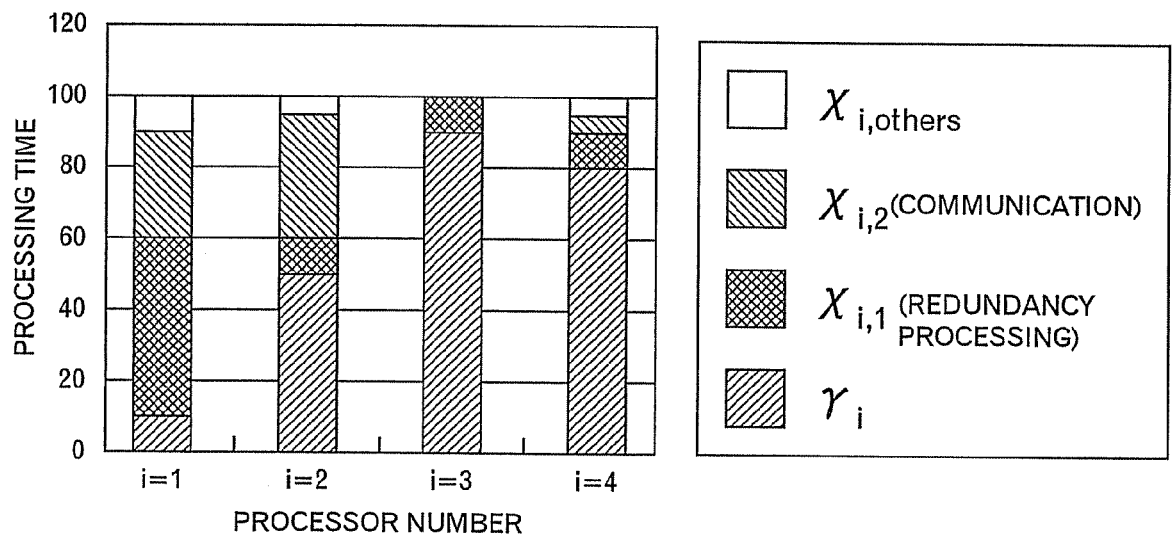
FIG.9
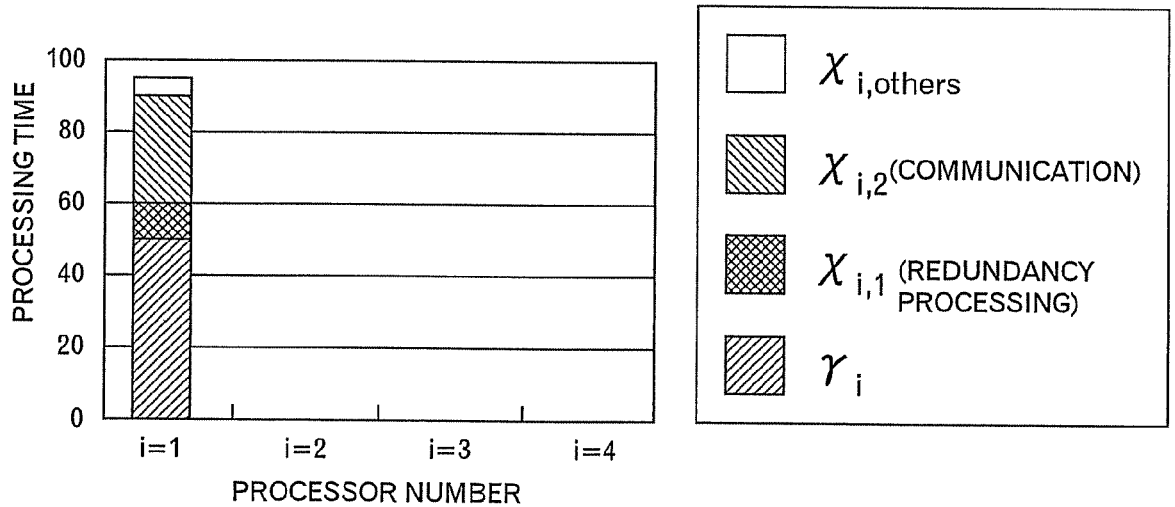
FIG.10

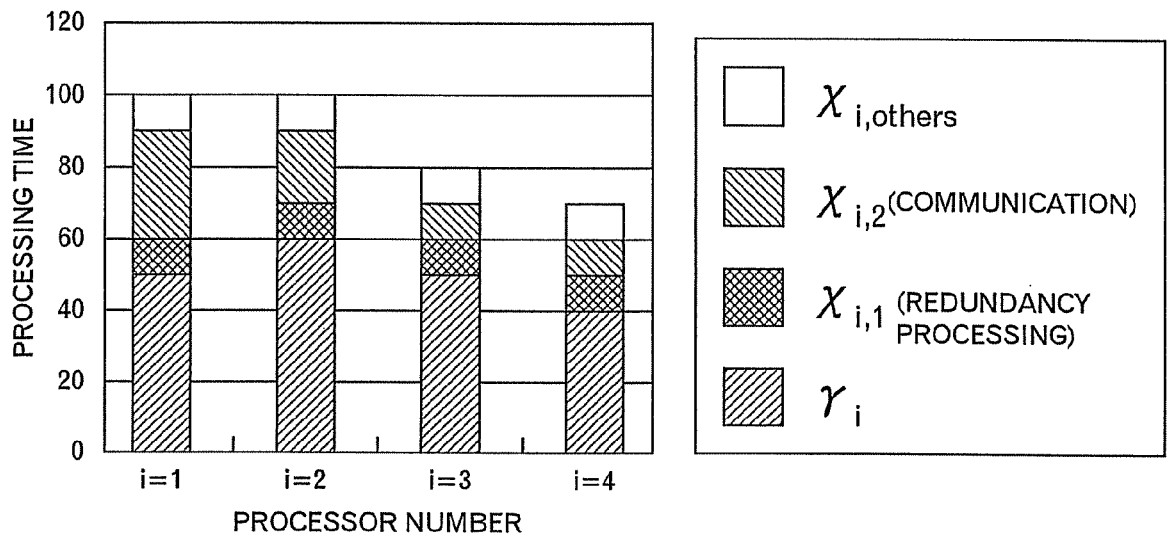
FIG.11
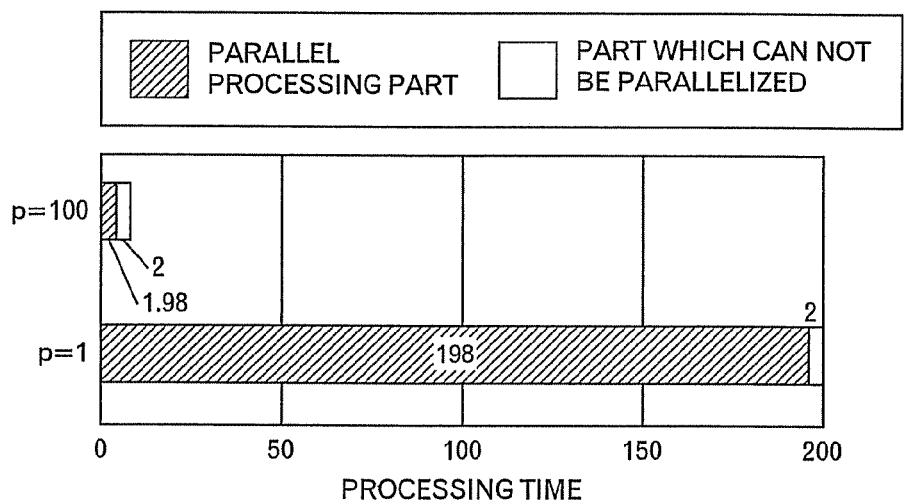
FIG.12
| $R_b(4)$ | $R_p(4)$ | $A_p(p)$ | $R_{RED}(4)$ | $R_C(4)$ | $R_{Others}(4)$ | $E_p(4)$ | $E_p(4) \cdot p$ |
|---|---|---|---|---|---|---|---|
| 0.9392 | 0.8821 | 8.482 | 0.2230 | 0.3309 | 0.0288 | 0.4443 | 1.777 |
FIG.13

| CPU PERFORMANCE | $R_b(4)$ | $R_p(4)$ | $A_p(p)$ | $R_{RED}(4)$ | $R_C(4)$ | $R_{Others}(4)$ | $E_p(4)$ | $E_p(4) \cdot p$ |
|---|---|---|---|---|---|---|---|---|
| ACTUAL (ACTUALLY MEASURED VALUE) | 0.9392 | 0.8821 | 8.482 | 0.2230 | 0.3309 | 0.0288 | 0.4443 | 1.777 |
| FIVE TIMES (PREDICTED VALUE) | 0.9073 | 0.8821 | 8.482 | 0.0960 | 0.7121 | 0.0124 | 0.1846 | 0.7384 |

| PROCESSING No | $E_p(4)$ | $\sum_{i=1}^{p} \tau_i(p)$ | p |
|---|---|---|---|
| 1 | 0.1846 | 64.6 | 4 |
| 2 | 0.7219 | 2000.3 | 10 |
| 3 | 0.3000 | 512.1 | 2 |
| 4 | 1 | 1000 | 1 |

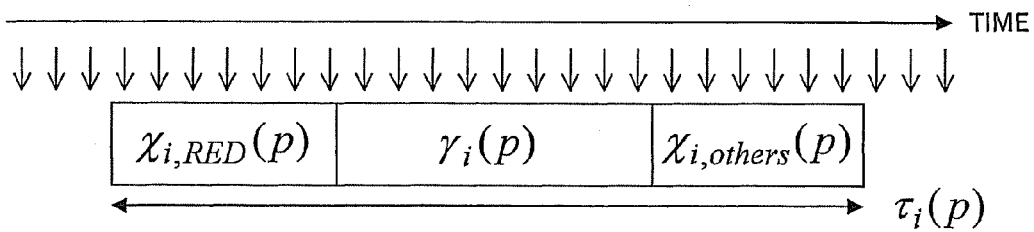
FIG.20
| No. | (RED),1 | (RED),2 | (C),1 | (C),2 | (RED),1+(RED),2 | (C),1+(C),2 |
|---|---|---|---|---|---|---|
| #1 | 10 | 40 | 100 | 99 | 50 | 199 |
| #2 | 11 | 40 | 101 | 100 | 51 | 201 |
| #3 | 10 | 38 | 104 | 100 | 48 | 204 |
| #4 | 9 | 39 | 98 | 98 | 48 | 196 |
FIG.21
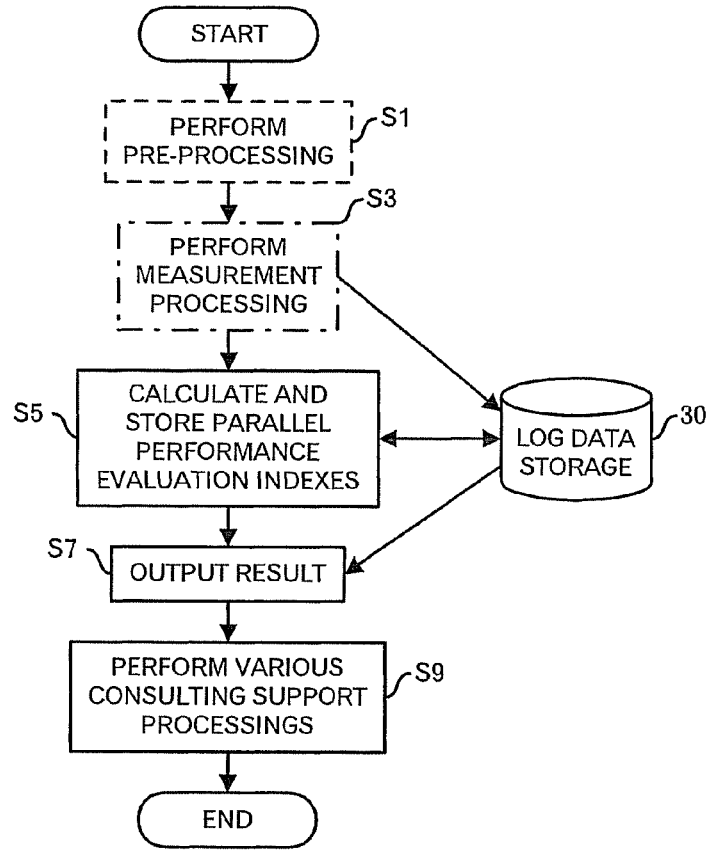
FIG.22

| MAGNIFICATION | $(R_b(4))_E$ | $(R_p(4))_E$ | $(A_p(4))_E$ | $(R_{RED}(4))_E$ | $(R_C(4))_E$ | $(R_{others}(4))_E$ | $(E_p(4))_E$ | $(E_p(4))_E \cdot p$ |
|---|---|---|---|---|---|---|---|---|
| $A_{CPU}=5$ $A_C=\infty$ | 0.9688 | 0.8821 | 8.482 | 0.3333 | 0 | 0.0430 | 0.6850 | 2.740 |
| $A_{CPU}=5$ $A_C=19.2$ | 0.9583 | 0.8821 | 8.482 | 0.2953 | 0.1141 | 0.0381 | 0.6002 | 2.401 |

FIG.29

| TUNING | $R_b(4)$ | $R_p(4)$ | $A_p(4)$ | $R_{RED}(4)$ | $R_C(4)$ | $R_{Others}(4)$ | $E_p(4)$ | $\max(\tau_i)$ |
|---|---|---|---|---|---|---|---|---|
| BEFORE TUNING | 0.9392 | 0.8821 | 8.482 | 0.2230 | 0.3309 | 0.0288 | 0.4443 | 37 |
| AFTER FIRST TUNING | 0.9508 | 0.8821 | 8.482 | 0.2672 | 0.1983 | 0.0345 | 0.5389 | 30.5 |
FIG.32
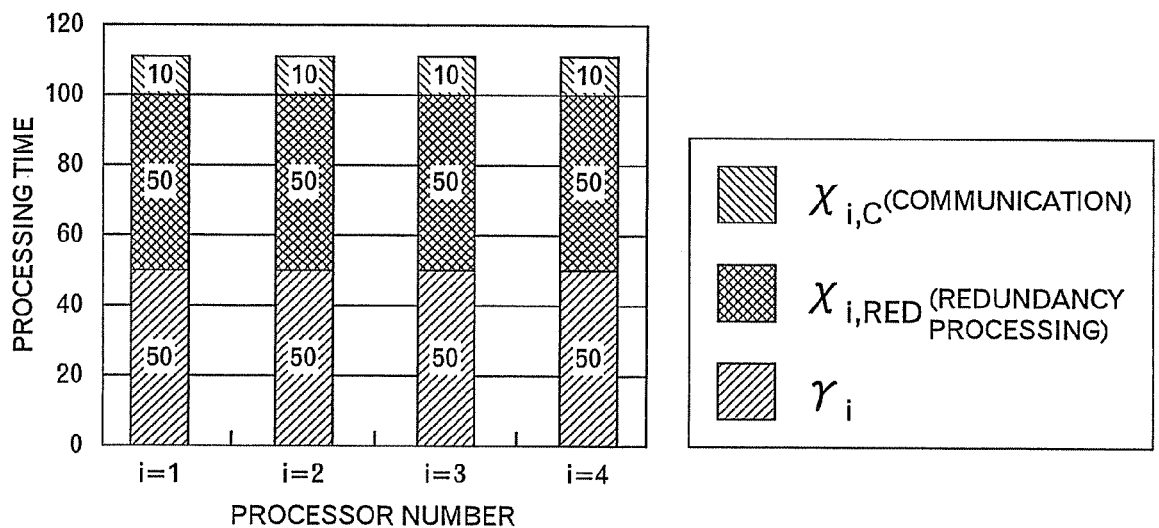
FIG.33
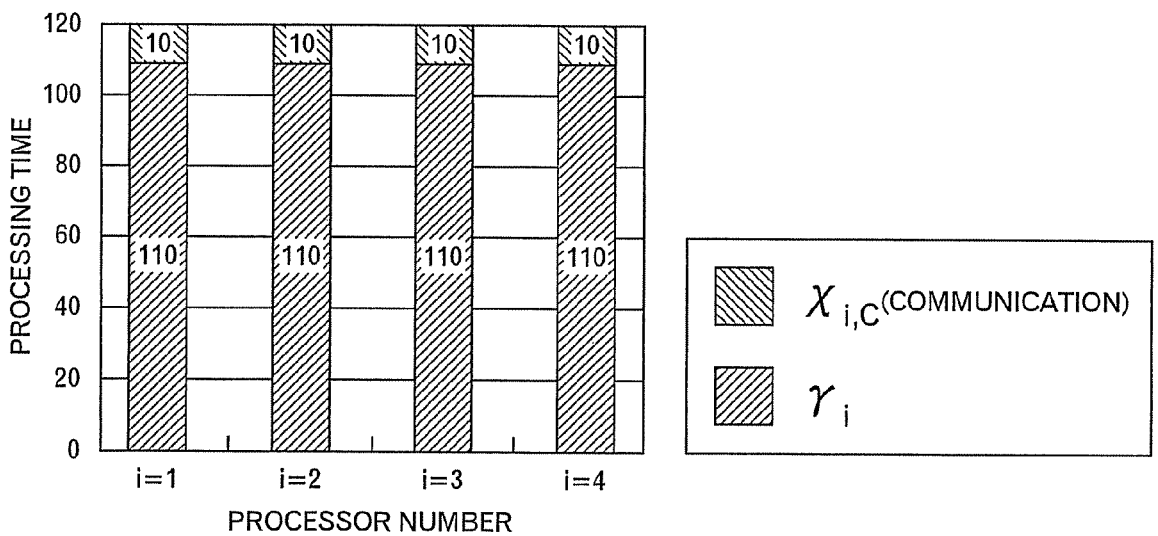
FIG.34

| j | ALGORITHM | $A_p(4)$ | $E_p(4)$ | $\tau$ | $(p)_j$ | $A_p(4) > (p)_j$ | $(p)_T$ |
|---|---|---|---|---|---|---|---|
| 1 | UNSUITABLE FOR PARALLEL PROCESSING | 5.000 | 0.5682 | 110 | 7.782 | × | — |
| 2 | SUITABLE FOR PARALLEL PROCESSING | ∞ | 0.9167 | 120 | 6.618 | ○ | 7 |

| PROCESSING NO. | $R_b(4)$ | $R_p(4)$ | $A_p(4)$ | $R_{RED}(4)$ | $R_C(4)$ | $E_p(4)$ | $E_p(4) \cdot p$ |
|---|---|---|---|---|---|---|---|
| 1 | 1.000 | 1.000 | ∞ | 0.0000 | 0.08333 | 0.9167 | 3.667 |
| 2 | 1.000 | 1.000 | ∞ | 0.0000 | 0.08333 | 0.9167 | 3.667 |
| 3 | 1.000 | 1.000 | ∞ | 0.0000 | 0.08333 | 0.9167 | 3.667 |
| 4 | 1.000 | 1.000 | ∞ | 0.0000 | 0.08333 | 0.9167 | 3.667 |
| 5 | 1.000 | 0.8000 | 5.000 | 0.4545 | 0.09091 | 0.5682 | 2.273 |

| $R_b(4)$ | $R_p(4)$ | $A_p(4)$ | $R_C(4)$ | $E_p(4)$ | $E_p(4) \cdot p$ |
|---|---|---|---|---|---|
| 0.9286 | 1.000 | ∞ | 0.4808 | 0.4821 | 1.928 |

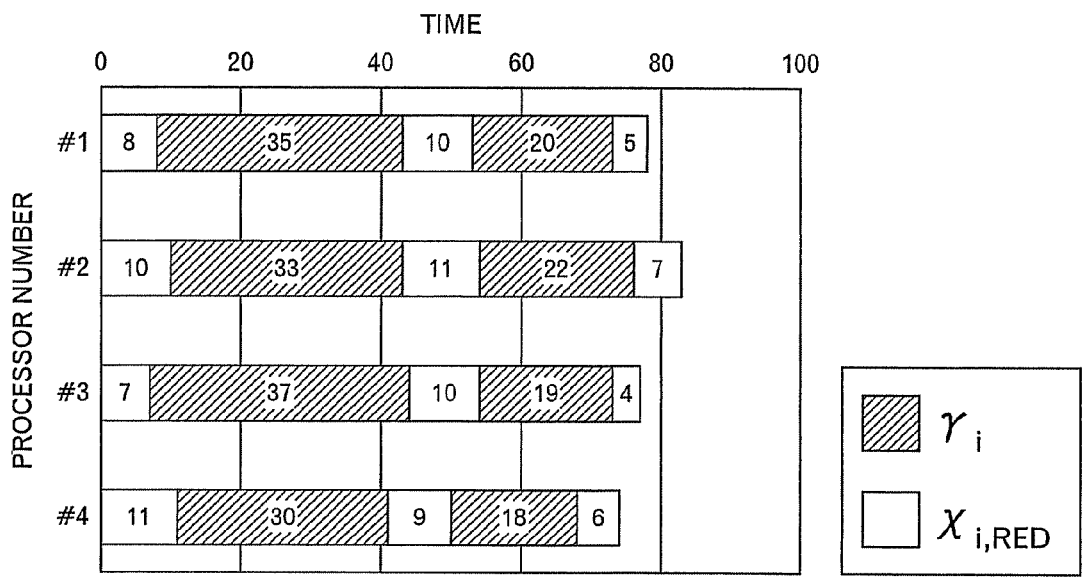
FIG.40
| $R_b(4)$ | $R_p(4)$ | $A_p(4)$ | $R_{RED}(4)$ | $E_p(4)$ | $E_p(4) \cdot p$ |
|---|---|---|---|---|---|
| 0.9398 | 0.8973 | 9.737 | 0.3141 | 0.7184 | 2.874 |
FIG.41
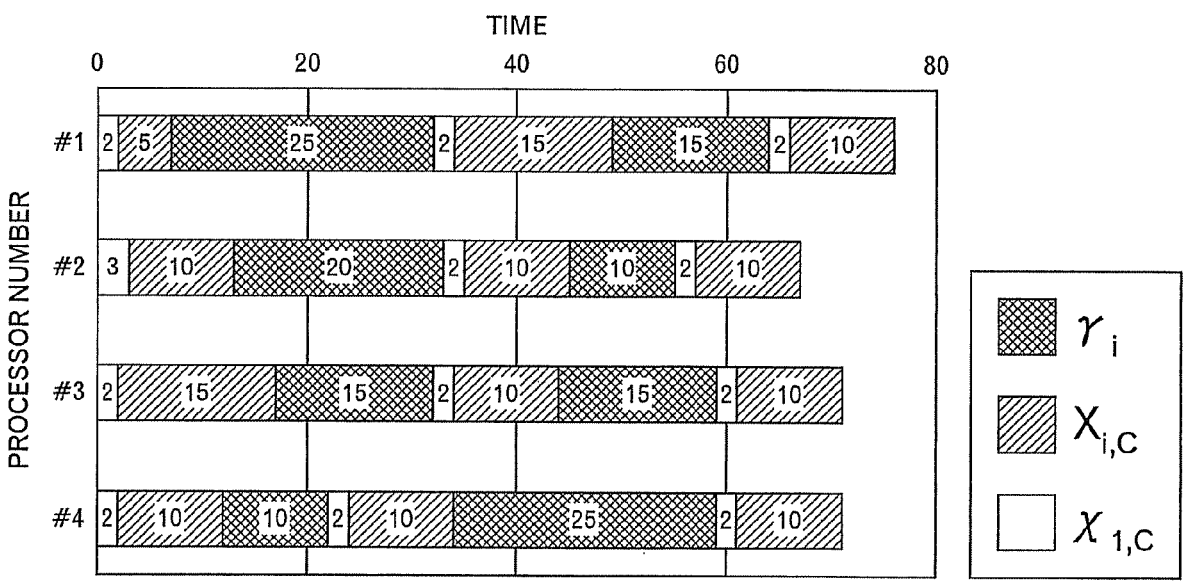
FIG.42

| $R_b(4)$ | $R_p(4)$ | $A_p(4)$ | $R_C(4)$ | $E_p(4)$ | $E_p(4)\cdot p$ |
|---|---|---|---|---|---|
| 0.9375 | 0.9557 | 22.57 | 0.5263 | 0.4647 | 1.859 |

| $R_b(4)$ | $R_p(4)$ | $A_p(4)$ | $R_C(4)$ | $R_W(4)$ | $E_p(4)$ | $E_p(4)\cdot p$ |
|---|---|---|---|---|---|---|
| 0.9704 | 1.000 | ∞ | 0.3158 | 0.1108 | 0.5564 | 2.226 |

| $R_b(4)$ | $R_p(4)$ | $A_p(4)$ | $R_C(4)$ | $R_W(4)$ | $E_p(4)$ | $E_p(4) \cdot p$ |
|---|---|---|---|---|---|---|
| 0.7875 | 1.000 | $\infty$ | 0.1418 | 0.2778 | 0.4521 | 1.808 |

| $R_b(4)$ | $R_p(4)$ | $A_p(4)$ | $R_{RED}(4)$ | $R_C(4)$ | $E_p(4)$ | $E_p(4) \cdot p$ |
|---|---|---|---|---|---|---|
| 1.000 | 0.9524 | 21.01 | 0.1333 | 0.2000 | 0.7000 | 2.800 |

| $R_b(4)$ | $R_p(4)$ | $A_p(4)$ | $R_C(4)$ | $R_W(4)$ | $E_p(4)$ | $E_p(4) \cdot p$ |
|---|---|---|---|---|---|---|
| 1.000 | 1.000 | ∞ | 0.2000 | 0.1000 | 0.7000 | 2.800 |

| $R_b(4)$ | $R_p(4)$ | $A_p(4)$ | $R_{TC}(4)$ | $R_C(4)$ | $R_W(4)$ | $E_p(4)$ | $E_p(4) \cdot p$ |
|---|---|---|---|---|---|---|---|
| 0.8231 | 1.000 | ∞ | 0.0344 | 0.1089 | 0.0888 | 0.6321 | 2.528 |

| $R_b(4)$ | $R_p(4)$ | $A_p(4)$ | $R_{TC}(4)$ | $R_C(4)$ | $R_W(4)$ | $E_p(4)$ | $E_p(4) \cdot p$ |
|---|---|---|---|---|---|---|---|
| 0.8571 | 1.000 | ∞ | 0.0385 | 0.1282 | 0.2340 | 0.5137 | 2.055 |

| $R_b(8)$ | $R_p(8)$ | $A_p(8)$ | $R_{RED}(8)$ | $R_{TC}(8)$ | $R_C(8)$ | $R_W(8)$ | $E_p(8)$ | $E_p(8) \cdot p$ |
|---|---|---|---|---|---|---|---|---|
| 0.9286 | 0.9790 | 47.62 | 0.0592 | 0.0296 | 0.1124 | 0.1080 | 0.6552 | 5.242 |

| $R_b(4)$ | $R_p(4)$ | $A_p(4)$ | $R_{RED}(4)$ | $E_p(4)$ | $E_p(4) \cdot p$ |
|---|---|---|---|---|---|
| 0.6250 | 0.8988 | 9.881 | 0.3103 | 0.4796 | 1.918 |

PARALLEL EFFICIENCY CALCULATION METHOD AND APPARATUS

This application is a divisional of application Ser. No. 10/619,462, filed Jul. 16, 2003 now U.S. Pat. No. 7,587,437, the contents of which are incorporated herein by reference.

TECHNICAL FIELD OF THE INVENTION

The present invention relates to a performance evaluation technique of a parallel computer system and a usage technique of the result of the performance evaluation. Incidentally, the technique of the invention can be applied to all fields in which a parallel processing is performed, such as a field (structural analysis, fluid analysis, computational chemistry, etc.) handled in the conventional high performance computing (HPC), a biosimulation expanded on a grid or a cluster, or a Web service (for example, MtoM (Machine to Machine)).

BACKGROUND OF THE INVENTION

The performance of a parallel computer system remarkably varies for each application. Accordingly, its performance evaluation is important. A performance evaluation method of the parallel computer system includes (1) a method in which a specific processing is executed by various computers and a comparison is made, and (2) a self-complete type method to evaluate how much performance a certain computer demonstrates as compared with its own potential. The former is mainly used for performance comparison among computers as a benchmark test. The latter is required to be executed in practical use after introduction. Although the self-complete type performance evaluation can be carried out by using an index called a parallel efficiency, it has not been actually executed. Besides, although a parallel performance evaluation (so-called scalability evaluation) can also be made instead of the calculation of the parallel efficiency, in which time measurements are carried out while the number p of processors is changed, and a comparison of the decrease degree with an ideal decrease degree of 1/p is made, since it is necessary to make measurements several times, the evaluation is not made in general. Besides, the scalability evaluation is qualitative, and a strict parallel performance evaluation cannot be performed. Accordingly, at present, processings with poor parallel efficiency cannot be detected, and they are put in an ungoverned state.

The performance evaluation of a parallel processing by using the parallel efficiency is performed by calculating a parallel efficiency $E_p(p)$ determined by expressions (1) and (2) set forth below. Where, p is the number of processors, $\tau(1)$ is a processing time in a case where a processing is executed by one processor, $\tau(p)$ is a processing time in a case where the same processing is executed by p processors, and $\tau_i(p)$ is a processing time of an i-th processor under $1 \leq i \leq p$.

$$E_p(p) \equiv \frac{\tau(1)}{\tau(p) \cdot p} \quad (1)$$

$$\tau(p) \equiv \underset{i=1}{\overset{p}{\text{Max}}}(\tau_i(p)) \quad (2)$$

The expression (1) is disclosed in, for example, a document "PERFORMANCE EVALUATION OF GeoFEM OF PARALLEL FINITE ELEMENT METHOD CODE, Transactions of JSCES, No. 20000022 (2000) by Tsukaya, Nakamura, Okuda, and Yagawa".

However, even if the parallel efficiency is determined by the conventional method, since the quantitative relation to parallel performance impediment factors is not clear, it has not been understood which impediment factor has what influence on the parallel efficiency. Besides, in a certain parallel performance evaluation technique (For example, Japanese Patent Application No. 2001-241121, and US Publication No. US-2003-0036884-A1), as shown in FIG. 1, there is required a condition "load balance is kept, and respective processing times $\gamma_i$ (parallel part), $\chi_{i,1}$ (redundancy processing part), $\chi_{i,2}$ (communication part), or $\chi_{i,others}$ (other parallel performance impediment factors) are identical to one another for all "i"", and there has been a problem that it can be applied to only a certain special parallel processing.

Besides, it is difficult to apply the conventional methods to the parallel processing by a grid or a cluster. This is because when resources distributed on the grid or cluster and required for calculation, such as memories, data and CPUs, are concentrated in one processor, there often occurs a case where the processing becomes so large that it can not be accomplished by the one processor. That is, it is difficult to measure $\tau(1)$ itself. Besides, to obtain $\tau(1)$ and $\tau(p)$ in the expression (1) by actual measurement supposes that the performances of processors are identical to one another. However, since the respective processor performances on the grid or the cluster are generally different from one another, there is also a problem that even if the actually measured $\tau(1)$ and $\tau(p)$ are substituted into the expression (1), an accurate parallel efficiency cannot be determined.

SUMMARY OF THE INVENTION

An object of the invention is therefore to provide a parallel processing performance evaluation technique in which a condition of "load balance is kept" is removed, and which can be applied to many kinds of parallel processings including a heterogeneous computer system environment, and quantitatively correlates the parallel efficiency with parallel performance evaluation indexes and parallel performance impediment factors.

Another object of the invention is to provide a technique for enabling suitable use of a parallel computer system by using the parallel efficiency and the like.

Still another object of the invention is to provide a technique for enabling a suitable judgment on capability increase, renewal, or the like of a parallel computer system by using a parallel efficiency and the like.

Still another object of the invention is to provide a technique for enabling the suitable execution of tuning and/or selection of an algorithm of a program executed in a parallel computer system.

According to a first aspect of the invention, a parallel efficiency calculation method for computing a parallel efficiency of a parallel computer system comprises the steps of: calculating a load balance contribution ratio Rb(p) representing a load balance degree between respective processors included in the parallel computer system and storing it into a storage device; calculating a virtual parallelization ratio Rp(p) representing a ratio, with respect to time, of a portion processed in parallel by the respective processors among processings executed in the parallel computer system and storing it into the storage device; calculating a parallel performance impediment factor contribution ratio Rj(p) representing a ratio of a processing time of a processing portion corresponding to each parallel performance impediment factor to a total processing time of all the processors included in the parallel computer system and storing it into the storage device; and calculating the parallel efficiency by using the load balance contribution ratio Rb(p), the virtual parallelization ratio Rp(p), and the parallel performance impediment factor contribution ratio Rj(p) (for example, in accordance with an expression (4-4) in an embodiment) and storing it into the storage device.

By this, the parallel efficiency is quantitatively correlated with the parallel performance evaluation index such as the load balance contribution ratio, the virtual parallelization ratio, and the parallel performance impediment factor contribution ratio. The parallel efficiency may be outputted to an output device such as a display device with at least any of the load balance contribution ratio Rb(p), the virtual parallelization ratio Rp(p), and the parallel performance impediment factor contribution ratio Rj(p).

According to a second aspect of the invention, a parallel efficiency calculation method for calculating a parallel efficiency of a parallel computer system comprises the steps of: calculating a load balance contribution ratio Rb(p) representing a load balance degree between respective processors included in the parallel computer system and storing it into a storage device; calculating an acceleration ratio Ap(p) representing a limit of improvement in a shortening degree of a processing time by parallelization of a processing executed in the parallel computer system and storing it into storage device; calculating a parallel performance impediment factor contribution ratio Rj(p) representing a ratio of a processing time of a processing portion corresponding to each parallel performance impediment factor to a total processing time of all the processors included in the parallel computer system and storing it into the storage device; and calculating the parallel efficiency by using the load balance contribution ratio Rb(p), the acceleration ratio $A_p(p)$ and the parallel performance impediment factor contribution ratio Rj(p) (for example, in accordance with an expression (4-5) in an embodiment) and storing it into the storage device.

By this, the parallel efficiency is quantitatively correlated with the parallel performance evaluation index, such as the load balance contribution ratio and the parallel performance impediment factor contribution ratio, and an auxiliary index such as the acceleration ratio. The parallel efficiency may be outputted to an output device such as a display device with at least any of the load balance contribution ratio Rb(p), the acceleration ratio $A_p(p)$ and the parallel performance impediment factor contribution ratio Rj(p).

According to a third aspect of the invention, a parallel efficiency calculation method for calculating a parallel efficiency of a parallel computer system comprises the steps of: calculating a load balance contribution ratio Rb(p) representing a load balance degree between respective processors included in the parallel computer system and storing it into a storage device; calculating a parallel performance impediment factor contribution ratio Rj(p) representing a ratio of a processing time of a processing portion corresponding to each parallel performance impediment factor to a total processing time of all the processors included in the parallel computer system and storing it into the storage device; and calculating the parallel efficiency by using the load balance contribution ratio Rb(p) and the parallel performance impediment factor contribution ratio Rj(p) (for example, in accordance with an expression (8-2) in an embodiment) and storing it into the storage device.

For example, if the sum of processing times of portions processed in parallel in the processings executed by the respective processors included in the parallel computer system is almost identical to a processing time in the case where the same processing is executed by one processor, that is, if processing content can be almost processed in parallel, a calculation of the parallel efficiency can be made in this way. The parallel efficiency may be outputted to an output device such as a display device with at least any of the load balance contribution ratio Rb(p) and the parallel performance impediment factor contribution ratio Rj(p).

According to a fourth aspect of the invention, a parallel efficiency calculation method for calculating a parallel efficiency of a parallel computer system comprises the steps of: calculating a load balance contribution ratio Rb(p) representing a load balance degree between respective processors included in the parallel computer system and storing it into a storage device; calculating a virtual parallelization ratio Rp(p) representing a ratio, with respect to time, of a portion processed in parallel by the respective processors among processings executed in the parallel computer system and storing it into the storage device; and calculating the parallel efficiency by using a sum of processing times of portions processed in parallel in processings executed in the respective processors included in the parallel computer system, a sum of processing times of the processings executed in the respective processors, the load balance contribution ratio Rb(p), and the virtual parallelization ratio Rp(p) (for example, in accordance with an expression (9-1) in an embodiment) and storing it into the storage device. This is a modified example of the first aspect of the invention. The parallel efficiency may be outputted to an output device such as a display device with at least any of the sum of processing times of portions processed in parallel in processings executed in the respective processors, the sum of processing times of the processings executed in the respective processors, the load balance contribution ratio Rb(p), and the virtual parallelization ratio Rp(p).

According to a fifth aspect of the invention, a parallel efficiency calculation method for calculating a parallel efficiency of a parallel computer system comprises the steps of: calculating a first processing time equivalent to a total processing time of parallel performance impediment portions of a processing in a case where the processing is executed by one processor and storing it into a storage device; calculating a second processing time as a sum of processing times of portions processed in parallel in processings executed in respective processors included in the parallel computer system; and calculating the parallel efficiency by using the number of the processors used in the parallel computer system, a longest processing time in processing times of the processings executed in the respective processors included in the parallel computer system, the first processing time, and the second processing time (for example, in accordance with an expression (9-2) in an embodiment) and storing it into the storage device.

On the basis of predetermined modeling, the parallel efficiency can be computed by only the processing times obtained by one measurement.

The parallel efficiency may be outputted to an output device such as a display device with at least any of the number of the processors used in the parallel computer system, the longest processing time in processing times of the processings executed in the respective processors included in the parallel computer system, the first processing time, and the second processing time.

Besides, in the aforementioned load balance contribution ratio calculating step, the load balance contribution ratio Rb(p) may be calculated by dividing the total processing time of the processings executed in all the processors included in the parallel computer system by a longest processing time in the processing times of the processings executed in the respective processors included in the parallel computer system and the number of the processors used in the parallel computer system (for example, in accordance with an expression (5) in an embodiment).

Further, in the aforementioned virtual parallelization ratio calculating step, the virtual parallelization ratio Rp(p) may be calculated by dividing a sum of the processing times of the portions processed in parallel in the processings executed in the respective processors included in the parallel computer system by a processing time equivalent to a third processing time in a case where the same processing is executed by one processor (for example, in accordance with an expression (6-1) in an embodiment).

Besides, in the aforementioned parallel performance impediment factor contribution ratio calculating step, the parallel performance impediment factor contribution ratio Rj(p) concerning a specific parallel performance impediment factor may be calculated by dividing a sum of the processing times of processing portions corresponding to the specific parallel performance impediment factor in the respective processors included in the parallel computer system by a sum of the processing times of the respective processors included in the parallel computer system (for example, in accordance with an expression (7) in an embodiment).

Besides, in the aforementioned acceleration ratio calculating step, the acceleration ratio may be calculated as a reciprocal of a value calculated by subtracting the virtual parallelization ratio, which is calculated by dividing a sum of processing times of portions processed in parallel in processings executed in the respective processors included in the parallel computer system, by a processing time equivalent to a third processing time in a case where the same processing is executed by one processor, from 1 (for example, in accordance with an expression (6-2) in an embodiment).

Further, there is also a case where the aforementioned processing time is represented by the number of times of confirmation of corresponding events, in addition to an actual processing time.

Besides, a step of calculating an auxiliary index by multiplying the calculated parallel efficiency by the number of processors used in the parallel computer system and storing it into the storage device may be further included. By this, it becomes possible to indicate how many processors correspond to the processing executed in the parallel computer system.

Further, the aforementioned third processing time may be calculated by a sum of a first processing time equivalent to a total processing time of portions corresponding to parallel performance impediment factors in a processing in a case where the processing is executed by one processor and a second processing time as a sum of processing times of portions processed in parallel in the processings executed in the respective processors included in the parallel computer system (for example, in accordance with an expression (15) in an embodiment). It becomes possible to make a calculation of the parallel efficiency etc. by one measurement of the processing time by predetermined modeling.

Further, the aforementioned first processing time may be calculated by a sum of processing times of redundancy processings or communication processings in the processings executed in the respective processors included in the parallel computer system (for example, in accordance with an expression (12-1) in an embodiment).

Besides, the first to fifth aspects of the invention may further comprise the steps of: setting a target parallel efficiency; and calculating an optimum number of processors by dividing a product of the calculated parallel efficiency and the number of processors by the target parallel efficiency and storing it into the storage device. Even if many processors are added, the processing time is not necessarily shortened, and if the optimum number of processors can be computed as stated above, it is possible to prevent wasteful addition of resources. The optimum number of processors may be outputted to an output device such as a display device.

Further, the first to fifth aspects of the invention may further comprise the steps of: setting an increase of a working time at a time of system expansion and a predicted parallel efficiency; and calculating an acceleration ratio at the time of the system expansion by dividing a sum of a product sum, with respect to all the processings, of a sum of processing times of the processings executed in the respective processors presently included in the parallel computer system and the calculated parallel efficiency, and a product of the increase of the working time and the predicted parallel efficiency, by a sum of working times of the respective processors presently included in the parallel computer system (for example, in accordance with an expression (18) in an embodiment) and storing it into the storage device. At the time of the system expansion, it becomes possible to give a suitable quantitative guidance to a system manager. The acceleration ratio at the time of the system expansion may be outputted to an output device such as a display device.

Besides, the first to fifth aspects of the invention may further comprise the steps of: setting a performance magnification of a new parallel computer system relative to the parallel computer system; and calculating an estimated parallel efficiency by using the performance magnification of the new parallel computer system and storing it into the storage device. It becomes possible to give a quantitative guidance at a time of system replacement. The estimated parallel efficiency may be outputted to an output device such as a display device.

Further, the first to fifth aspects of the invention may further comprise the steps of: calculating a system operational efficiency by dividing a product sum, with respect to all processings, of a sum of processing times of processings executed in the respective processors presently included in the parallel computer system and a calculated parallel efficiency, by a sum of working times of the respective processors presently included in the parallel computer system (for example, in accordance with an expression (17) in an embodiment) and storing it into the storage device. As compared with a conventional idea of a working efficiency, when the system operational efficiency in which consideration is given to the parallel efficiency is adopted as in the invention, it becomes possible to evaluate the system operational state in a more practical form. The system operational efficiency may be outputted to an output device such as a display device.

Besides, the first to fifth aspects of the invention may further comprise the steps of: setting a target processing time; calculating a target parallel efficiency by using the target processing time and storing it into the storage device; and confirming propriety of the target parallel efficiency. For example, the target parallel efficiency can be calculated by linear extrapolation.

Further, the present invention may further comprise the steps of: in a case where the propriety of the target parallel efficiency is confirmed, calculating a parallel efficiency after execution of tuning and storing it into the storage device; and comparing the parallel efficiency after the execution of the tuning with the target parallel efficiency. It becomes possible to execute the tuning of an application or the like from a more quantitative viewpoint. The parallel efficiency after execution of tuning and/or target parallel efficiency may be outputted to an output device such as a display device.

Besides, the first to fifth aspects of the invention may further comprise the steps of: setting a target processing time; calculating an estimated value of the number of required processors for each different algorithm by using a parallel efficiency in each algorithm and storing it into the storage device; and extracting an algorithm in which the estimated value of the number of processors is smaller than an acceleration ratio representing a limit of improvement in a shortening degree of the processing time by parallelization of the processing by the algorithm and becomes a minimum value in the estimated values of the number of processors calculated on different algorithms. It becomes possible to quantitatively select the algorithm, which can further improve the parallel efficiency. The extracted algorithm may be outputted to an output device such as a display device.

Incidentally, the parallel efficiency calculation method of the invention can be executed by a program and a computer, and in the case where the program is executed by the computer, the computer is a parallel efficiency calculation apparatus. Besides, such a program is stored in a storage medium or a storage device, for example, a flexible disk, a CD-ROM, a magneto-optical disk, a semiconductor memory, or a hard disk. Besides, there is also a case where the program is distributed as a digital signal through a network or the like. Incidentally, an intermediate processing result is temporarily stored in a memory.

BRIEF DESCRIPTION OF THE DRAWINGS

FIG. 1 is a drawing showing a state in which load balance is kept between processors;

FIG. 2 is a drawing showing a classification example of processing times in respective processors;

FIG. 3 is a drawing showing a state in which load balance is not kept among processors (a case in which four processors are assigned and a processing is performed by one of the processors);

FIG. 8 is a drawing showing changes of parallel performance evaluation indexes in the case where a parallel performance impediment factor is added;

FIG. 9 is a drawing showing an example of a case where although a load balance is kept between processors, a load balance between respective processing times is not kept;

FIG. 10 is a drawing showing a processing time in the case where a processing is performed by one processor;

FIG. 11 is a drawing showing an example of a case where a load balance is not kept between processors;

FIG. 12 is a drawing showing the existence of a parallel performance impediment factor, which becomes apparent in the case where high parallelization is made;

FIG. 13 is a drawing showing a calculation example of parallel performance evaluation indexes;

FIG. 20 is a conceptual drawing expressing confirmation and count of the occurrence of an event by sampling;

FIG. 21 is a drawing showing an example of a sampling result at the time of execution of a program indicated in table 1;

FIG. 22 is a drawing showing an example of a processing flow of a parallel performance analyzer;

FIG. 29 is a drawing showing a performance guidance concerning communication in the case where CPU performance is five times as higher and a target parallel efficiency is 0.6;

FIG. 32 is a drawing showing a change of parallel performance evaluation indexes before tuning and after execution of first tuning;

FIG. 33 is a drawing showing a processing time by a parallel processing program on the basis of an algorithm unsuited for a parallel processing;

FIG. 34 is a drawing showing a processing time by a parallel processing program on the basis of an algorithm suited for a parallel processing;

FIG. 40 is a drawing showing a measurement result of processing times in a second example;

FIG. 41 is a drawing showing a calculation result of parallel performance evaluation indexes in the second example;

FIG. 42 is a drawing showing a measurement result of processing times in a third example;

DETAIL DESCRIPTION OF THE PREFERRED EMBODIMENTS

Principle of the Invention

Figure 4:
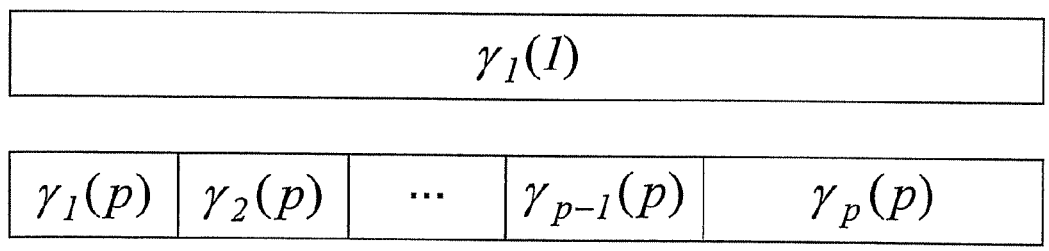
FIG. 4 is a drawing showing an example of modeling of the relation between $\gamma_1(p)$ and $\gamma_i(p)$.

In the present invention, a parallel efficiency $E_p(p)$ is described by parallel performance evaluation indexes so that the parallel efficiency $E_p(p)$ is quantitatively connected to parallel performance impediment factors. As shown in FIG. 2, is processing time $\tau_i(p)$ can be expressed as expression (3) using the sum of a processing time $\gamma_i(p)$ of a parallel calculation part and processing times $\chi_{i,j}(p)$ of respective parallel performance impediment factors j and can be represented as expression (3). Here, $1 \leq j \leq j_{others}$. Incidentally, in FIG. 2, i is a processor number, p is the number of processors. Besides, FIG. 2 shows only a processor i and a processor i+1.

$$\tau_i(p) \equiv \gamma_i(p) + \sum_{j=1}^{j_{Others}} \chi_{i,j}(p) \tag{3}$$

The expression (1) is transformed as set forth below, and the parallel efficiency $E_p(p)$ is described by introducing, as parallel performance evaluation indexes, a load balance contribution ratio Rb(p), a virtual parallelization ratio Rp(p), and a parallel performance impediment factor contribution ratio Rj(p).

$$E_p(p) = \frac{\tau(1)}{\tau(p) \cdot p} \cdot \frac{\sum_{i=1}^{p} \tau_i(p)}{\sum_{i=1}^{p} \tau_i(p)} \tag{4-1}$$

$$= \frac{\sum_{i=1}^{p} \tau_i(p)}{\tau(p) \cdot p} \cdot \frac{\tau(1)}{\sum_{i=1}^{p} \tau_i(p)} \cdot \frac{\sum_{i=1}^{p} \gamma_i(p)}{\sum_{i=1}^{p} \gamma_i(p)} \tag{4-2}$$

$$= \frac{\sum_{i=1}^{p} \tau_i(p)}{\tau(p) \cdot p} \cdot \frac{\tau(1)}{\sum_{i=1}^{p} \gamma_i(p)} \cdot \frac{\sum_{i=1}^{p} \gamma_i(p)}{\sum_{i=1}^{p} \tau_i(p)} \tag{4-3}$$

Incidentally, a transformation from the expression (1) to the expression (4-1) is made by multiplying a numerator and a denominator of the expression (1) by the sum of $\tau_i(p)$ with respect to i. Besides, a transformation to the expression (4-2) is made by changing positions of the respective elements in the expression (4-1) and multiplying a numerator and a denominator of the expression (4-1) by the sum of $\gamma_i(p)$ with respect to i. Besides, a following expression is derived from the expression (3). This expresses the sum of $\tau_i(p)$ with respect to i.

$$\sum_{i=1}^{p} \tau_i(p) = \sum_{i=1}^{p} \gamma_i(p) + \sum_{j=1}^{j_{Others}} \sum_{i=1}^{p} \chi_{i,j}(p)$$

Then, a following expression is derived by the load balance contribution ratio Rb(p), the virtual parallelization ratio Rp(p), and the parallel performance impediment factor contribution ratio Rj(p).

$$E_p(p) = R_b(p) \cdot \frac{1}{R_p(p)} \cdot \left(1 - \sum_{j=1}^{j_{Others}} R_j(p)\right) \tag{4-4}$$

Besides, when an acceleration ratio Ap(p) is used, the expression is also expressed as follows:

$$E_p(p) = R_b(p) \cdot \frac{1}{1 - 1/A_p(p)} \cdot \left(1 - \sum_{j=1}^{j_{Others}} R_j(p)\right) \quad (4\text{-}5)$$

Incidentally, the load balance contribution ratio Rb(p), the virtual parallelization ratio Rp(p), the parallel performance impediment factor contribution ratio Rj(p), and the acceleration ratio Ap(p) are expressed as follows:

$$R_b(p) \equiv \frac{\sum_{i=1}^{p} \tau_i(p)}{\tau(p) \cdot p} \quad (1/p \leq R_b(p) \leq 1) \quad (5)$$

$$R_p(p) \equiv \frac{\sum_{i=1}^{p} \gamma_i(p)}{\tau(1)} \quad (0 \leq R_p(p) \leq 1) \quad (6\text{-}1)$$

$$A_p(p) \equiv \frac{1}{1 - R_p(p)} \quad (6\text{-}2)$$

$$R_j(p) \equiv \frac{\sum_{i=1}^{p} \chi_{i,j}(p)}{\sum_{i=1}^{p} \tau_i(p)} \quad (0 \leq R_j(p) \leq 1) \quad (7)$$

Incidentally, the parallel performance impediment factor is numbered j.

A state in which a load balance is kept is a state in which the processing times $\tau_i(p)$ of processors are uniform as shown in FIG. 1. The expression (5) expresses this state as Rb(p)=1, and expresses, as $1/p \leq Rb(p) \leq 1$, a state in which the load balance is not kept. As shown in FIG. 3, in the case where a processing is performed by only one processor at the time of a parallel processing, since the numerator of the expression (5) becomes $\tau(p)$, the load balance contribution ratio Rb(p) becomes a lower limit value of 1/p. Besides, according to the expression (5), the load balance contribution ratio Rb(p) becomes the proportion of the parallel efficiency Ep(p), and this facilitates an intuitive grasp of the parallel performance.

The virtual parallelization ratio Rp(p) is a ratio of the sum of the processing times $\gamma_i$ of the parallel calculation parts to $\tau_1(1)$. In the case where this is less than 1, this indicates that the processing includes a processing, which cannot be processed in parallel. By this ratio, the upper limit of the parallel performance can be expressed as the acceleration ratio $A_p(p)$. The acceleration ratio $A_p(p)$ is an ideal upper limit value $A_p(p) = \tau(1)/\Sigma_{j\chi_{1,j}}(1) = 1/(1 - (\Sigma_{i\gamma_i}(p)/\tau(1))$ at the time when processors are infinitely applied. A normal value of $\tau(1)/\tau(p)$ becomes a value smaller than $A_p(p)$ because of the parallel performance impediment factors.

Since the parallel performance impediment factor contribution ratio Rj(p) is normalized by the sum of $\tau_i(p)$ with respect to i as expressed by the expression (7), irrespective of high parallelization or low parallelization, the contribution of the parallel performance impediment factor can be grasped by the ratio of the processing time. Besides, since this ratio becomes the proportion of the parallel efficiency, an impediment to the parallel performance can be quantitatively grasped.

All variables of the expressions (2), (5), (6-1) and (7) except $\tau(1)$ can be measured at the time of parallel execution.

When expression (8-1) is established, the virtual parallelization ratio Rp(p) becomes substantially 1 from the expression (6-1), and the expression (4-4) becomes equal to expression (8-2).

$$\tau(1) \cong \sum_{i=1}^{p} \gamma_i(p) \quad (8\text{-}1)$$

$$E_p(p) = R_b(p) \cdot \left(1 - \sum_{j=1}^{j_{Others}} R_j(p)\right) \quad (8\text{-}2)$$

That is, since the parallel efficiency $E_p(p)$ is not required to use the estimated value of $\tau(1)$, it can be accurately determined. On the other hand, irrespective of the condition expression (8-1), it is also possible to use the expression (8-2) as a substitute value for the expression (4-4) or (4-5) in the parallel performance evaluation. In this case, since the value of the expression (8-2) becomes a value equal to or less than the value of the expression (4-4) or (4-5) because of $Rp(p) \leq 1$.

The parallel efficiency $E_p(p)$ can also be calculated by the above described expressions (4-4), (4-5) and (8-2) and a following expression (9-1).

$$E_p(p) = R_b(p) \cdot \frac{1}{R_p(p)} \cdot \frac{\sum_{i=1}^{p} \gamma_i(p)}{\sum_{i=1}^{p} \tau_i(p)} \quad (9\text{-}1)$$

The expression (9-1) is a result of transformation of the expression (4-3) by using only the load balance contribution ratio Rb(p) and the virtual parallelization ratio Rp(p).

Besides, $\tau(1)$ becomes expression (10) from the expression (3).

$$\tau_1(1) = \gamma_1(1) + \sum_{j=1}^{j_{Others}} \chi_{1,j}(1) \quad (10)$$

Here, $\gamma_i(1)$ and $\chi_{i,j}(1)$ are modeled using $\gamma_i(p)$ and $\chi_{i,j}(p)$. Since it is impossible to make an actual measurement of $\tau_1(1)$ in a parallel processing by a computer having different CPU performances as in the grid or the cluster, $\tau(1)$ can be determined by this modeling, and it becomes possible to calculate the virtual parallelization ratio Rp(p) of the expression (6-1).

In an ideal case where processor performances are identical, when a parallel calculation part is processed by p processors, a processing time becomes 1/p as compared with p=1. In this case, $\tau_i(p) = \gamma_i(p)$, and when $\gamma_i(p)$ of an arbitrary processor is multiplied by a factor of p, $\gamma_1(1)$ can be obtained. On the other hand, computers having different CPU performances generally exist on the grid or the cluster, on the basis of $\gamma_i(p)$ actually measured in the p processors, $\gamma_1(1)$ in the case where the number of processors is 1 is presumed as in expression (11).

$$\gamma_1(1) \equiv \sum_{i=1}^{p} \gamma_i(p) \quad (11)$$

FIG. 4 is a conceptual view of this expression (11). By modeling of the expression (11), even in the case where performances of the respective processors are different from each other, the time of $\gamma_1(1)$ of one processor can be virtually determined.

Besides, $\chi_{1,j}(1)$ is divided into two parts of a redundancy processing and the others for modeling. It is assumed that all of processing times not belonging to $\gamma_i(1)$ are included in $\chi_{1,i}(1)$.

(1) Modeling of Redundancy Processing Time

When the respective processors perform the same processing, it is called a redundancy processing here. This processing is not a parallel processing, and even if the number of processors is increased, a processing time is not decreased. Then, j=1 is assigned to the redundancy processing, and its time $\chi_{1,1}(1)$ is modeled as in expressions (12-1) to (12-4).

$$\chi_{1,1}(1) \equiv \frac{1}{p} \cdot \sum_{i=1}^{p} \chi_{i,1}(p) \tag{12-1}$$

$$\chi_{1,1}(1) \equiv \underset{i=1}{\overset{p}{\text{Max}}}(\chi_{i,1}(p)) \tag{12-2}$$

$$\chi_{1,1}(1) \equiv \underset{i=1}{\overset{p}{\text{Min}}}(\chi_{i,1}(p)) \tag{12-3}$$

$$\chi_{1,1}(1) \equiv \chi_{ii,1}(p) \tag{12-4}$$

Where, ii is ii in a following expression.

$$\tau_{ii}(p) \equiv \underset{i=1}{\overset{p}{\text{Max}}}\left(\gamma_i(p) + \sum_{j=1}^{j_{Others}} \chi_{i,j}(p)\right)$$

The redundancy processing is a processing often performed in so-called data parallel in which processings having the same procedure (processing content) and different data are processed in parallel. In the case of the data parallel, in order to keep a load balance, it is assumed to be a parallel processing performed by processors having the same CPU performance. Then, it is possible to consider that a difference in redundancy processing time between the respective processors is due to a fluctuation caused by time measurements of the respective processors. In this case, it is proper to apply the expression (12-1) in which measurement values of the respective processors are averaged.

On the other hand, it is supposed that a processor having a different performance gets mixed in the grid or the cluster. In the case where an attempt to accurately grasp the influence of the processor having the different performance is made, the expressions (12-2) and (12-3) are used. When the expression (12-2) is used, the virtual parallelization ratio Rp(p) of the expression (6-1) is estimated to be a minimum, and the parallel efficiency Ep(p) becomes maximum. When the expression (12-3) is used, the virtual parallelization ratio Rp(p) is estimated to be a maximum, and the parallel efficiency Ep(p) becomes minimum. When these two parallel efficiencies Ep(p) are compared, it becomes possible to detect that the data parallel processing is performed by processors having different CPU performances.

Figure 5:
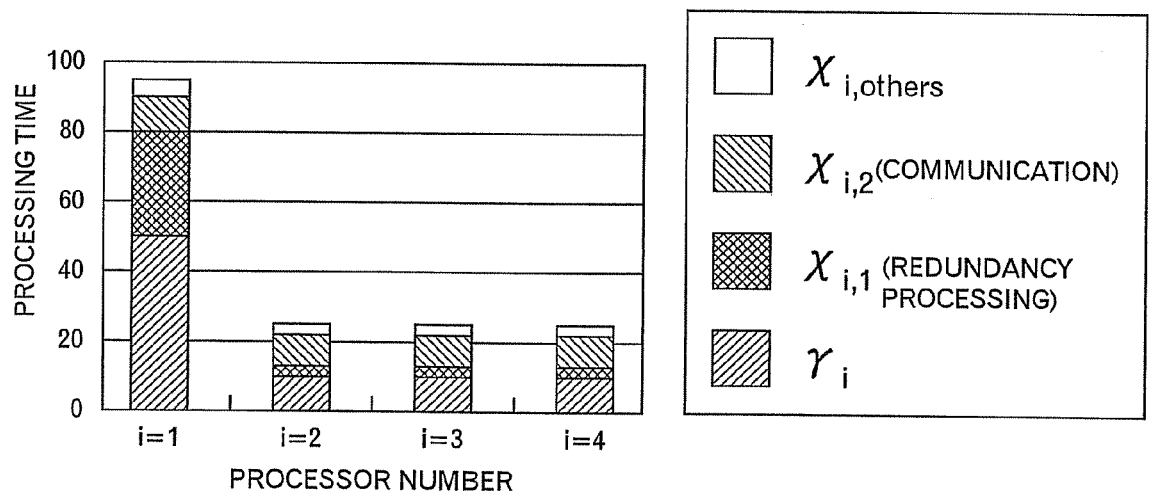
FIG. 5 is a drawing showing a state in which CPU performance varies and a data parallel processing is performed.

The processing time $\tau(p)$ is determined by the expression (2), and the redundancy processing time of the processor i is a value of the expression (12-4). Accordingly, when consideration is given to the analysis of data having determined the parallel efficiency $E_p(p)$, it is proper to use the expression (12-4). On the other hand, this expression means that $\chi_{1,1}(1)$ is determined by only information of the processor ii, and has a defect that a case greatly different from a value of another processor cannot be detected. As this example, FIG. 5 shows a case where a processor 1 (i=1) has CPU performance of ⅕. In the expression (12-4) a time of a redundancy processing is evaluated by only a value of the processor 1. In the expression (12-1), an evaluation is made by an average of respective values of four processors. In the expression (12-2), an evaluation is made by a value of the processor 1, and in the expression (12-3), an evaluation is made by values of the processors of i=2, 3 and 4. Accordingly, it is proper that the expression (12-1) is basically used, and another definition is used as the need arises.

(2) Modeling of $\chi_{1,j}(1)$ ($2 \leq j \leq j_{others}$)

When a processing time due to a parallel performance impediment factor is actually measured, there is a case of $\chi_{1,j}(1) \neq 0$. Since this processing time is not decreased even if a parallel processing is performed, it is reflected in the virtual parallelization ratio Rp(p) of the expression (6-1), the acceleration ratio Ap of the expression (6-2) becomes a finite value, and an upper limit value of the number of processors is determined which has a meaning when they are applied in the processing. Then, a processing time $\chi_{1,j}(1)$ ($2 \leq j \leq j_{others}$) due to a parallel performance impediment factor other than the redundancy processing is modeled into the expression (13-1) by the processing time $\chi_{1,j}(1)$ at p=1 and the expression (13-2) expressing the processing time at p>1, and $\chi_{1,j}(p)$ and a processing time $\chi_{i,j}(p)$ due to a parallel performance impediment factor occurring at p>1 and dependent on p are measured to obtain $\chi_{1,j}(1)$. That is, $\chi_{1,j}(1)=\chi_{i,j}(p)-X_{i,j}(p)$, and both of two items of the right side are obtained by measurement.

$$\chi_{i,j}(p) = X_{i,j}(p) + \chi_{1,j}(1) \tag{13-1}$$

$$X_{1,j}(1) = 0 \tag{13-2}$$

Figure 6A:
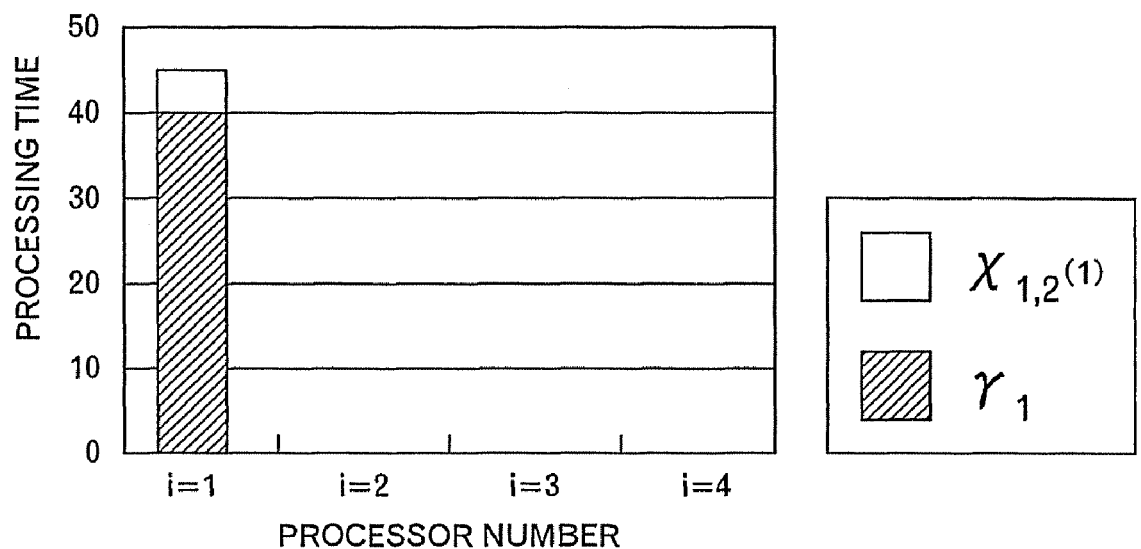
FIG. 6A is a drawing showing a processing time in the case where a processing is performed by one processor.
Figure 6B:
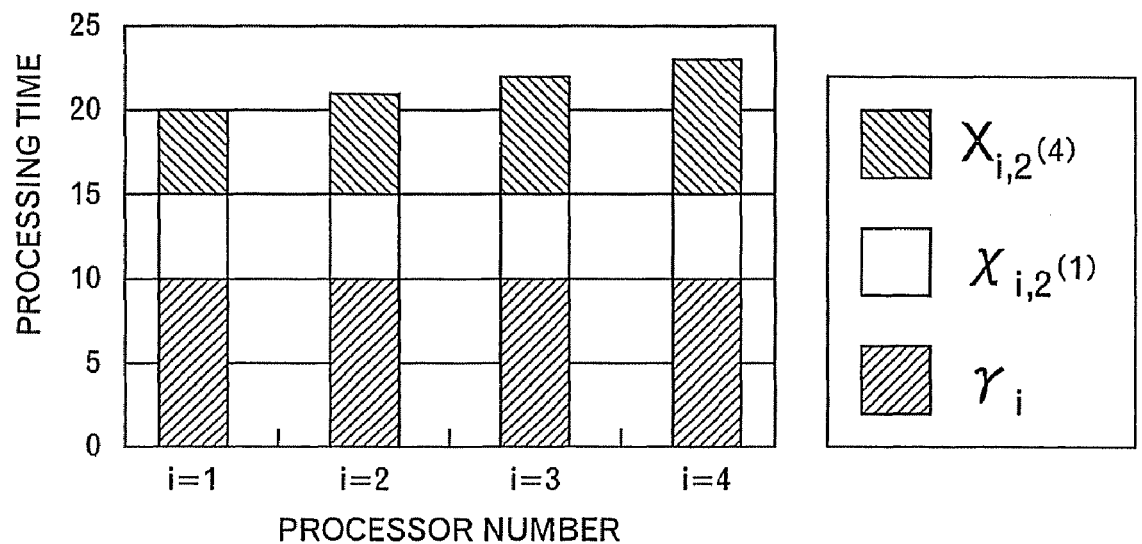
FIG. 6B is a drawing showing a processing time in the case where the processing is performed by four processors.

As an example, FIG. 6A shows processing times at p=1 in the case of $\chi_{1,j}(1) \neq 0$ and p=1, and FIG. 6B shows a processing times at p=4. As shown in FIG. 6B, $\chi_{i,2}(p)$ at the time of the parallel processing becomes as expressed by the expression (13-1) in which $X_{i,2}(p)$ is added to the processing time $\chi_{1,2}(1)$ at p=1. Such a phenomenon is observed in a case where a pre-preprocessing executed till communication hardware is activated in communication or the like is executed also at p=1.

From the expressions (13-1) and (13-2), similarly to the redundancy processing, $\chi_{1,j}(1)$ ($2 \leq j \leq j_{others}$) can be obtained by expressions (13-3), (13-4) and (13-5).

$$\chi_{1,j}(1) \equiv \frac{1}{p} \cdot \sum_{i=1}^{p} (\chi_{i,j}(p) - X_{i,j}(p)) \tag{13-3}$$

$$\chi_{1,j}(1) \equiv \underset{i=1}{\overset{p}{\text{Max}}}(\chi_{i,j}(p) - X_{i,j}(p)) \tag{13-4}$$

$$\chi_{1,j}(1) \equiv \underset{i=1}{\overset{p}{\text{Min}}}(\chi_{i,j}(p) - X_{i,j}(p)) \tag{13-5}$$

For example, in FIG. 6B, since $\chi_{i,2}(p)=\chi_{1,2}(1)+\chi_{i,2}(p)$ is obtained by an actual measurement, $X_{i,2}(p)=5$, 6, 7, 8 are actually measured, and $\chi_{1,2}(1)=5$ can be calculated from the expressions (13-3), (13-4) and (13-5). This value is coincident with $\chi_{1,2}(1)$ of FIG. 6A.

(3) Determination Method of $\chi_{i,jOthers}(p)$

The processing time $\chi_{i,jOthers}(p)$, which cannot be actually measured in the classification of parallel performance impediment factors, is obtained by expression (13-6).

$$\chi_{i,jOthers}(p) = \tau_i(p) - \gamma_i(p) - \sum_{j=1}^{jOthers-1} \chi_{i,j}(p) \tag{13-6}$$

Next, from the expression (11) obtained by the modeling, the expression (10) is transformed into a following expression.

$$\tau(1) = \sum_{i=1}^{p} \gamma_i(p) + \sum_{j=1}^{jOthers} \chi_{1,j}(1)$$

Besides, the expression (8-1) is transformed as follows:

$$\sum_{i=1}^{p} \gamma_i(p) + \sum_{j=1}^{jOthers} \chi_{1,j}(1) \cong \sum_{i=1}^{p} \gamma_i(p)$$

It is necessary to satisfy the condition of expression (14) in order to establish this expression. Since this conditional expression is a comparison between magnitudes of values calculated from measurement values, a judgment can be specifically made.

$$\sum_{i=1}^{p} \gamma_i(p) \gg \sum_{j=1}^{jOthers} \chi_{1,j}(1) \tag{14}$$

The processing time $\gamma_i(p)$ of this expression is obtained by an actual measurement. Besides, the sum of $\chi_{1,j}(1)$ with respect to j can be calculated from the modeling expressions (12-1), (12-2), (12-3), and (12-4) and the expressions (13-1), (13-2), (13-3), (13-4) and (13-5). As a result, the judgment of the expression (8-1) is first specifically enabled by using the expression (14). For example, in the following case, the condition of the expression (14) is established, the virtual parallelization ratio Rp(p) of the expression (6-1) becomes approximately 1, the expressions (4-4) and (4-5) become equal to the expressions (8-2), and an accurate parallel efficiency $E_p(p)$ can be obtained in the meaning that an influence of $\tau(1)$ as an estimated value becomes approximately zero.

$$\sum_{i=1}^{p} \gamma_i(p) = 1000, \quad \sum_{j=1}^{jOthers} \chi_{1,j}(1) = 10$$

Besides, $\tau(1)$ also becomes expression (15) which can be specifically calculated from the expressions (10), (11), (12-1), (12-2), (12-3), (12-4), (13-1), (13-2), (13-3), (13-4), (13-5) and expression (15) expresses $\tau(1)$ as the sum of the total sum of parallel processing times $\gamma_i(p)$ of the respective processors and the sum of processing times $\chi_{1,j}(1)$ due to the parallel efficiency impediment factors at p=1.

$$\tau(1) = \sum_{i=1}^{p} \gamma_i(p) + \sum_{j=1}^{jOthers} \chi_{1,j}(1) \tag{15}$$

From the above-described expressions (1), (2) and (15), following expression (9-2) is obtained.

$$E_p(p) \equiv \frac{\sum_{j=1}^{jOthers} \chi_{1,j}(1) + \sum_{i=1}^{p} \gamma_i(p)}{\tau(p) \cdot p} \tag{9-2}$$

The expressions (9-1) and (9-2) use the sum of the times $\gamma_i(p)$ of the parallel calculation part with respect to i, and as compared with the expressions (4-4) and (4-5), there is a merit that the parallel efficiency $E_p(p)$ is calculated without data of $\chi_{i,j}(p)$ However, data of $\chi_{1,j}(1)$ is necessary.

Figure 7A:
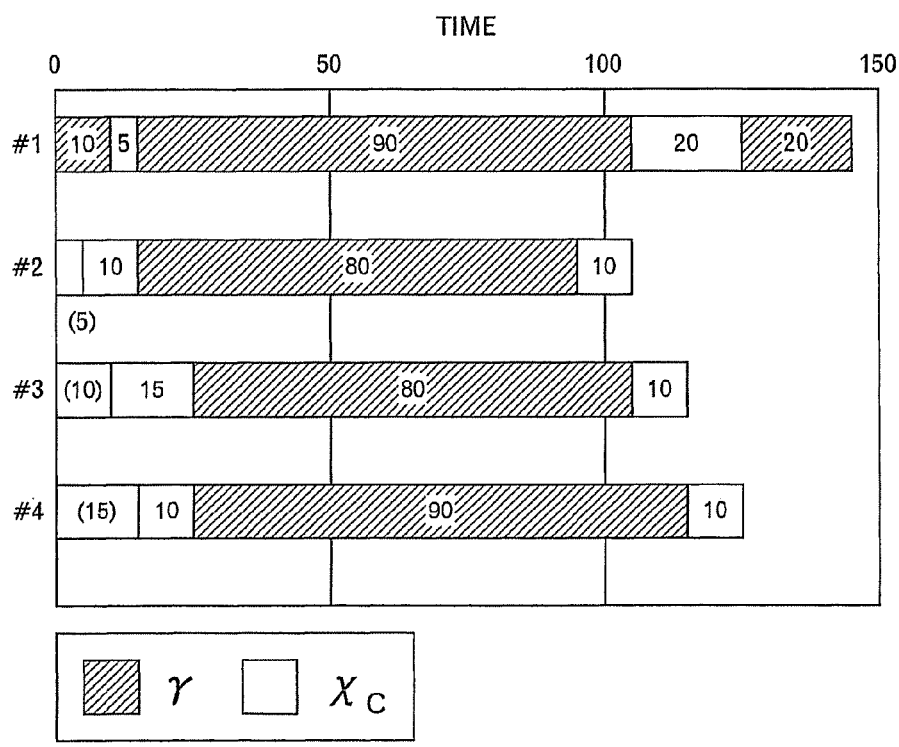
FIG. 7A is a drawing showing a processing time in the case where times of a parallel processing part $\gamma$ and a communication part $\chi_c$ are taken into consideration.
Figure 7B:
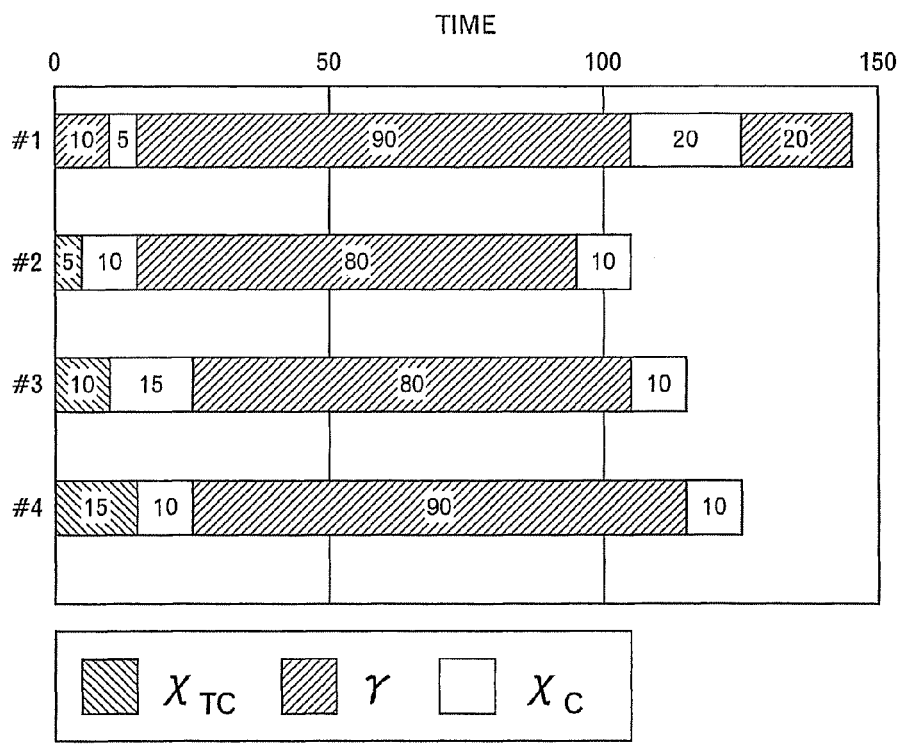
FIG. 7B is a drawing showing a processing time in the case where a task creation time $\chi_{TC}$ is further taken into consideration.

As indicated by the expressions (4-4), (4-5) and (7), in the invention, an arbitrary number of parallel performance impediment factors j can be added. FIGS. 7A and 7B show examples of adding the parallel performance impediment factor. FIG. 7B shows a case where a time measurement is made in view of a task creation time $\chi_{TC}$, and FIG. 7A shows a processing time in the case where a time measurement of the task creation time $\chi_{TC}$ is not made in the same processing. In the case of FIG. 7A, a following calculation is carried out.

$\tau_1=10+5+90+20+20=145$ $\tau_2=10+80+10=100$ $\tau_3=15+80+10=105$ $\tau_4=10+90+10=110$ $Rb(4)=(145+100+105+110)/(145\times4)=0.7931$ $Rc(4)=(25+20+25+20)/460=0.1975$ $Rp(4)=1$ $Ep(4)=0.7931\times1\times(1-0.1957)=0.6379$ Besides, in the case of FIG. 7B, a following calculation is carried out.

$\tau_1=10+5+90+20+20=145$ $\tau_2=5+10+80+10=105$ $\tau_3=10+15+80+10=115$ $\tau_4=15+10+90+10=125$ $Rb(4)=(145+105+115+125)/(145\times4)=0.8448$ $Rc(4)=(25+20+25+20)/490=0.1837$ $R_{TC}(4)=(0+5+10+15)/490=0.0612$ $Rp(4)=1$ $Ep(4)=0.8448\times1\times(1-0.1837-0.0612)=0.6379$ FIG. 8 shows values of these parallel performance evaluation indexes together. As compared with the values (case 1) calculated from FIG. 7A, it is understood that with respect to the values (case 2) calculated from FIG. 7B, although Rc is decreased and Rb is increased by the addition of $R_{TC}$ for the rising time, $E_p$ is the same. In this case, $E_p$ is not changed by adding the parallel performance impediment factor, but the details become clearer.

By expressing the load balance contribution ratio Rb(p) as indicated by the expression (5), the load balance and the parallel efficiency Ep(p) can be correlated with each other. The reason why the load balance contribution ratio Rb(p) is defined as the expression (5) is that it is possible to consider a case where as shown in FIG. 9, the load balance is kept in a state where contribution of the parallel performance impediment factor varies in the respective processors. In FIG. 9, for example, a parallel processing portion of a processor 1 is very small as compared with the others, and a redundancy processing is very large. However, since the processing times of all the processors are coincident with each other, the load balance is kept. That is, a state is such that although $\gamma_i(p)$ and $\chi_{i,j}(p)$ are not individually balanced, they are balanced in total. Incidentally, $\chi_{i,jothers}(p)$ $(=\tau_i-\gamma_i-\chi_{i,1}-\chi_{i,2})$ is a processing time due to, for example, I/O.

In the case of FIG. 9, the load balance contribution ratio Rb(p) is 1. As shown in FIG. 10, in the case where a processing is performed by only one processor in a parallel processing, Rb(p) becomes a lower limit 1/p. Besides, as shown in FIG. 11, although processing times of the processor 1 and the processor 2 are coincident with each other, they are not coincident with the processing times of the processors 3 and 4, and the load balance is not kept. In this case, Rb(p) becomes as follows:

$$R_b(p) = \frac{\sum_{i=1}^{p} \tau_i(p)}{\tau(p) \cdot p}$$
$$= \frac{100 + 100 + 80 + 70}{100 \times 4}$$
$$= 0.8750$$

Further, there is a case where a parallel performance impediment factor, which does not become apparent in a low parallel, becomes apparent in a high parallel. In the parallelization ratio (=(processing time of parallel processing part at p=1)/((processing time of parallel processing part at p=1)+ (processing time of portion which can not be processed in parallel at p=1))), which is one of conventional performance evaluation indexes, this phenomenon cannot be sufficiently grasped. For example, in an example of FIG. 12, the parallelization ratio at p=1 is 0.99 (=198/(198+2)), and the remainder of 0.01 is a ratio of a processing time which cannot be processed in parallel. However, this value is two hours even in a high parallel such as the case of p=100 in the drawing, and does not reflect the reality that a portion which can not be processed in parallel occupies 50% (≈2/(1.98+2)). In the invention, as shown in the expression (7), the parallel performance impediment factor $R_j(p)$ is expressed as a value obtained by normalizing the sum of $\chi_{i,j}(p)$ with respect to i using the sum of $\tau_i(p)$ with respect to i. By this normalization, also when $\tau(p)$ becomes a small value in a high parallel, an upper limit of $R_j(p)$ becomes 1, and influences of the respective parallel performance impediment factors can be expressed by a percentage at the time of the parallel processing.

As described above, the parallel efficiency $E_p(p)$ is calculated, and parallel performance evaluation indexes Rb(p), Rp(p), Rj(p) ($R_{RED}(4)$, Rc(4), . . . , $R_{others}(4)$), and auxiliary indexes $A_p(p)$ and $E_p(p) \cdot p$ can also be calculated. FIG. 13 shows an example of this calculation result. The parallel performance can be quantitatively expressed by the eight items shown in FIG. 13.

As shown in FIG. 13, since $E_p(p) \cdot p = 1.777$, it is understood that although the parallel computer system has a four-processor configuration, the processing is performed by a performance of 1.777 processors. The parallel efficiency is lowered to 94% (Rb(4)=0.9392) by the load balance contribution ratio. The influence of the parallel performance impediment factor is a redundancy processing of 22% ($R_{RED}(4)$=0.2230), a communication of 33% (Rc(4)=0.3309), and the others of 3% ($R_{others}(4)$=0.0288). Accordingly, the communication and redundancy processing lower the parallel performance by 55%. In FIG. 13, since $R_p(4)$=0.8821, it is possible to estimate that the parallel maximum performance at the time when processors are infinitely applied is 8.482 (=$A_p(4)$=1/(1−0.8821)) times higher than that of one processor. Accordingly, it is understood that this processing is a processing to be performed with 8 processors or less.

Besides, in the case where a setting target value $(E_p)_T$ of the parallel efficiency is set to 0.8, when a processing group as shown in FIG. 13 is supposed, the optimum number of processors is calculated by a following expression.

$$(p)_{OPT} = E_p(4)/(E_p)_T \cdot p$$
$$= 0.4443/0.8 \times 4$$
$$= 2.215$$

Accordingly, an estimated value of the optimum number of processors becomes $(p)_{OPT}$=2.

Incidentally, the processing group means plural processings in which the same function is used in the same application program and only input data is changed, and is a processing frequently executed in parametric studies of scientific calculation and so on.

Conventionally, the evaluation of a parallel computer system has been performed by a working rate (Net Working Rate) $NWR_{system}$ indicated by following expression (16). However, since there is also a case where a processing having a low parallel efficiency is included, even if the working rate is good, the operational efficiency of the system is not necessarily high.

$$NWR_{System} \equiv \frac{\sum_{k=1}^{K_{max}}\left[\sum_{i=1}^{p} \tau_i(p)\right]_k}{\sum_{i=1}^{P_{System}} T_i} \quad (16)$$

Figure 14:
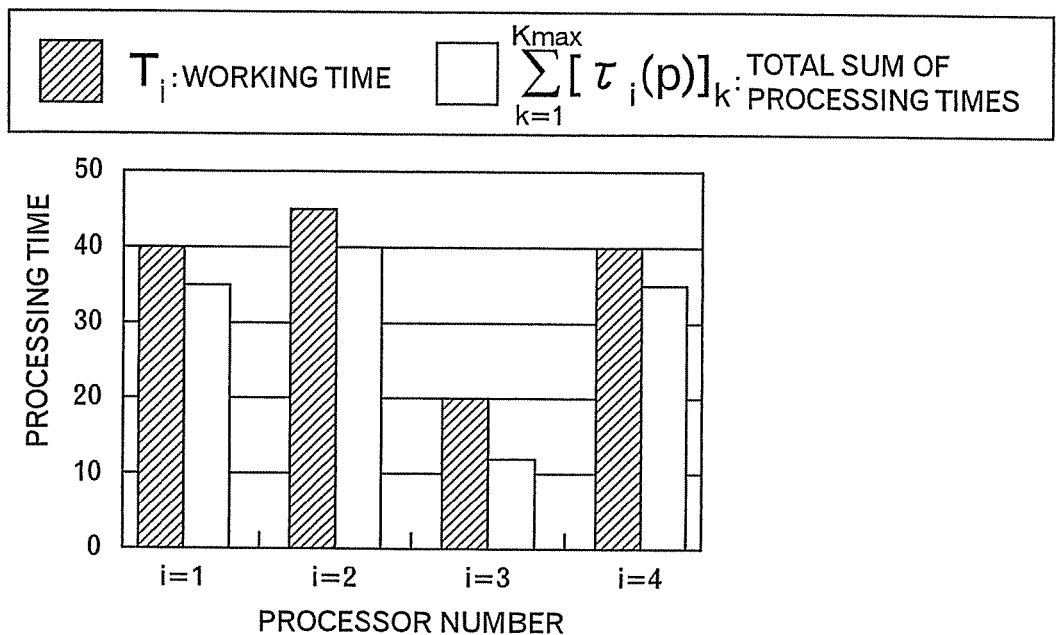
FIG. 14 is a drawing showing the relation between a working time and the sum total of processing times.

FIG. 14 shows an example of a working time and the total sum (following expression) of processing times.

$$\sum_{k=1}^{K_{max}} \left[ \sum_{i=1}^{p} \tau_i(p) \right]_k$$

In FIG. 14, the total sum of the processing times is decreased relative to the working time Ti. The degree of the decrease varies for processors.

According to the invention, the index of the system operational efficiency $E_{system}$ is introduced on the basis of the expression (16), and it becomes possible to evaluate the operational efficiency of the system. It becomes possible to give a specific guideline for improvement of the operational efficiency, for example, it is possible to give a guideline that for the improvement of the index, parallel efficiency of which processing must be improved to what extent.

$$E_{System} \equiv \frac{\sum_{k=1}^{K_{max}} \left[ E_p(p) \cdot \sum_{i=1}^{p} \tau_i(p) \right]_k}{\sum_{i=1}^{p_{System}} T_i} \quad (17)$$

For example, if $P_{system}=4$, $Ti=10$, $K_{max}=2$, and a following condition is further satisfied, then $E_{system}=(5+9)/(10+10+10+10)=0.35$.

$$\left[ E_p(p) \cdot \sum_{i=1}^{p} \tau_i(p) \right]_1 = 0.5 \times (4+3+2+1) = 5$$

$$\left[ E_p(p) \cdot \sum_{i=1}^{p} \tau_i(p) \right]_2 = 1 \times (9) = 9$$

Incidentally, a conventional working rate becomes $NWR_{system}=(10+9)/40=0.4838$. By considering the parallel efficiency, it is possible to estimate the operational efficiency of the system, in which consideration is given to a time wasted in each processing by the parallel processing.

Figure 15:
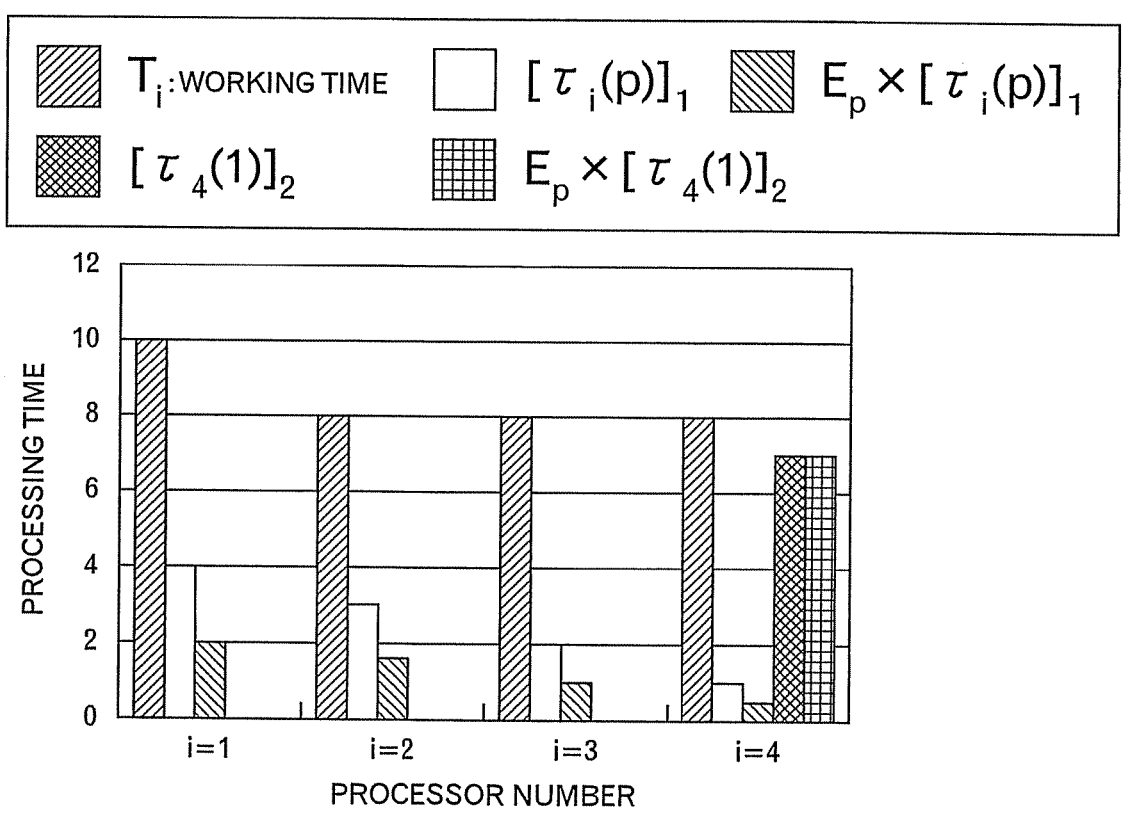
FIG. 15 is a drawing showing the relation among a working time, a processing time and a processing time with consideration given to a parallel efficiency.

FIG. 15 shows the above-described working time, the sum of $\tau_i(p)$ in processing 1 as the parallel processing, the product of $\tau_i(p)$ in the processing 1 and the parallel efficiency, the sum of $\tau_i(p)$ in processing 2 (only running on the processor 4) as a non-parallel processing, and the product of $\tau_i(p)$ in the processing 2 and the parallel efficiency. In FIG. 15, in the case of the parallel processing, $\tau_i(p)$ is shorter than the working time Ti, and when the parallel efficiency is further considered, it becomes further short since a wasteful processing time is removed. On the other hand, in the case of the non-parallel processing, since the parallel efficiency becomes 1, both $\tau_i(p)$ in the processing 2 and the product of $\tau_i(p)$ and the parallel efficiency become the same value.

As base data of processor add-on of a parallel computer system, a working rate of a system has been conventionally used. However, since effectively used resources of the system are not the bases, there is a possibility that resource add-on or replacement is made for a processing having a low parallel efficiency. According to the invention, it becomes possible to give a quantitative guideline to the processor add-on of the parallel computer system. When the number of all processors in the system is $P_{system}$, Ti is a working time of each processor, $P_{Add}$ is the number of processors after add-on, $k_{max}$ is the number of all processings, and $\alpha$ is a predicted parallel efficiency, an acceleration ratio $A_{system}$ at the time when an increase of the working time $$\sum_{i=p_{System}+1}^{P_{Add}} T_i$$

is made by additional processors, becomes as shown in expression (18).

$$A_{system} \equiv \frac{\sum_{k=1}^{K_{max}} \left[ E_p(p) \cdot \sum_{i=1}^{p} \tau_i(p) \right]_k + \alpha \cdot \sum_{i=p_{System}+1}^{P_{Add}} T_i}{\sum_{i=1}^{p_{System}} T_i} \quad (18)$$

For example, if $\alpha=1$ under conditions as indicated below, then the acceleration ratio $A_{system}$ is calculated as follows:

$$\sum_{i=1}^{p_{System}} T_i = 40, \quad \sum_{i=p_{System}+1}^{P_{Add}} T_i = 10, \quad \sum_{k=1}^{K_{max}} \left[ E_p(p) \cdot \sum_{i=1}^{p} \tau_i(p) \right]_k = 39$$

$$A_{system}=(39+1\times10)/40=1.23$$

As stated above, system expansion of about 23% is obtained. This value becomes a value more persuasive than a conventional working rate in relation to the expansion in a viewpoint that the parallel efficiency of the processing before the expansion is considered. When the acceleration ratio is calculated by multiplying a system expansion by a predicted parallel efficiency $\alpha$, a more realistic value is obtained. Besides, when the CPU capability of the expanded processors is made ten times as higher, $A_{system}$ can also be obtained under $\alpha=10$. In the above example, $A_{system}=(39+10\times10)/40=3.48$. By this, also with respect to the expansion of processors having different CPU performances, it becomes possible to prepare predicted data with a base more reliable than that based on the working rate.

Besides, according to the invention, it becomes also possible to give a quantitative guideline to a replacement of a parallel computer system. By the indexes (parallel efficiency, load balance contribution ratio, virtual parallelization ratio, parallel performance impediment factor contribution ratio, $\tau_i(p)$, $\gamma_i(p)$, $\chi_{i,j}(p)$ working time Ti of each processor) calculated for each processing, it becomes possible to predict a parallel efficiency for each processing as indicated in a following example, and it becomes possible to estimate performance of the system after the system replacement.

Figures 16, 17, 18:
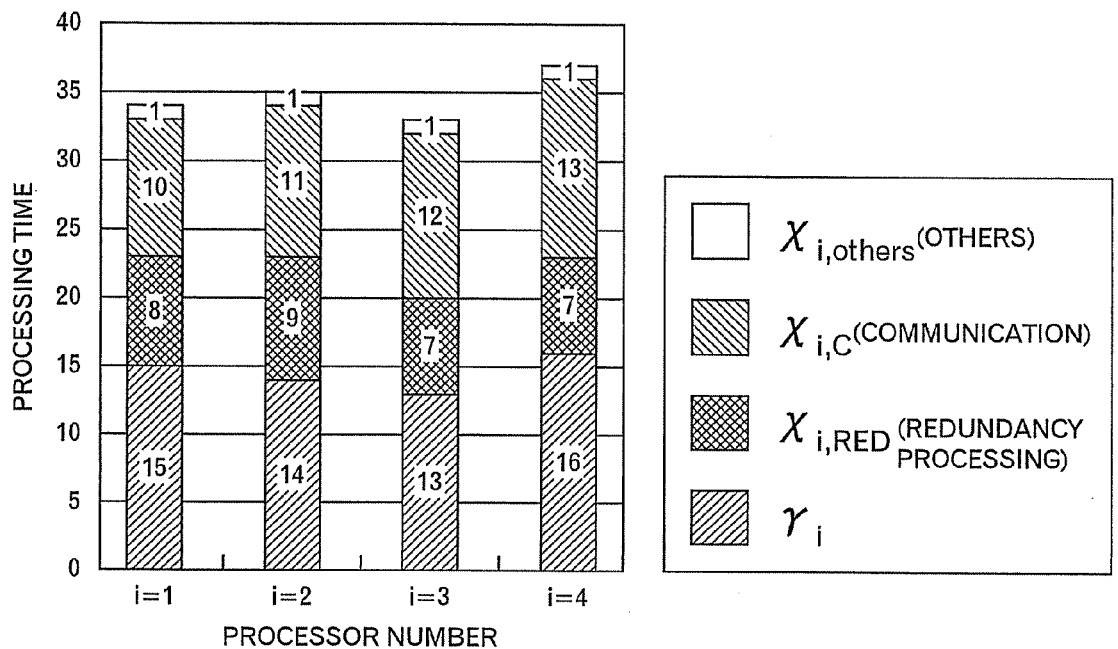
FIG. 16 is a drawing showing an example of a processing time in the case where data parallel is executed by a distributed memory parallel computer system.
FIG. 17 is a drawing for comparison between a parallel performance evaluation index based on the original state CPU performance and an estimated parallel performance evaluation index in the case where the replacement with a system having CPU performance five times higher is made.
FIG. 18 is a drawing showing data for a trial calculation in the case where the replacement with a system having CPU performance five times higher is made.

For example, when consideration is given to the introduction of a system having CPU performance five times higher than that of a system in which elapsed times as shown in FIG. 16 are measured, $\chi_i(p)$, $\chi_{i,RED}(p)$, and $\chi_{i,Others}(p)$ become ⅕. On the other hand, when it is assumed that $\chi_{i,c}(p)$ depends on network performance and the performance is the same this time, a parallel efficiency of a new system can be estimated as follows:

Incidentally, if $\chi_{i,c}(1)=0$, and $\chi_{i,Others}(1)=0$, then the performance evaluation index in the case where the CPU performance becomes five times as higher can be calculated as follows. Besides, by the above-described expression (12-1), $\chi_{i,RED}(1)$ can be expressed as follows. Besides, the load balance contribution ratio is calculated in accordance with the expression (5), the virtual parallelization ratio is calculated in accordance with the expression (6-1), the parallel performance impediment factor contribution ratio (redundancy processing, communication, others) is calculated in accordance with the expression (7), and the parallel efficiency is calculated in accordance with the expressions (4-4) and (9-1) as follows.

$$\chi_{1,RED}(1) \equiv \frac{1}{p} \cdot \sum_{i=1}^{p} \chi_{i,RED}(p)$$

$$= \frac{1}{4} \cdot (8+9+7+7)/5$$

$$= 1.550$$

$$R_b(p) = \frac{\sum_{i=1}^{p} \tau_i(p)}{\tau(p) \cdot p}$$

$$= \frac{(15+8+1)/5 + 10 + (14+9+1)/5 + 11 + (13+7+1)/5 + 12 + (16+7+1)/5 + 13}{((16+7+1)/5 + 13) \cdot 4}$$

$$= \frac{14.8 + 15.8 + 16.2 + 17.8}{17.8 \cdot 4}$$

$$= 0.9073$$

$$R_p(p) = \frac{\sum_{i=1}^{p} \gamma_i(p)}{\tau(1)}$$

$$= \frac{(15+14+13+16)/5}{(15+14+13+16)/5 + 7.75/5}$$

$$= \frac{58/5}{(58+7.75)/5}$$

$$= 0.8821$$

$$R_{RED}(p) = \frac{\sum_{i=1}^{4} \chi_{i,RED}(p)}{\sum_{i=1}^{4} \tau_i(p)}$$

$$= \frac{(8+9+7+7)/5}{64.6}$$

$$= 0.0960$$

$$R_C(p) = \frac{\sum_{i=1}^{p} \chi_{i,C}(p)}{\sum_{i=1}^{p} \tau_i(p)}$$

$$= \frac{10+11+12+13}{64.6}$$

$$= 0.7121$$

$$R_{Others}(p) = \frac{\sum_{i=1}^{p} \chi_{i,others}(p)}{\sum_{i=1}^{p} \tau_i(p)}$$

$$= \frac{(1+1+1+1)/5}{64.6}$$

$$= 0.0124$$

-continued $$E_p(p) = R_b(p) \cdot \frac{1}{R_p(p)} \cdot (1 - R_{RED}(p) - R_C(p) - R_{Others}(p))$$

$$= 0.9073 \cdot \frac{1}{0.8821} \cdot (1 - 0.0960 - 0.7121 - 0.0124)$$

$$= 0.1846$$

$$E_p(p) = R_b(p) \cdot \frac{1}{R_p(p)} \cdot \frac{\sum_{i=1}^{p} \gamma_i(p)}{\sum_{i=1}^{p} \tau_i(p)}$$

$$= 0.9073 \cdot \frac{1}{0.8821} \cdot \frac{58/5}{64.6}$$

$$= 0.1847$$

The above-described calculation results and performance indexes based on the actual measurement are collected as shown in FIG. 17. As shown in a table of FIG. 17, by predicting the parallel performance when the system is replaced, the operational efficiency $E_{system}$ of a new system can be estimated. For that purpose, log data of the previous system is used, and all performance indexes to the previous processing are calculated similarly to FIG. 17.

When a trial calculation is carried out to obtain the system operational efficiency $E_{system}$ at the time when the CPU performance is made five times as higher, it becomes as follows. By comparing the $E_{system}$ calculated on the basis of the estimated values with the $E_{system}$ calculated from previous actual values, data with a more reliable base as compared with the working rate can be obtained for the replacement of the system.

As shown in FIG. 18, $E_{system}$ can be calculated in accordance with $E_p(4)$ of each processing in the case where the CPU performance becomes five times higher, the sum of $\tau_i(p)$ with respect to i, and the number of processors. Incidentally, a following condition is used as a premise.

$$p_{System} = 10, \quad \sum_{i=1}^{p_{System}} T_i = 4000, \quad k_{max} = 4$$

$$E_{System} \equiv \frac{\sum_{k=1}^{K_{max}} \left[ E_p(p) \cdot \sum_{i=1}^{p} \tau_i(p) \right]_k}{\sum_{i=1}^{p_{System}} T_i}$$

$$= \frac{0.1846 \times 64.6 + 0.7219 \times 2000.3 + 0.3000 \times 512.1 + 1 \times 1000}{4000}$$

$$= 0.6524$$

DESCRIPTION OF EMBODIMENTS

Figure 19:
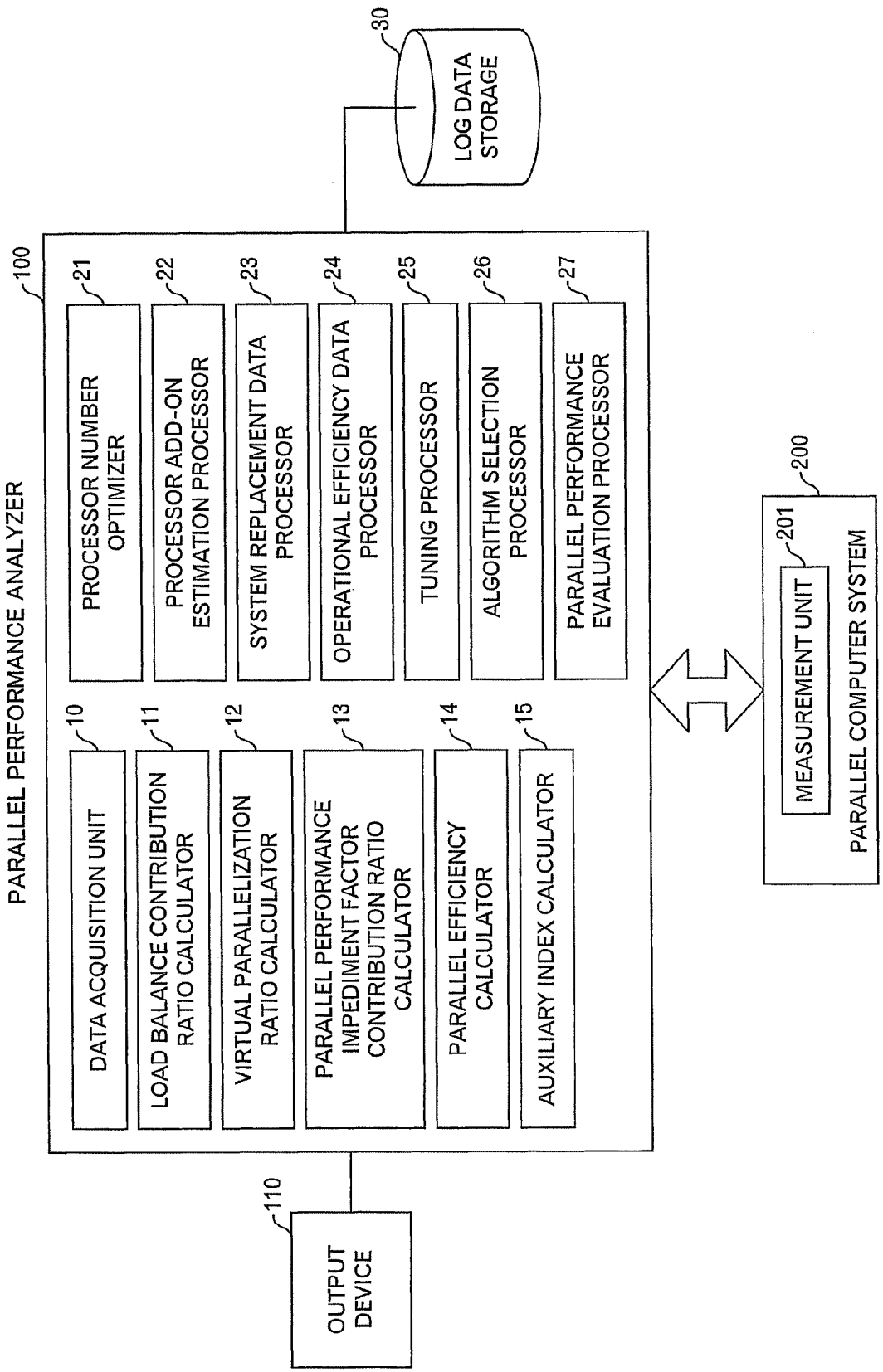
FIG. 19 is a functional block diagram of an embodiment of the invention.

FIG. 19 is a drawing showing a system outline of one embodiment of the invention. A parallel performance analyzer 100 is a computer with a single processor for analyzing parallel performance of a parallel computer system 200, and is connected to an output device 110 such as a printer or a display device. However, the parallel performance analyzer 100 may be a parallel computer. The parallel performance analyzer 100 includes a data acquision unit 10, a load balance contribution ratio calculator 11, a virtual parallelization ratio calculator 12, a parallel performance impediment factor contribution ratio calculator 13, a parallel efficiency calculator 14, an auxiliary index calculator 15, a processor number optimizer 21, a processor add-on estimation processor 22, a system replacement data processor 23, an operational efficiency data processor 24, a tuning processor 25, an algorithm selection processor 26, and a parallel performance evaluation processor 27. The parallel performance analyzer 100 is connected to a log data storage 30. The parallel computer system 200 includes a measurement unit 201. For example, the parallel performance analyzer 100 is connected to the parallel computer system 200 through a network.

The measurement unit 201 of the parallel computer system 200 measures respective processing times $\chi_i(p)$, $\chi_{i,j}(p)$, and $\tau_i(p)$, while executing a parallel processing in accordance with a program. For example, a time from a start to an end of each processing is measured by a timer, or a start time and an end time of each processing are recorded, and a processing time is computed after the end of the processing. The measurement of the time may be performed by software including the operating system (OS) or hardware. Data of measured processing times is once stored in a memory of the parallel computer system 200, and/or is stored in other storage devices according to circumstances.

Besides, there is also a case where instead of the measurement of the processing times, events of a program under execution are confirmed at predetermined time intervals, and the respective events are counted. Such a measurement is called a measurement by sampling. It becomes possible to adopt such a measurement by sampling since the expressions (4-4), (9-1), and (9-2) and Rb(p), Rp(p) and Rj(p) have forms of time ratios. Although there is a difference due to measurement accuracy, the method by the time measurement and the method by the sampling have the same result.

FIG. 20 is a conceptual view of the measurement by the sampling. FIG. 20 shows a state in which a time passes from the left to the right. In FIG. 20, a downward arrow indicates timing of the sampling, and the sampling is performed at predetermined time intervals as indicated by the intervals between the downward arrows. In FIG. 20, after a redundancy processing is first executed for $\chi_{i,RED}(p)$, a parallel calculation is carried out for $\gamma_i(p)$. Incidentally, the processing is executed for $\tau_i(p)$ in total. The number of times of sampling is seven in the event of the redundancy processing continuing for $\chi_{i,RED}(p)$ and nine in the event of the parallel calculation continuing for $\gamma_i(p)$. In the whole processing time $\tau_i(p)$, the number of times of sampling is 22. In the parallel performance impediment factors, events other than intentionally measured $\chi_{i,RED}(p)$ are collectively expressed by $\chi_{i,others}(p)$, and it is calculated from the expression (13-6) using $\chi_{i,RED}(p)$ and $\gamma_i(p)$. In the example of FIG. 20, it is understood that the number of times of sampling during $\chi_{i,others}(p)$ is six (=22−9−7).

The summary of how to carry out the measurement actually by the sampling will be described below.
(1) Portion of $\tau_i(p)$ (a) A flag for an event $\tau_i(p)$ is turned ON at a start of a processing, and is turned OFF at an end of the processing. At the time of execution, it is discriminated at predetermined time intervals whether the flag for the event $\tau_i(p)$ is ON/OFF, and the number of times that it is discriminated that the flag is ON is counted to obtain the number of times of sampling.

A description and a processing in the following methods are combined as the need arises, and a measurement is made.

A programmer detects a start and an end of a processing in a program, that is, a position where the flag is to be turned ON/OFF, and gives a description for turning the flag ON/OFF.

In the case where a parallel language extension, a complier directive or the like is used, a tool interprets the parallel language extension, the complier directive or the like, and gives a description for turning the flag ON/OFF.

In the case where a parallel language extension, a complier directive or the like is used, a complier interprets the parallel language extension, the complier directive or the like, and gives a description for turning the flag ON/OFF.

A complier detects a start and an end of a processing in a program, that is, a position where the flag is to be turned ON/OFF, and gives a description for turning the flag ON/OFF.

An OS detects a start and an end of a processing in a program, that is, a position where the flag is to be turned ON/OFF, and gives a description for turning the flag ON/OFF.

A runtime library detects a start and an end of a processing in a program, that is, a position where the flag is to be turned ON/OFF, and gives a description for turning the flag ON/OFF.

Hardware detects a start and an end of a processing in a program, that is, a position where the flag is to be turned ON/OFF, and gives a description for turning the flag ON/OFF.

A description for a processing of discriminating that the flag is ON and counting the number of times is given at a complier level.

A description for a processing of discriminating that the flag is ON and counting the number of times is given at an OS level.

A description for a processing of discriminating that the flag is ON and counting the number of times is given at a runtime library level.

A description for a processing of discriminating that the flag is ON and counting the number of times is given at a hardware level.

A description for a processing of discriminating that the flag is ON and counting the number of times is given at a tool level.

A description for a processing of discriminating that the flag is ON and counting the number of times is given at a program level.

A processing of discriminating that the flag is ON and counting the number of times is executed at a hardware level.

(b) An event is specified by a program name or an execution module name substituting for that, and at the time of execution, the program name or the execution module name is discriminated at predetermined time intervals, and the number of times that the name is discriminated is counted to obtain the number of times of sampling.

A name creation method in the following methods, a discrimination processing and a count processing are combined as the need arises, and a measurement is made.

A complier creates the program name or the execution module name.

An OS creates the program name or the execution module name.

A runtime library creates the program name or the execution module name.

Hardware creates the program name or the execution module name.

The program name or the execution module name is created by a description of a parallel language extension or a complier directive.

The program name or the execution module name is created by a description of a programmer.

A description for a discrimination processing of the created program name or execution module name and a count processing is given at a complier level.

A description for a discrimination processing of the created program name or execution module name and a count processing is given at an OS level.

A description for a discrimination processing of the created program name or execution module name and a count processing is given at a runtime library level.

A discrimination processing of the created program name or execution module name and a count processing is executed at hardware level.

A description for a discrimination processing of the created program name or execution module name and a count processing is given at a tool level.

A description for a discrimination processing of the created program name or execution module name and a count processing is given at a program level.

A discrimination processing of the created program name or execution module name and a count processing is executed at a hardware level.

(2) Portion of $\chi_{i,j}(p)$ and $\gamma_i(p)$ (a) Each time an event $\chi_{i,j}(p)$, $\gamma_i(p)$ appears, a flag for that is turned ON at the start of the processing, and the flag for that is set OFF at the end of the processing.

It is assumed that at the time of execution, it is discriminated at predetermined time intervals whether a flag for each event is ON/OFF, and the number of times that it is discriminated that the flag is ON is counted to obtain the number of times of sampling. Since there is a case where the event $\chi_{i,j}(p)$ and $\gamma_i(p)$ cannot be detected by one method, a description and a processing in the following methods are combined as the need arises and a measurement is made.

A programmer detects the start and the end of a processing in a program, that is, a position where the flag is to be turned ON/OFF, and gives a description for turning the flag ON/OFF.

In the case where a parallel language extension or a complier directive is used, a tool interprets the parallel language extension or the complier directive, and gives a description for turning the flag ON/OFF.

In the case where a parallel language extension or a complier directive is used, a complier interprets the parallel language extension or the complier directive, and gives a description for turning the flag ON/OFF.

The complier detects a start and an end of a processing in a program, that is, a position where the flag is to be turned ON/OFF, and gives a description for turning the flag ON/OFF.

An OS detects a start and an end of a processing in a program, that is, a position where the flag is to be turned ON/OFF, and gives a description for turning the flag ON/OFF.

A runtime library detects a start and an end of a processing in a program, that is, a position where the flag is to be turned ON/OFF, and gives a description for turning the flag ON/OFF.

Hardware detects a start and an end of a processing in a program, that is, a position where the flag is to be turned ON/OFF, and gives a description for turning the flag ON/OFF.

A description for a processing of discriminating that the flag is ON and counting the number of times is given at a complier level.

A description for a processing of discriminating that the flag is ON and counting the number of times is given at an OS level.

A description for a processing of discriminating that the flag is ON and counting the number of times is given at a runtime library level.

A description for a processing of discriminating that the flag is ON and counting the number of times is given at a hardware level.

A description for a processing of discriminating that the flag is ON and counting the number of times is given at a tool level.

A description for a processing of discriminating that the flag is ON and counting the number of times is given at an application program level.

A processing of discriminating that the flag is ON and counting the number of times is executed at a hardware level.

(b) Known module names are previously classified into a parallel processing part or a processing part relating to a parallel performance impediment factor, the module names are discriminated at the time of execution, and discrimination of the respective module names are counted to obtain the number of times of sampling. A classifying method set forth below, a discrimination processing and a count processing are combined as the need arises, and a measurement is made.

A classification of module names is made at a complier level.

A classification of module names is made at an OS level.

A classification of module names is made at a runtime library level.

A classification of module names is made at a hardware level.

A classification of module names is made at a parallel language extension or complier directive level.

A classification of module names is made at a user level.

A description for a discrimination processing of the module name and a count processing is given at a complier level.

A description for a discrimination processing of the module name and a count processing is given at an OS level.

A description for a discrimination processing of the module name and a count processing is given at a runtime library level.

A description for a discrimination processing of the module name and a count processing is given at a hardware level.

A description for a discrimination processing of the module name and a count processing is given at a tool level.

A description for a discrimination processing of the module name and a count processing is given at a program level.

A description for a discrimination processing of the module name and a count processing is given at a hardware level.

As an example, by using a program which describes a processing of adding respective elements of F (Imax) existing in all processors in Fortran and MPI (Message Passing Interface) of a parallel library, a sampling method of $\chi_{i,j}(p)$ will be described in following table 1. For example, an ON flag is expressed by "*sampon" to give an instruction to a complier, and an OFF flag is expressed by "*sampoff". Besides, RED denotes a redundancy processing, C denotes communication, and a numeral after RED or C denotes appearing order. Since a portion of a summation processing is a redundancy processing in which the same calculation is carried out in the respective processors, "*sampon (RED), 2" and "*sampoff (RED), 2" are arranged at the start point and the end point, and the flag is turned ON/OFF. Since calculation of a variable of nLOCAL is also a redundancy processing, "*sampon (RED), 1" and "*sampoff (RED), 1" are arranged at the start point and the end point, and the flag is turned ON/OFF. Further, MPI_ALLTOALL is a communication library, and here, "*sampon (C), 1", "*sampoff (C), 1", "*sampon (C), 2" and "*sampoff (C), 2" are arranged, and the flags are turned ON/OFF. Incidentally, in the case of MPI_ALLTOALL, it is also possible for a tool, a complier or an OS to discriminate an event and to set a flag.

TABLE 1

```
    subroutine GSUM(Imax, F, FW, NP)
    real*8 F(Imax), FW(Imax)
    include 'mpif.h'
*sampon (RED), 1
    nLOCAL = (Imax + NP − 1)/NP
*sampoff (RED), 1
*sampon (c), 1
    call MPI_ALLTOALL (F, nLOCAL,
    MPI_DOUBLE_PRECISION,
 &                     FW, nLOCAL, MPI_DOUBLE_PRECISION,
 &                     MPI_COMM_WORLD, IERR)
*sampoff (C), 1
*sampon (RED), 2
    do j = 2, NP
        k = (j − 1) *nLOCAL
        do i = 1, nLOCAL
            FW(i) = FW(i) + FW(i + k)
        end do
    end do
    do j = 2, NP
        k = (j − 1) *nLOCAL
        do i = 1, nLOCAL
            FW(i + k) = FW(i)
        end do
    end do
*sampoff (RED), 2
*sampon (C), 2
    call MPI_ALLTOALL (FW, nLOCAL,
    MPI_DOUBLE_PRECISION,
 &                     F, nLOCAL, MPI_DOUBLE_PRECISION
 &                     MPI_COMM_WORLD, IERR
*sampoff (C), 2
    return
    end
```

FIG. 21 shows an example of sampling when the program of table 1 is executed. In FIG. 21, a count is made for each of events "(RED), 1", "(RED), 2", "(C), 1", and "(C), 2". However, when a parallel efficiency or the like is calculated, they are handled as total redundancy processing "(RED), 1+(RED), 2", and total communication processing "(C), 1+(C), 2".

Returning to the description of FIG. 19, the data acquisition unit of the parallel performance analyzer 100 acquires respective processing times $\chi_i(p)$, $\chi_{i,j}(p)$, and $\tau_i(p)$, which are measured as a processing time or a sampling number by the measurement unit 201 as described above, from the parallel computer system 200, and stores them in the log data storage 30 connected to the parallel performance analyzer 100. In addition to the respective processing times, data such as parallel performance evaluation indexes including a calculated parallel efficiency are also stored in the log data storage 30. As described above, the load balance contribution ratio calculator 11 calculates the load balance contribution ratio Rb(p) in accordance with the expression (5) and stores it in the storage device. Incidentally, $\tau(p)$ is calculated in accordance with the expression (2). The virtual parallelization ratio calculator 12 calculates the virtual parallelization ratio Rp(p) in accordance with the expression (6-1) and stores it in the storage device. Incidentally, with respect to $\tau(1)$ of the denominator of the expression (6-1), there is also a case where an approximation as indicated in the expression (8-1) is performed. Besides, there is also a case where the expression (10) and expressions (11) to (15) are used. Incidentally, with respect to the second term $(\chi_{1,j}(1), j=1)$ in the expression (15), there is also a case where a calculation is carried out by one of the expressions (12-1), (12-2), (12-3) and (12-4). Besides, with respect to $\chi_{1,j}(1), j>1$, there is also a case where a calculation is carried out by one of the expressions (13-3) to (13-5). j=1 of $\chi_{i,j}(p)$ is a redundancy processing. However, it may be a processing time concerning another parallel performance impediment factor.

The parallel performance impediment factor contribution ratio calculator 13 calculates the parallel performance impediment factor contribution ratio Rj(p) concerning each parallel performance impediment factor in accordance with the expression (7) and stores it in the storage device. The parallel efficiency calculator 14 computes parallel efficiency Ep(p) in accordance with one of the expressions (8-2), (9-1) and (9-2) in the case where the conditions of the expression (4-4), (4-5) or (8-1) are satisfied, and stores it in the storage device. In the case where the expression (9-2) is used, there is also a case where the first term of the numerator is calculated by one of the expressions (12-1), (12-2), (12-3), (12-4), (13-3), (13-4) and (13-5). The expressions (12-1) to (12-4) are $\chi_{1,j}(p)$ for the redundancy processing of j=1. The auxiliary index calculator 15 calculates the acceleration ratio Ap in accordance with, for example, the expression (6-2) and calculates $E_p(p) \cdot p$ from the parallel efficiency $E_p(p)$ and the number p of processors, and stores it in the storage device.

The processor number optimizer 21 executes a processing to indicate to an end user of the parallel computer system 200 the optimum number of processors to be applied for processing. The processor add-on estimation processor 22 executes a processing for indicating to an operational administrator of the parallel computer system 200 a numerical value as a guideline at the add-on of the processor. The system replacement data processor 23 executes a processing of indicating to the operational administrator of the parallel computer system 200 a numerical value as a guideline at the system replacement. The operational efficiency data processor 24 executes a processing for indicating to the administrator of the parallel computer system 200 data concerning system operational efficiency. The tuning processor 25 executes a processing for enabling a programmer to execute effective tuning by suitable performance objective setting or the like to a program for performing a parallel processing. The algorithm selection processor 26 executes a processing for enabling a programmer to select an algorithm capable of improving parallel efficiency with respect to a program for performing a parallel processing in the case where different algorithms exist for the same processing. The parallel performance evaluation processor 27 executes a processing for enabling a developer or a researcher of a parallel computer system to easily evaluate parallel performance. The detailed processing contents of these processing units will be described below.

Next, a processing flow of the system or the like shown in FIG. 19 will be described by using FIG. 22. At first, a pre-processing is executed which includes a description for direct measurement of a processing time, a description for turning ON/OFF a flag for counting the number of times of sampling corresponding to each processing time by a complier, an OS, a tool, a programmer, a runtime library, hardware or the like, and/or a classification of a module name and the like for counting the number of times of sampling corresponding to each processing time by the complier, the OS, the tool, the programmer, the runtime library, the hardware or the like (step S1). There is a case where this processing is performed in the parallel computer system 200 or is performed in another computer system. Further, there is also a case where a person such as a programmer performs it. Incidentally, since there is also a case where the step S1 is not a processing executed in the parallel performance analyzer 100 and is not a processing executed in the parallel computer system 200, it is indicated by a block of a dotted line.

Next, the measurement unit 201 of the parallel computer system 200 executes a measurement processing to make a measurement of a processing time or a measurement processing to count the number of times of sampling on the basis of the pre-processing (step S3). The respective processing times $\gamma_i(p), \chi_{i,j}(p)$, and $\tau_i(p)$ as measurement results, or count values of sampling corresponding to the respective processing times are stored in the storage device of the parallel computer system 200, and are read out by the data acquisition unit 10 of the parallel performance analyzer 100. When acquiring the respective processing times $\chi_i(p)$, $\chi_{i,j}(p)$, and $\tau_i(p)$ or the count values of sampling corresponding to the respective processing times, the data acquisition unit 10 stores them in the log data storage 30 of the parallel performance analyzer 100.

Then, the load balance contribution ratio calculator 11, the virtual parallelization ratio calculator 12, the parallel performance impediment factor contribution ratio calculator 13, the parallel efficiency calculator 14, and the auxiliary index calculator 15 use the respective processing times $\gamma_i(p), \chi_{i,j}(p)$, and $\tau_i(p)$ stored in the log data storage 30, or the count values of sampling corresponding to the respective processing times to calculate the load balance contribution ratio Rb(p), the virtual parallelization ratio Rp(p), the respective parallel performance impediment factor contribution ratios Rj(p), the parallel efficiency $E_p(p)$, the acceleration ratio $A_p$ and other auxiliary indexes, and stores them in the log data storage 30 (step S5).

As described above, in the case where the conditions of the expression (4-4), (4-5), or (8-1) is satisfied, the parallel efficiency $E_p(p)$ is calculated in accordance with one of the expressions (8-2), (9-1) and (9-2). Accordingly, the parallel efficiency calculator 14 calculates the parallel efficiency Ep(p) by using the load balance contribution ratio Rb(p) calculated by the load balance contribution ratio calculator 11, the virtual parallelization ratio Rp(p) calculated by the virtual parallelization ratio calculator 12, the respective parallel performance impediment factor contribution ratios Rj(p) calculated by the parallel performance impediment factor contribution ratio calculator 13, and the acceleration ratio Ap(p) calculated by the auxiliary index calculator 15 and by using the processing times and the like stored in the log data storage 30 as to other necessary data.

Figure 23:
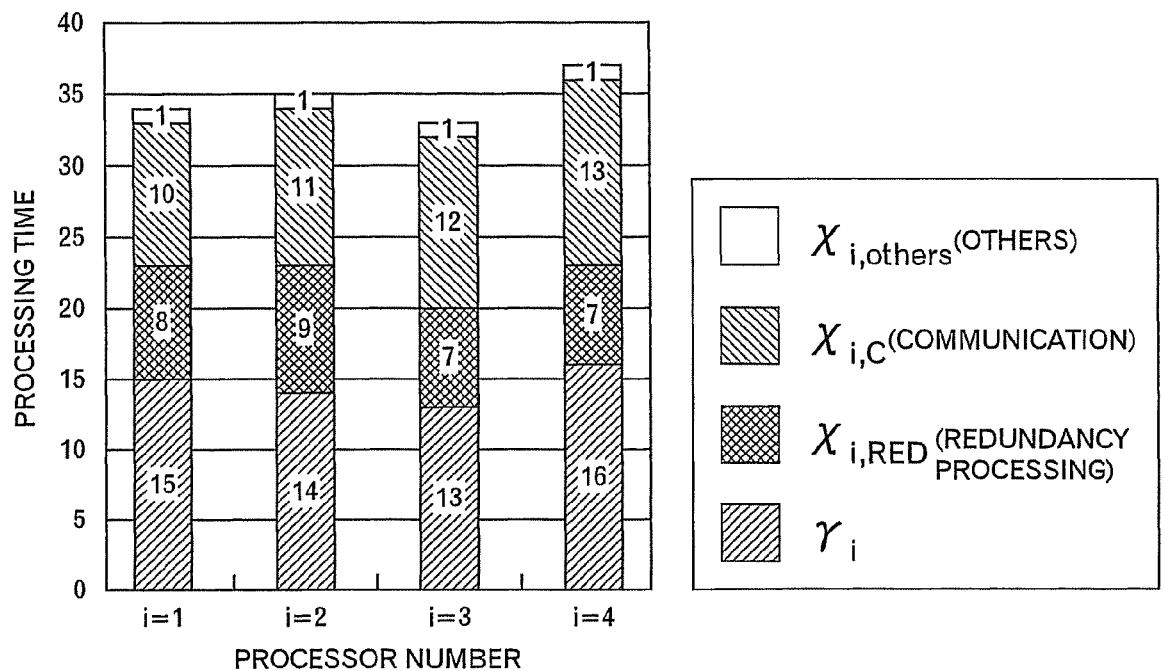
FIG. 23 is a drawing showing an example of a measurement result of processing times by time measurement.

For example, a calculation example in the case where measurement results of processing times as shown in FIG. 23 are stored in the log data storage 30, will be described below. More specifically, it is assumed that measurement results of $\tau_1(p)=34, \tau_2(p)=35, \tau_3(p)=33, \tau_4(p)=37, \gamma_1(p)=15, \gamma_2(p)=14, \gamma_3(p)=13, \gamma_4(p)=16, \chi_{1,RED}(p)=8, \chi_{2,RED}(p)=9, \chi_{3,RED}(p)=7, \chi_{4,RED}(p)=7, \chi_{1,c}(p)=10, \chi_{2,c}(p)=11, \chi_{3,c}(p)=12, \chi_{4,c}(p)=13$ are obtained. Accordingly, $\chi_{1,others}(p)=1$ (=34−15−8−10), $\chi_{2,others}(p)=1$ (=35−14−9−11), $\chi_{3,others}(p)=1$ (=33−13−7−12), and $\chi_{4,others}(p)=1$ (=37−16−7−13).

Although necessary for the following calculation, it is assumed that both $\chi_{1,c}(1)$ and $\chi_{1,others}(1)$, which have not been measured, are 0.

(1) Load Balance Contribution Ratio (Expression (5))

$$R_b(p) = \frac{\sum_{i=1}^{p} \tau_i(p)}{\tau(p) \cdot p}$$

$$= \frac{34 + 35 + 33 + 37}{37 \cdot 4}$$

$$= \frac{139}{148}$$

$$= 0.9392$$

(2) Virtual Parallelization Ratio (Expressions (6-1), (12-1), (15))

$$\chi_{1,RED}(1) \equiv \frac{1}{p} \cdot \sum_{i=1}^{p} \chi_{i,RED}(p)$$

$$= \frac{1}{4} \cdot (8 + 9 + 7 + 7)$$

$$= 7.75$$

$$\tau_1(1) = \sum_{i=1}^{p} \gamma_i(p) + \sum_{j=1}^{j_{others}} \chi_{1,j}(1)$$

$$= (15 + 14 + 13 + 16) + 7.75$$

$$= 65.75$$

$$R_p(p) = \frac{\sum_{i=1}^{p} \gamma_i(p)}{\tau(1)}$$

$$= \frac{15 + 14 + 13 + 16}{65.75}$$

$$= \frac{58}{65.75}$$

$$= 0.8821$$

(3) Acceleration Ratio (Expression (6-2))

$$A_p(p) = \frac{1}{1 - R_p(p)}$$

$$= \frac{1}{1 - 0.8821}$$

$$= 8.482$$

(4) Parallel Performance Impediment Factor Contribution Ratio (Expression (7))

(4-1) Parallel Performance Impediment Factor Contribution Ratio of Redundancy Processing $$R_{RED}(p) = \frac{\sum_{i=1}^{4} \chi_{i,RED}(p)}{\sum_{i=1}^{4} \tau_i(p)}$$

$$= \frac{(8+9+7+7)}{139}$$

$$= 0.2230$$

(4-2) Parallel Performance Impediment Factor Contribution Ratio of Communication Processing $$R_C(p) = \frac{\sum_{i=1}^{p} \chi_{i,c}(p)}{\sum_{i=1}^{p} \tau_i(p)}$$

$$= \frac{10+11+12+13}{139}$$

$$= 0.3309$$

(4-3) Other Parallel Performance Impediment Factor Contribution Ratio $$R_{Others}(p) = \frac{\sum_{i=1}^{p} \chi_{i,others}(p)}{\sum_{i=1}^{p} \tau_i(p)}$$

$$= \frac{1+1+1+1}{139}$$

$$= 0.0288$$

(5-1) Parallel Efficiency (Expression (4-4))

$$E_p(p) = R_b(p) \cdot \frac{1}{R_p(p)} \cdot (1 - R_{RED}(p) - R_C(p) - R_{Others}(p))$$

$$= 0.9392 \cdot \frac{1}{0.8821} \cdot (1 - 0.2230 - 0.3309 - 0.0288)$$

$$= 0.4443$$

(5-2) Parallel Efficiency (Expression (9-1))

$$E_p(4) = R_b(4) \cdot \frac{1}{R_p(4)} \cdot \frac{\sum_{i=1}^{p} \gamma_i(4)}{\sum_{i=1}^{p} \tau_i(4)}$$

$$= 0.9392 \cdot \frac{1}{0.8821} \cdot \frac{58}{139}$$

$$= 0.4443$$

(5-3) Parallel Efficiency (Expression (9-2))

$$E_p(p) \equiv \frac{\chi_{1,RED}(1) + \sum_{i=1}^{p} \gamma_i(p)}{\tau(p) \cdot p}$$

$$= \frac{7.75 + 58}{37 \cdot 4}$$

$$= 0.4443$$

The above results are collected as shown in FIG. 13. Incidentally, Ep(p)·p as an auxiliary index is also calculated. It is understood from Ep(4)·p=1.777 that the processing is performed in the four-processor parallel with the performance of 1.777 processors. The parallel efficiency is lowered to about 94% (=Rb(4)=0.9392) by the load balance. The influences of the parallel performance impediment factors are about 22% (=$R_{RED}$(4)=0.2230) through the redundancy processing, about 33% (=$R_c$(4)=0.3309) through the communication, and about 3% (=$R_{others}$(4)=0.0288) through the others. Accordingly, the parallel efficiency is lowered by about 55% mainly through the communication and the redundancy processing execution. Besides, in FIG. 13, from Rp(4)=0.8821, it can be estimated that the parallel maximum performance at the time when processors are infinitely applied is 8.482 (=Ap(4)=1/(1−0.8821) times as higher than that of one processor. Accordingly, it is understood that this processing should be performed by eight processors or less. If this processing is performed under the condition of Ep(x)≧0.8, then Ep(x)·p=0.4443×4=1.777=$E_p$(x)·x=0.8*x, and x=2.22. Accordingly, it is expected that p≧2.22=2 is the optimum number of processors to the given condition.

Figure 24:
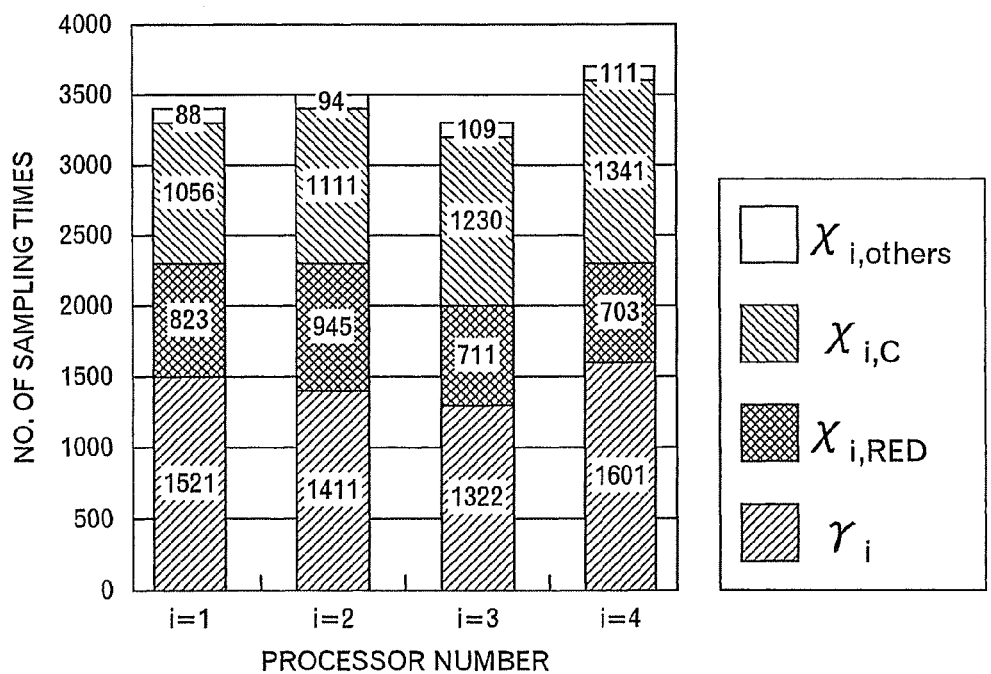
FIG. 24 is a drawing showing an example of a measurement result of processing times by sampling.

Besides, a calculation example in the case where for example, count numbers by sampling as shown in FIG. 24 are stored in the log data storage 30 by the data acquisition unit 10, will be described below. More specifically, it is assumed that measurement results of $\tau_1$(p)=3488, $\tau_2$(p)=3561, $\tau_3$(p)=3372, $\tau_4$(p)=3756, $\gamma_1$(p)=1521, $\gamma_2$(p)=1411, $\gamma_3$(p)=1322, $\gamma_4$(p)=1601, $\chi_{1,RED}$(p)=823, $\chi_{2,RED}$(p)=945, $\chi_{3,RED}$(p)=711, $\chi_{4,RED}$(p)=703, $\chi_{1,c}$(p)=1056, $\chi_{2,c}$(p)=1111, $\chi_{3,c}$(p)=1230, $\chi_{4,c}$(p)=1341 are obtained. Accordingly, $\chi_{1,others}$(p)=88 (=3488−1521−823−1056), $\chi_{2,others}$(p)=94 (=3561−1411−945−1111), $\chi_{3,others}$(p)=109 (=3372−1322−711−1230), $\chi_{4,others}$(p)=111 (=3756−1601−703−1341). It is assumed that both $\chi_{1,c}$(1) and $\chi_{1,others}$(1), which is needed in the following calculation but have not been measured, are 0.

(1) Load Balance Contribution Ratio Rb(p) (Expression (5))

$$R_b(4) = \frac{\sum_{i=1}^{4} \tau_i(4)}{\tau(4) \cdot (4)}$$

$$= \frac{(1521+823+1056+88)+(1411+945+1111+94)}{(1322+711+1230+109)+(1601+703+1341+111)}{(1601+703+1341+111) \cdot 4}$$

$$= \frac{3488+3561+3372+3756}{3756 \cdot 4}$$

$$= \frac{14177}{15024}$$

$$= 0.9436$$

(2) Virtual Parallelization Ratio (Expression (6-1), (12-1), (15))

$$\chi_{1,RED}(1) \equiv \frac{1}{p} \cdot \sum_{i=1}^{p} \chi_{i,RED}(p)$$

$$= \frac{1}{4} \cdot (823+945+711+703)$$

$$= 795.5$$

$$R_p(p) = \frac{\sum_{i=1}^{p} \gamma_i(p)}{\tau(1)}$$

$$= \frac{1521 + 1411 + 1322 + 1601}{(1521 + 1411 + 1322 + 1601) + 795.5}$$

$$= \frac{5855}{5855 + 795.5}$$

$$= 0.8804$$

(3) Acceleration Ratio (Expression (6-2))

$$A_p(p) = \frac{1}{1 - R_p(p)} = \frac{1}{1 - 0.8804} = 8.361$$

(4) Parallel Performance Impediment Factor Contribution Ratio (Expression (7))
(4-1) Parallel Performance Impediment Factor Contribution Ratio of Redundancy Processing $$R_{RED}(4) = \frac{\sum_{i=1}^{4} \chi_{i,RED}(4)}{\sum_{i=1}^{4} \tau_i(4)}$$

$$= \frac{(823 + 945 + 711 + 703)}{14177}$$

$$= 0.2244$$

(4-2) Parallel Performance Impediment Factor Contribution Ratio of Communication Processing $$R_C(p) = \frac{\sum_{i=1}^{p} \chi_{i,C}(p)}{\sum_{i=1}^{p} \tau_i(p)}$$

$$= \frac{1056 + 1111 + 1230 + 1341}{14177}$$

$$= 0.3342$$

(4-3) Other Parallel Performance Impediment Factor Contribution Ratio $$R_{Others}(p) = \frac{\sum_{i=1}^{p} \chi_{i,others}(p)}{\sum_{i=1}^{p} \tau_i(p)}$$

$$= \frac{88 + 94 + 109 + 111}{14177}$$

$$= 0.0284$$

(5-1) Parallelization Ratio (Expression (4-4))

$$E_p(p) = R_b(p) \cdot \frac{1}{R_p(p)} \cdot (1 - R_{RED}(p) - R_C(p) - R_{Others}(p))$$

$$= 0.9436 \cdot \frac{1}{0.8804} \cdot (1 - 0.2244 - 0.3342 - 0.0284)$$

$$= 0.4426$$

(5-2) Parallel Efficiency (Expression (9-1))

$$E_p(p) = R_b(p) \cdot \frac{1}{R_p(p)} \cdot \frac{\sum_{i=1}^{p} \gamma_i(p)}{\sum_{i=1}^{p} \tau_i(p)}$$

$$= 0.9436 \cdot \frac{1}{0.8804} \cdot \frac{5855}{14177}$$

$$= 0.4426$$

(5-3) Parallel Efficiency (Expression (9-2))

$$E_p(p) \equiv \frac{\chi_{1,RED}(1) + \sum_{i=1}^{p} \gamma_i(p)}{\tau(p) \cdot p}$$

$$= \frac{795.5 + 5855}{3756 \cdot 4}$$

$$= 0.4427$$

Similarly to the case of the measurement of the processing times, the above results are collected as shown in FIG. 13.

Returning to the description of FIG. 22, a set of measurement results of processing times or the like and parallel performance evaluation indexes and auxiliary indexes as shown in FIG. 13 are stored in the log data storage 30 for each processing. Then, the parallel performance analyzer 100 outputs a processing result as shown in FIG. 13 to the output device 110 such as a display device or a printer according to a request of a user or automatically (step S7).

The user himself/herself may perform, based on only the data as shown in FIG. 13, analysis concerning the parallel performance or the like, estimation of the optimum number of processors, estimation of an effect in the case where processor add-on or system replacement is performed, tuning of a program etc., selection of an algorithm or the like. However, various consulting support processings as described below are executed in accordance with the instruction of the user by the processor number optimizer 21, the processor add-on estimation processor 22, the system replacement data processor 23, the operational efficiency data processor 24, the tuning processor 25, the algorithm selection processor 26, and the parallel performance evaluation processor 27 (step S9). By this, more specific data can be obtained.

A. Processor Number Optimization Processing

Figure 25:
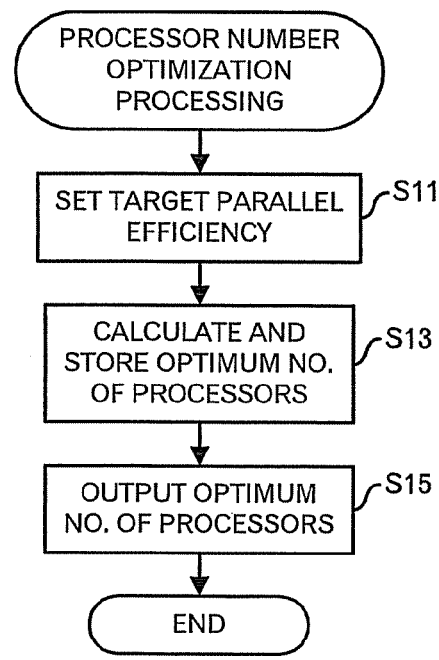
FIG. 25 is a drawing showing an example of a first portion of a processing flow of a processor number optimization processing.
Figure 26:
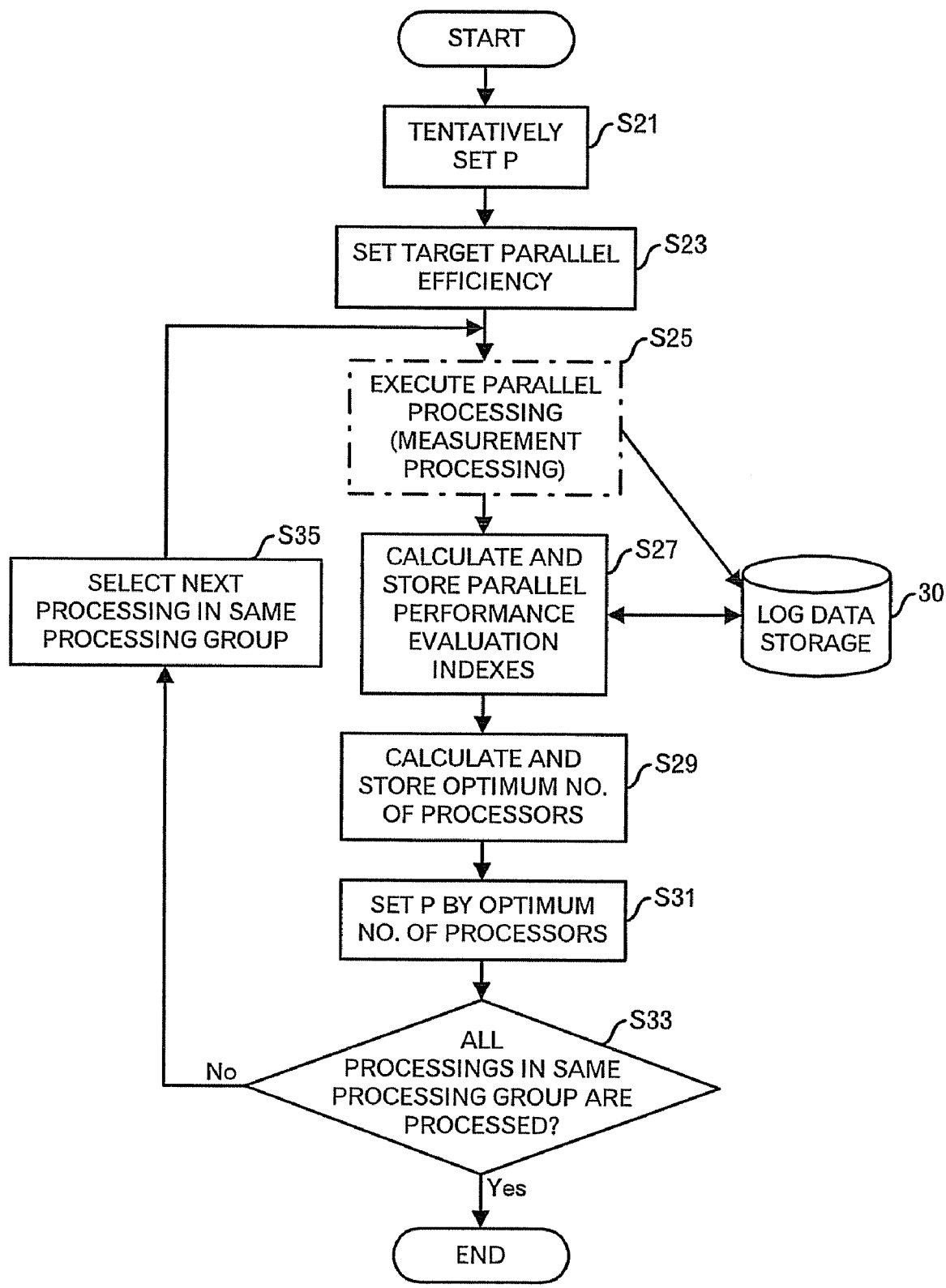
FIG. 26 is a drawing showing an example of a second portion of a processing flow of a processor number optimization processing.

A processing by the processor number optimizer 21 will be described by using FIGS. 25 and 26. The processor number optimizer 21 receives a setting input of a value of a target parallel efficiency $(E_p)_T$ by the user (step S11). Then, a calculation of the optimum number of processors is carried out in accordance with a following expression, and it is stored in the storage device (step S13).

$$(p)_{OPT} = E_p(p)/(E_p)_T p$$

Then, the calculated optimum number of processors is outputted to the output device 110 (step S15). By this, the user can make the number of processors used at next execution of a processing belonging to the same processing group necessary minimum. For example, although described above, when the calculation result as shown in FIG. 13 is obtained, and when the target parallel efficiency $(E_p)_T$=0.8, the number of processors becomes p=2.22. Accordingly, the optimum number of processors becomes 2.

Besides, in the case where processings of the same processing group are continuously executed, it becomes possible to execute the processing more effectively while the optimum number of processors is adjusted. That is, a processing as shown in FIG. 26 is executed. First, the number p of processors is tentatively set (step S21). This tentatively set number p of processors is used for the first processing of the same processing group. Besides, a setting of a target parallel efficiency is accepted from the user (step S23). Then, in accordance with the setting of the number p of processors, a parallel processing is executed by the parallel computer system 200, processing times and the like are measured by the measurement unit 201, and the measurement result is stored in the storage device (step S25). The data acquisition unit 10 stores the data such as the processing times measured by the measurement unit 201 into the log data storage 30. Then, the parallel performance evaluation indexes and the like including the parallel efficiency are calculated by the parallel efficiency calculator 14 and the like and are stored in the log data storage 30 (step S27).

Then, the processor number optimizer 21 calculates the optimum number $(p)_{OPT}$ of processors and stores it in the storage device (step S29). This calculated optimum number $(p)_{OPT}$ of processors is substituted for p as the number of processors used for a next processing of the same processing group (step S31). Then, it is judged whether or not all processings of the same processing group are executed (step S33). In case all processings are not executed, a next processing in the same processing group is selected (step S35), the procedure is returned to step S25, and the parallel processing is executed with the number of processors set at the step S31.

By executing such a processing, the optimum number of processors for the previous processing belonging to the same processing group can be set as the number of processors for a next processing, and therefore, it becomes possible to perform the processing of the processing group more effectively.

b. Processor Add-On Estimation Processing

Figure 27:
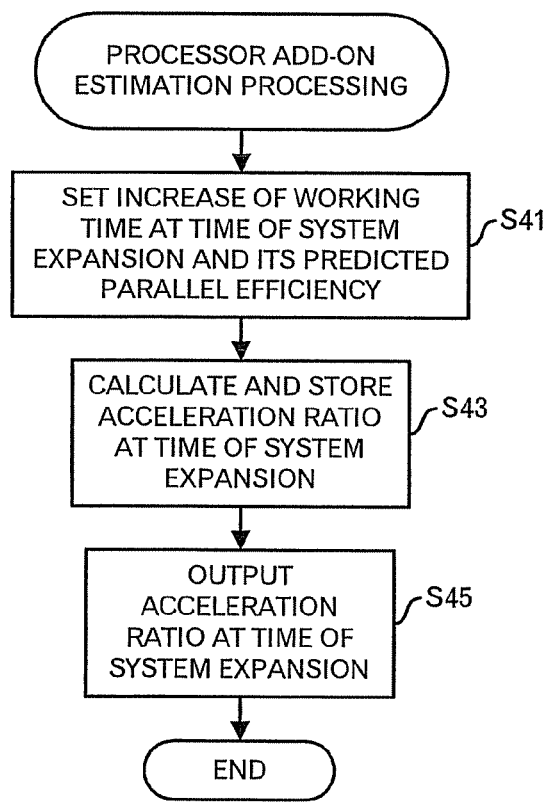
FIG. 27 is a drawing showing an example of a processing flow of a processor add-on estimation processing.

The processor add-on estimation processor 22 executes a processing for giving the acceleration ratio $A_{system}$ at the time of system expansion as a quantitative guideline for the processor add-on of the parallel computer system 200. FIG. 27 shows a processing flow. First, the processor add-on estimation processor 22 accepts a setting input of data of an increase of a working time at the time of the system expansion and data of its predicted parallel efficiency (step S41). Then, the acceleration ratio $A_{system}$ at the time of the system expansion is calculated in accordance with the expression (18), and is stored in the storage device (step S43). Incidentally, data such as the working time of each processor under use at present are calculated by using the past processing log data stored in the log data storage 30. Then, the calculated acceleration ratio $A_{system}$ at the time of the system expansion is outputted to the output device 110 such as the display device (step S45).

By the set increase of the working time and the acceleration ratio $A_{system}$ at the time of the system expansion to the predicted parallel efficiency, it becomes possible to judge how long a time for execution of a meaningful processing is increased.

C. System Replacement Data Processing

Figure 28:
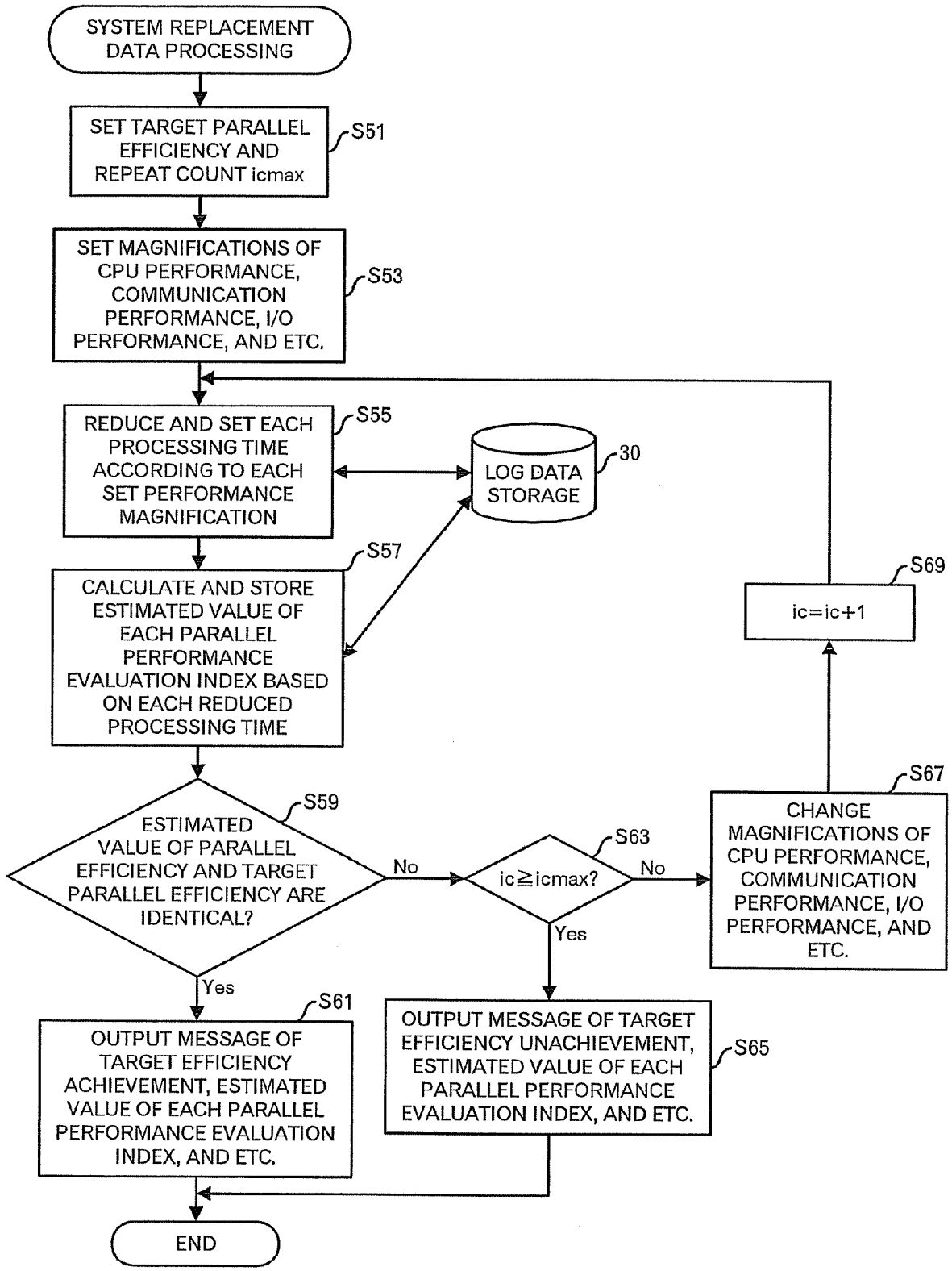
FIG. 28 is a drawing showing an example of a processing flow of a system replacement data processing.

A processing for presenting a quantitative guideline for determining performance of a new parallel computer system is executed at the replacement of the parallel computer system. FIG. 28 shows a processing flow for that. The system replacement data processor 23 receives a setting input of a target parallel efficiency $(E_p)_T$ and a repeat count $i_{cmax}$ (step S51). Besides, as performance of a new parallel computer system, a setting input of performance magnification A relative to the present parallel computer system is accepted (step S53). With respect to the performance magnification, a setting input of a magnification $A_{CPU}$ of CPU performance, a magnification $A_c$ of communication performance, a magnification $A_{I/O}$ of I/O performance, and the like is accepted. A quantitative guideline is obtained by the magnification values. In the replacement of most computer systems, since the performance improvement of the system is designed by the improvement of CPU performance, for example, $A_{CPU}$ is first set, and $E_p$ is calculated on the assumption that the other performance magnifications are "1". Then, values of $A_c$, $A_{I/O}$, and the like are obtained by repeated calculations so as to achieve or approach $(E_p)_T$ to get a guideline for performance determination of a new parallel computer system.

More specifically, the system replacement data processor 23 carries out a calculation to shorten the respective processing times and the like stored in the log data storage 30 in accordance with the respective set performance magnifications (step S55). For example, in the case where the CPU performance is set to be five times as higher ($A_{CPU}$=5), a calculation to reduce the processing time $\gamma_i(p)$ and the like of the parallel processing to ⅕ is carried out. Then, on the basis of the respective processing times shortened in accordance with the respective set performance magnifications, estimated values (for example, an estimated value of the parallel efficiency $(E_p)_E$) of the parallel performance evaluation indexes including the parallel efficiency are calculated and stored in the storage device (step S57).

The system replacement data processor 23 judges whether or not the estimated value $(E_p)_E$ of the parallel efficiency is coincident with the target parallel efficiency $(E_p)_T$ (step S59). Complete coincidence is not necessarily required, and it is judged whether or not the estimated value $(E_p)_E$ falls within a predetermined range of the target parallel efficiency $(E_p)_T$. In a case where it is judged that the estimated value $(E_p)_E$ of the parallel efficiency is almost coincident with the target parallel efficiency $(E_p)_T$, a message indicating the achievement of the target parallel efficiency and the estimated values of the respective parallel performance evaluation indexes calculated at the step S57 are outputted to the output device 10 such as the display device (step S61). On the other hand, in a case where it can not be said that the estimated value $(E_p)_E$ of the parallel efficiency is almost coincident with the target parallel efficiency $(E_p)_T$, it is judged whether the counter $i_c$ becomes the repeat count $i_{cmax}$ or more (step S63). In case the counter $i_c$ becomes the repeat count $i_{cmax}$ or more, a message indicating that the target parallel efficiency was not capable of being achieved, and the estimated values of the parallel performance evaluation indexes calculated at the step S57 are outputted to the output device 110 such as the display device (step S65).

On the other hand, in the case where $i_c$ is less than the repeat count $i_{cmax}$, a change of the performance magnification, such as the magnification of CPU performance, the magnification of communication performance, and the magnification of I/O performance, is executed (step S67). This step may be automatically carried out, or may accept a setting by the user. Then, the counter $i_c$ is incremented by one (step S69), and the procedure returns to the step S55.

In the above processing, in order to achieve the target parallel efficiency $(E_p)_T$, the performance magnification is changed up to the maximum repeat count $i_{cmax}$, and an estimation of the parallel efficiency is made. Incidentally, it is possible to select a new parallel computer system having performance satisfying $(E_p)_T$ for a specific processing the processing times of which are stored in the log data storage 30, or to select a new parallel computer system having performance satisfying $(E_p)_T$ for some kinds of processings.

An application example of the processing flow of FIG. 28 will be described using the case where the processing times as shown in FIG. 23 are specifically measured. Here, the target parallel efficiency is set to $(E_p)_T=0.6$, and when it is supposed that a new system having CPU performance five times as higher, that is, $A_{CPU}=5$, is introduced, $\gamma_i(p)$ and $\chi_{i,RED}(p)$ are reduced to $1/A_{CPU}$. It is assumed that $\chi_{i,others}(p)$ having an unclear property is also reduced to $1/A_{CPU}$. On the other hand, $\chi_{i,c}(p)$ depends on network performance. Here, first, on condition of $A_c=\infty$, a possibility of realization will be considered. Incidentally, it is assumed that both of $\chi_{i,c}(1)$ and $\chi_{i,others}(1)$, which have not been measured, are 0.

A following calculation is carried out from the expression (12-1).

$$\chi_{1,RED}(1) \equiv \frac{1}{p} \cdot \sum_{i=1}^{p} \chi_{i,RED}(p)$$
$$= \frac{1}{4} \cdot (8+9+7+7)$$
$$= 7.75$$

$[(E_p)_E$ in the case of $A_{CPU}=5$ and $A_c=\infty]$ $$R_b(p) = \frac{\sum_{i=1}^{p} \tau_i(p)}{\tau(p) \cdot (p)} \rightarrow \frac{\sum_{i=1}^{p} ((\gamma_i(p) + \chi_{i,RED}(p) + \chi_{i,others}(p))/A_{CPU} + \chi_{i,C}(p)/A_C)}{\tau(p) \cdot p}$$

$$= \frac{(15+8+1)/5 + 10/\infty + (14+9+1)/5 + 11\infty + (13+7+1)/5 + 12/\infty + (16+7+1)/5 + 13/\infty}{((16+7+1)/5 + 13/\infty) \cdot 4}$$

$$= \frac{(24+24+21+24)/5}{24/5 \cdot 4}$$

$$= \frac{18.6}{19.2}$$

$$= 0.9688$$

$$R_p(p) = \frac{\sum_{i=1}^{p} \gamma_i(p)}{\tau(1)} \rightarrow \frac{\sum_{i=1}^{p} \gamma_i(p)/A_{CPU}}{\sum_{i=1}^{p} \gamma_i(p)/A_{CPU} + \chi_{1,RED}(1)/A_{CPU}}$$

$$= \frac{\sum_{i=1}^{p} \gamma_i(p)}{\sum_{i=1}^{p} \gamma_i(p) + \chi_{1,RED}(1)}$$

$$= \frac{(15+14+13+16)/5}{(15+14+13+16)/5 + 7.75/5}$$

$$= \frac{58}{(58+7.75)}$$

$$= 0.8821$$

$$R_{RED}(p) = \frac{\sum_{i=1}^{4} \chi_{i,RED}(p)}{\sum_{i=1}^{4} \tau_i(p)} \rightarrow \frac{\sum_{i=1}^{4} \chi_{i,RED}(p)/A_{CPU}}{\sum_{i=1}^{4} [(\gamma_i(p) + \chi_{i,RED}(p) + \chi_{i,others}(p))/A_{CPU} + \chi_{i,C}(p)/A_C]}$$

$$= \frac{(8+9+7+7)/5}{18.6}$$

$$= 0.3333$$

$$R_{others}(p) = \frac{\sum_{i=1}^{4} \chi_{i,others}(p)}{\sum_{i=1}^{4} \tau_i(p)} \rightarrow \frac{\sum_{i=1}^{4} \chi_{i,others}(p)/A_{CPU}}{\sum_{i=1}^{4} [(\gamma_i(p) + \chi_{i,RED}(p) + \chi_{i,others}(p))/A_{CPU} + \chi_{i,C}(p)/A_C]}$$

$$= \frac{(1+1+1+1)/5}{18.6}$$

$$= 0.0430$$

$$E_p(p) = R_b(p) \cdot \frac{1}{R_p(p)} \cdot (1 - R_{RED}(p) - R_C(p) - R_{Others}(p))$$

$$= 0.9688 \cdot \frac{1}{0.8821} \cdot (1 - 0.3333 - 0 - 0.0430)$$

$$= 0.6850$$

The above calculation results are collected in FIG. 29. When the magnification is $A_c=\infty$, the term of $\chi_{i,c}(p)$ becomes 0, and $E_p=0.6850$, and therefore, it is larger than the target value 0.6. Accordingly, it is understood that there is a possibility that the target parallel efficiency can be achieved in accordance with the improvement of performance of $A_c$. Then, at step S67, while $A_c$ is changed, a calculation of the parallel efficiency is repeatedly carried out (step S57) to find out $A_c$ which produces $E_p(p)\sim0.6$. Although an intermediate calculation is omitted, a calculation result in the case of $E_p(p)\sim0.6$ is shown at the second line of FIG. 29. In this case, $A_c=19.2$. From this, in the case where it is desired to achieve the CPU performance of $A_{CPU}=5$ and $(E_p)_T=0.6$, there is obtained a guideline indicating that it is proper to find out a parallel computer system having performance of $A_c=19.2$ or more and to make a replacement with such a system.

Incidentally, in the case where $A_c=19.2$ is too high and such a system does not exist at present, a reduction of another parallel performance impediment factor is considered. According to the estimation result of the second line of FIG. 29, it is understood that the redundancy processing $R_{RED}$(4)=0.2953 should be improved. In order to reduce the redundancy processing, tuning of a program becomes necessary. The tuned program is executed, the processing of FIG. 28 is again executed, and $A_c$ has only to be estimated again.

Figure 30:
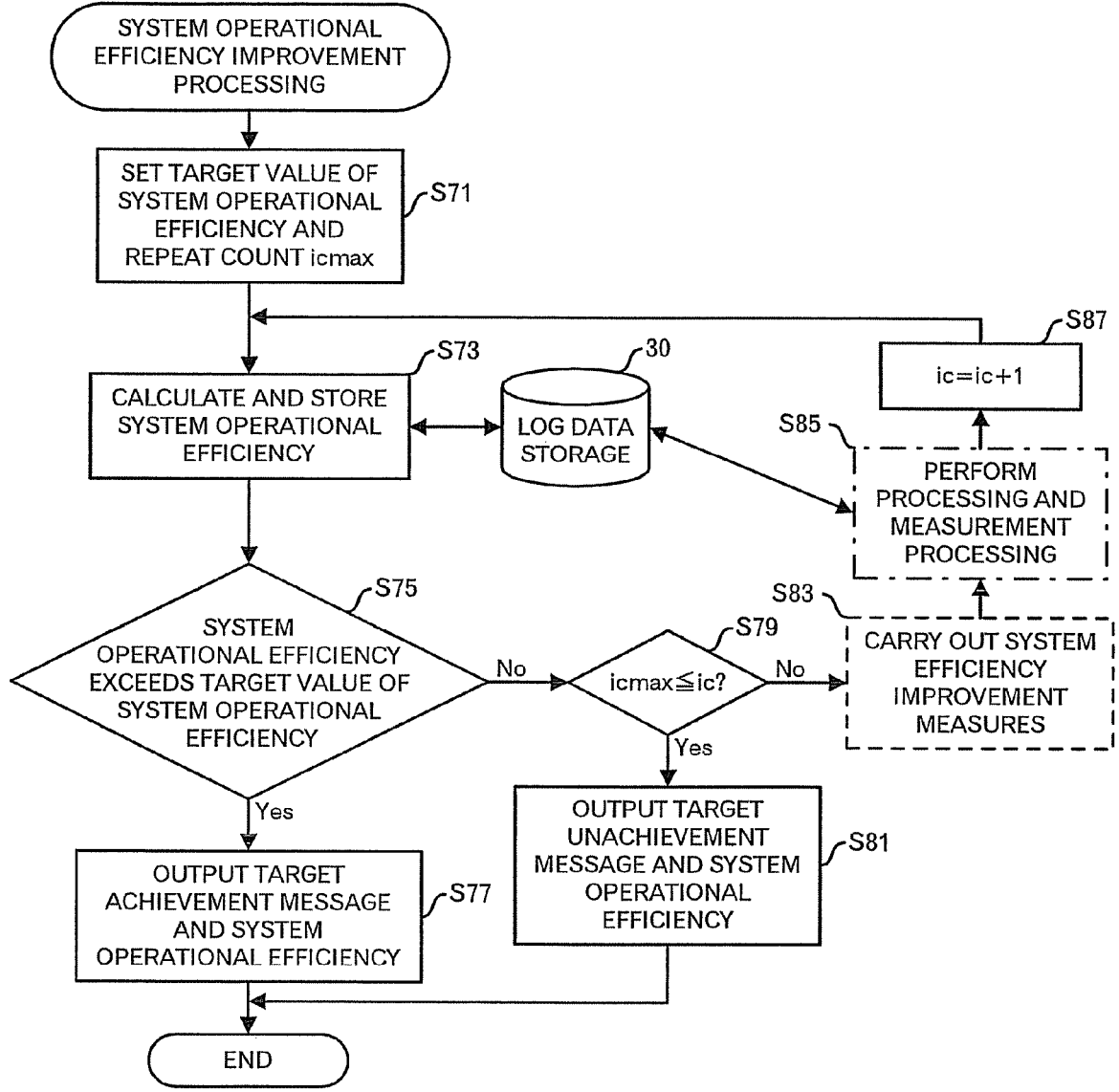
FIG. 30 is a drawing showing an example of a processing flow for a system operational efficiency improvement processing.

Besides, by predicting the parallel performance at the time of system replacement as shown in FIG. 29, it is also possible to estimate the system operational efficiency $E_{system}$ of a newly introduced parallel computer system. For example, in the case where processings 1 to 4 the estimation of which is shown in FIG. 18 are performed by a new system of $A_{CPU}=5$ and $A_c=19.2$ in which the target parallel efficiency $(E_p)_T=0.6$ is cleared in a certain processing, it is understood that the efficiency becomes $E_{system}=0.6534$. By comparing this predicted $E_{system}$ with $E_{system}$ obtained from the past processing log, it becomes possible to quantitatively indicate the improvement of the working rate due to the replacement of the system with the more well grounded data. D. System operational efficiency improvement processing On the basis of the index of the system operational efficiency $E_{system}$ expressed by the expression (17), the operational efficiency of a system is estimated. For the improvement of the index, there is given a specific guideline concerning the improvement of the operational efficiency, for example, a guideline is given to indicate that parallel efficiency of which processing must be improved to what extent. Specifically, a processing of FIG. 30 is executed.

The operational efficiency data processor 24 accepts a setting input of a repeat count $i_{cmax}$ and a target value $(E_{system})_T$ of a system operational efficiency by an operational administrator (step S71). Then, data, such as processing times and parallel efficiency, stored in the log data storage 30 are read out, and the system operational efficiency $E_{system}$ is calculated in accordance with the expression (17) and is stored in the storage device (step S73). Incidentally, in the case where a calculation of the parallel performance evaluation indexes including the parallel efficiency has not been carried out, at this stage, the parallel performance evaluation indexes including the parallel efficiency are calculated by the load balance contribution ratio calculator 11, the virtual parallelization ratio calculator 12, the parallel performance impediment factor contribution ratio calculator 13, the parallel efficiency calculator 14 and the like. Then, it is judged whether the system operational efficiency $E_{system}$ calculated at step S73 exceeds the target value $(E_{system})_T$ of the system operational efficiency (step S75). In case it is judged that $E_{system} > (E_{system})_T$ is established, a message indicating the achievement of the object and the system operational efficiency $E_{system}$ computed at the step S73 are outputted to the output device 110 such as the display device (step S77). On the other hand, in the case of $E_{system} \leq (E_{system})_T$, it is judged whether the counter value $i_c$ is the repeat count $i_{cmax}$ or more (step S79). If the counter value $i_c$ is the repeat count $i_{cmax}$ or more, in order to inform that the system operational efficiency improvement processing does not well function, a message indicating that the object is not achieved and the system operational efficiency $E_{system}$ calculated at the adjacent step S73 are outputted to the output device 110 such as the display device (step S81).

On the other hand, if the counter value $i_c$ is less than the repeat count $i_{cmax}$, the operational efficiency data processor 24 recommends an end user to execute an improvement process for end users, a system administrator to execute an improvement process for system administrators, a programmer to execute an improvement process for programmers, and a parallel computer system developer or researcher to execute an improvement process for parallel computer system developers or researchers, and the end user or the like executes the possible system operational efficiency improvement process (step S83). Incidentally, examples of the processes to be executed include optimization of the number of processors, add-on of a processor, system replacement, tuning of a program and the like. After the execution of the system operational efficiency improvement process, the parallel processing is again executed by the parallel computer system 200, and at the same time, a measurement processing of processing times and the like by the measurement unit 201 is executed (step S85). Then, the counter value $i_c$ is incremented by one (step S87), and the procedure returns to the step S73. Incidentally, since there is also a case where the step S83 is a processing performed by the end user, it is indicated by a block of a dotted line, and since the step S85 is not a processing of the parallel performance analyzer 100, it is indicated by a block of an alternate long and short dash line.

By executing such a processing, it becomes possible to improve the system operational efficiency in which consideration is given to the parallel efficiency which has not been considered in the conventional working rate $NWR_{system}$, that is, consideration is given to an effective processing time.

E. Tuning Processing

Figure 31:
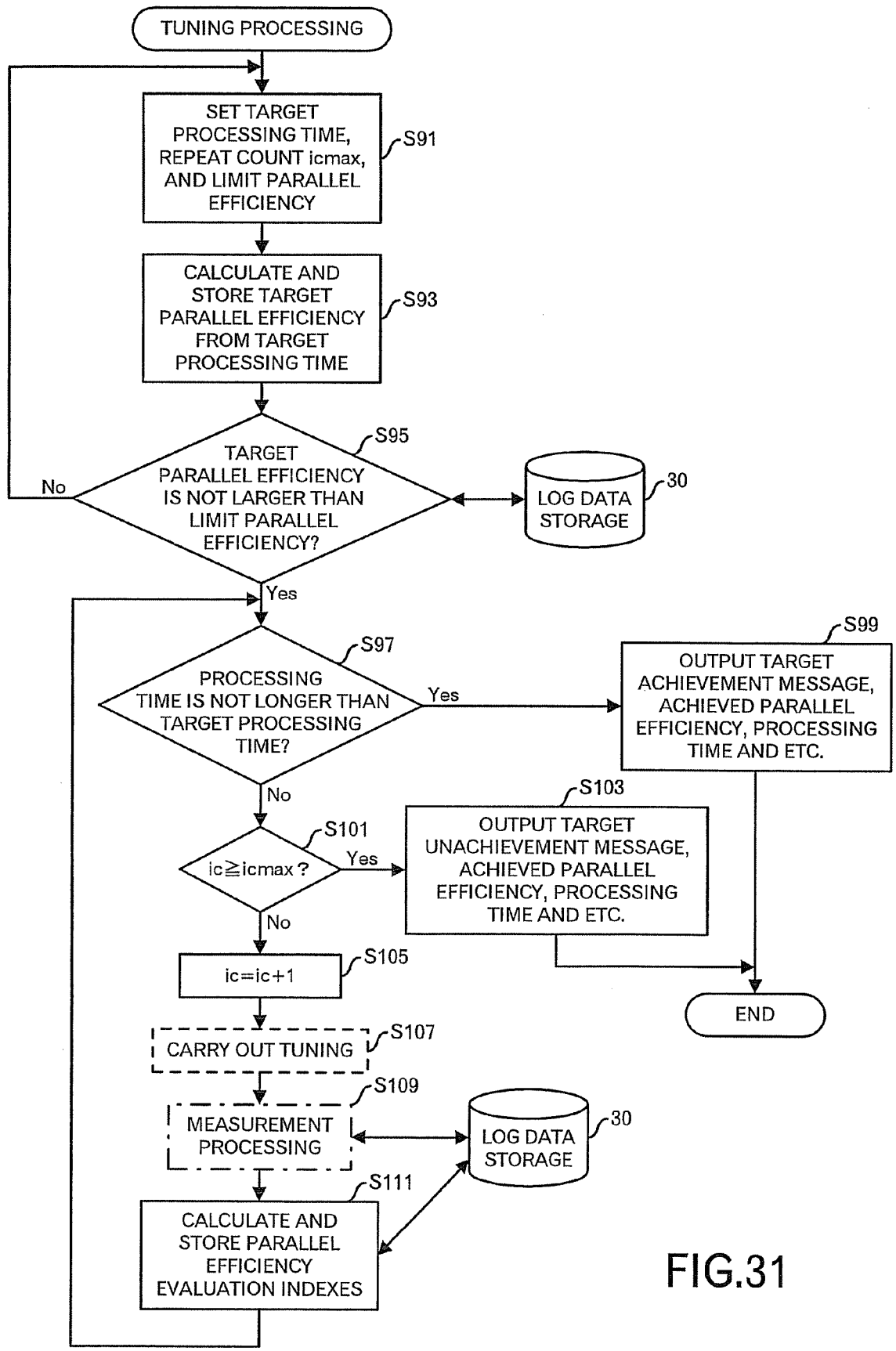
FIG. 31 is a drawing showing an example of a processing flow of a tuning processing.

Conventionally, with respect to the performance improvement operation by tuning of a parallel application program, since an achievement object is unclear, the estimation of its working time has not been easy. There is also a case where a target processing time cannot be attained by tuning, and there are many cases where the tuning operation is continued endlessly and a lot of working time is spent. Then, a processing as shown in FIG. 31 is executed.

First, the tuning processor 25 accepts a setting input of a target processing time $(\tau)_T$, a repeat count $i_{cmax}$ and a limit parallel efficiency $(E_p)_{max}$ by a programmer (step S91). Next, by using data of the parallel efficiency and the processing time stored in the log data storage 30 (for example, the parallel efficiency and the processing time included in the processing log of a program to be tuned), the target parallel efficiency $(E_p)_T$ corresponding to the target processing time $(\tau)_T$ is calculated and is stored in the storage device (step S93). The target parallel efficiency $(E_p)_T$ is calculated by a following expression. This expression expresses linear extrapolation.

$$(E_p)_T = \max(\tau i) \times E_p(p)/(\tau)_T$$

Then, it is judged whether the target parallel efficiency $(E_p)_T$ is not higher than the limit parallel efficiency $(E_p)_{max}$ (step S95). When the target processing time $(\tau)_T$ is set without any limitation, an unrealizable target parallel efficiency $(E_p)_T$ is capable of being set. Then, it is judged at this step whether the target processing time $(\tau)_T$ is suitable. In case the target parallel efficiency $(E_p)_T$ exceeds the limit parallel efficiency $(E_p)_{max}$, since it becomes necessary to set the target processing time $(\tau)_T$ or the limit parallel efficiency $(E_p)_{max}$ again, the procedure returns to the step S91.

On the other hand, in the case where the target parallel efficiency $(E_p)_T$ is not higher than the limit parallel efficiency $(E_p)_{max}$, it is judged whether the processing time $\tau(p)$ measured this time is not higher than the target processing time $(\tau)_T$ (step S97). Incidentally, the first processing of the step S97 is always judged to be No. In case the processing time measured this time is not higher than the target processing time $(\tau)_T$, a message indicating that the object is achieved, and data such as the achieved parallel efficiency and the processing time $\tau(p)$ are outputted to the output device 110 such as the display device (step S99). On the other hand, in the case where the processing time measured this time exceeds the target processing time $(\tau)_T$, it is judged whether the counter value $i_c$ is not less than the repeat count $i_{cmax}$ (step S101). In case the counter value $i_c$ becomes the repeat count $i_{cmax}$ or more, a message indicating that the object can not be achieved, and data, such as an achieved parallel efficiency and a processing time $\tau(p)$, are outputted to the output device 110 such as the display device (step S103).

In case the counter value $i_c$ is less than the repeat count $i_{cmax}$, the counter value $i_c$ is incremented by one (step S105). Then, tuning is performed concerning the parallel performance impediment factors such the redundancy processing, load balance, communication processing, or I/O (step S107). There is a case where the program is not rewritten, but tuned by using a tool, a complier, a runtime library or the like. Since a programmer may perform this process, it is indicated here by a block of a dotted line. After the tuning, the program is again processed in parallel in the parallel computer system 200, and at the same time, a measurement processing of the processing times and the like is executed by the measurement unit 201, and they are stored in the storage device (step S109). Since the step S109 is also not a processing of the parallel performance analyzer 100, it is expressed by a block of an alternate long and short dash line. Thereafter, the data acquisition unit 10 acquires the data of the processing time and the like from the parallel computer system 200, and stores it in the log data storage 30. Then, the parallel performance evaluation indexes including the parallel efficiency are computed by the load balance contribution ratio calculator 11, the virtual parallelization ratio calculator 12, the parallel performance impediment factor contribution ratio calculator 13, the parallel efficiency calculator 14 and the like, and are stored in the log data storage 30 (step S111). Then, the procedure returns to the step S97.

As stated above, since the tuning operation is executed to achieve the target processing time $(\tau)_T$ by a predetermined number of times of tuning, it becomes possible also for the programmer to carry out an effective work.

For example, on the basis of the processing times as shown in FIG. 23, a specific example will be described. At this time, since $\tau(p)=37$ and $E_p(4)=0.4443$, if $(E_p)_{max}=0.6$ and $(\tau)_T=28$, then $(E_p)_T=0.5871$. Accordingly, the procedure proceeds from the step S95 to the step S97. Since this is the first processing, the procedure proceeds from the step S97 to step S107 through steps S101 and S105. As the first tuning, it is assumed that the communication time $\chi_c$ is reduced to ½. By using the result, the parallel performance evaluation indexes including the parallel efficiency are calculated at step S111. Then, the result as shown in FIG. 32 is obtained. Incidentally, FIG. 32 shows a comparison including the indication of a processing time $\max(\tau_i)$.

A calculation method in the case where the communication time $\chi_c$ is reduced to ½ as the tuning is as follows. Incidentally, processing times are assumed to be $\chi_{1,c}(4)=10/2=5$, $\chi_{2,c}(4)=11/2=5.5$, $\chi_{3,c}(4)=12/2=6$, and $\chi_{4,c}(4)=13/2=6.5$. Besides, from the equation (12-1), a calculation is carried out as follows.

$$\chi_{1,RED}(1) \equiv \frac{1}{p} \cdot \sum_{i=1}^{p} \chi_{i,RED}(p)$$
$$= \frac{1}{4} \cdot (8+9+7+7)$$
$$= 7.75$$

(1) Load Balance Contribution Ratio $R_b(p)$ (Expression (5))

$$R_b(p) = \frac{\sum_{i=1}^{p} \tau_i(p)}{\tau(p) \cdot p}$$
$$= \frac{\sum_{i=1}^{p}(\gamma_i(p) + \chi_{i,RED}(p) + \chi_{i,C}(p) + \chi_{i,others}(p))}{\max(\tau_i(p)) \cdot p}$$
$$= \frac{\begin{array}{c}(15+8+1)+5+(14+9+1)+5.5+\\(13+7+1)+6+(16+7+1)+6.5\end{array}}{(16+7+13/2+1)\cdot 4}$$
$$= \frac{29+29.5+27+30.5}{30.5 \cdot 4}$$
$$= \frac{116}{122}$$
$$= 0.9508$$

(2) Virtual Parallelization Ratio (Expression (6-1))

$$R_p(p) = \frac{\sum_{i=1}^{p} \gamma_i(p)}{\tau(1)}$$

$$= \frac{(15+14+13+16)}{(15+14+13+16)+7.75}$$
$$= \frac{58}{(58+7.75)}$$
$$= 0.8821$$

(3) Parallel Performance Impediment Factor Contribution Ratio (Expression (7))

$$R_{RED}(p) = \frac{\sum_{i=1}^{4} \chi_{i,RED}(p)}{\sum_{i=1}^{4} \tau_i(p)}$$
$$= \frac{(8+9+7+7)}{116}$$
$$= 0.2672$$

$$R_C(p) = \frac{\sum_{i=1}^{p} \chi_{i,C}(p)}{\sum_{i=1}^{p} \tau_i(p)}$$
$$= \frac{5+5.5+6+6.5}{116}$$
$$= 0.1983$$

$$R_{Others}(p) = \frac{\sum_{i=1}^{p} \chi_{i,others}(p)}{\sum_{i=1}^{p} \tau_i(p)}$$
$$= \frac{1+1+1+1}{116}$$
$$= 0.0345$$

(4-1) Parallel Efficiency (Expression (4-4))

$$E_p(p) = R_b(p) \cdot \frac{1}{R_p(p)} \cdot (1 - R_{RED}(p) - R_C(p) - R_{Others}(p))$$
$$= 0.9508 \cdot \frac{1}{0.8821} \cdot (1 - 0.2672 - 0.1983 - 0.0345)$$
$$= 0.5389$$

(4-2) Parallel Efficiency (Expression (9-2))

$$E_p(4) = R_b(4) \cdot \frac{1}{R_p(4)} \cdot \frac{\sum_{i=1}^{p} \gamma_i(4)}{\sum_{i=1}^{p} \tau_i(4)}$$
$$= 0.9508 \cdot \frac{1}{0.8821} \cdot \frac{58}{116}$$
$$= 0.5389$$

Since the processing time $\max(\tau_i)$ $(=\tau(p))$ obtained by the first tuning is 30.5 and the target processing time $(\tau)_T$ cannot be achieved, it is necessary to again perform some tuning.

Conventionally, evaluation of the parallel performance has been performed on the basis of a processing time comparison, such as a time change by a change of the number of processors, a processing time comparison with another system, or a comparison between the numbers of operations performed in a time. This requires two or more time measurements and causes to increase a program development time. Besides, in the relative parallel performance evaluation by this comparison, in the case where processing data is changed, it becomes necessary to again measure a comparison reference. As stated above, it takes a time to perform the parallel performance evaluation, and consequently, there occurs a case where an application program, which exhibits parallel performance only under a certain condition, is developed. By executing the aforementioned processing, the parallel performance evaluation using the parallel efficiency can be made by one measurement, and it becomes possible to greatly shorten a performance evaluation time in the development time of a parallel application program. As a result, development of a parallel application program in which consideration is sufficiently given to the parallel performance can be practically executed.

Besides, conventionally, in the performance improvement operation by tuning of an application program, since an achievement object is unclear, it is not easy to make a working time estimation. Besides, it is unclear when an operation should be ended, and consequently, there also occurs a case where it takes a lot of working time. Further, there is also a case where not the tuning of an application program, but redevelopment thereof is required. By executing the aforementioned processing, an object of the parallel efficiency improvement by tuning of an application program is definitely determined, and an estimation of a working time can also be made through the repeat count of tuning and the like.

Further, conventionally, tuning of an application program is performed in such a form that a procedure (part of the application program) having a long processing time in the application program is found out by time measurement or the like, a parallel performance impediment factor as a problem is found out in the procedure by comparison between processing times, and the processing time is decreased. By the processing as described above, a performance evaluation of the load balance is first enabled for such tuning of the part of the application program.

F. Algorithm Selection Processing

Conventionally, although a processing time is used for a performance comparison between programs in which an algorithm used for a part of a parallel application program is changed, it has been impossible to judge whether the cause of a processing time decrease is due to an effect of a parallel processing or an effect caused by a difference in the function (for example, decrease of the number of operations). As a result, such a waste of resources that many processors are applied in an algorithm having a short processing time and a poor scalability is overlooked. In this embodiment, an algorithm having a superior parallel efficiency is selected, and the operational efficiency of the whole system is improved. Here, first, a description will be given of an example of a comparison between an algorithm unsuited for parallel processing and an algorithm suited for parallel processing.

[Algorithm Unsuited for Parallel Processing]

For example, a description will be given of an example of a case where a measurement of processing times as shown in FIG. 33 is carried out. Incidentally, $\chi_{1,C}(1)=0$. Besides, from the expression (12-1), a calculation is carried out as follows:

$$\chi_{1,RED}(1) \equiv \frac{1}{p} \cdot \sum_{i=1}^{p} \chi_{i,RED}(p)$$

$$= \frac{1}{4} \cdot (50 + 50 + 50 + 50)$$

$$= 50$$

(1) Load Balance Contribution Ratio (Expression (5))

$$R_b(p) = \frac{\sum_{i=1}^{p} \tau_i(p)}{\tau(p) \cdot p}$$

$$= \frac{4 \cdot (50 + 50 + 10)}{(50 + 50 + 10) \cdot 4}$$

$$= 1$$

(2) Virtual Parallelization Ratio (Expression (6-1))

$$R_p(p) = \frac{\sum_{i=1}^{p} \gamma_i(p)}{\tau(1)}$$

$$= \frac{(50 + 50 + 50 + 50)}{(50 + 50 + 50 + 50) + 50}$$

$$= \frac{200}{(200 + 50)}$$

$$= 0.8000$$

(3) Acceleration Ratio (Expression (6-2))

$$A_p(p) = \frac{1}{1 - R_p(p)} = \frac{1}{1 - 0.8000} = 5.000$$

(4) Parallel Performance Impediment Factor Contribution Ratio (Expression (7))

$$R_{RED}(p) = \frac{\sum_{i=1}^{4} \chi_{i,RED}(p)}{\sum_{i=1}^{4} \tau_i(p)}$$

$$= \frac{(50 + 50 + 50 + 50)}{440}$$

$$= 0.4545$$

$$R_C(p) = \frac{\sum_{i=1}^{p} \chi_{i,C}(p)}{\sum_{i=1}^{p} \tau_i(p)}$$

$$= \frac{10 + 10 + 10 + 10}{440}$$

$$= 0.09091$$

(4-1) Parallel Efficiency (Expression (4-4))

$$E_p(p) = R_b(p) \cdot \frac{1}{R_p(p)} \cdot (1 - R_{RED}(p) - R_C(p))$$

$$= 1.000 \cdot \frac{1}{0.8000} \cdot (1 - 0.4545 - 0.09091)$$

$$= 0.5682$$

(4-2) Parallel Efficiency (Expression (9-1))

$$E_p(4) = R_b(4) \cdot \frac{1}{R_p(4)} \cdot \frac{\sum_{i=1}^{p} \gamma_i(4)}{\sum_{i=1}^{p} \tau_i(4)}$$

$$= 1.000 \cdot \frac{1}{0.8000} \cdot \frac{200}{440}$$

$$= 0.5682$$

[Algorithm Suited for Parallel Processing]

A description will be given of an example of a case where processing times as shown in FIG. 34 are measured. Incidentally, $\chi_{1,c}(1)=0$. Besides, from the expression (12-1), a calculation is carried out as follows:

$$\chi_{1,RED}(1) \equiv \frac{1}{p} \cdot \sum_{i=1}^{p} \chi_{i,RED}(p) = 0$$

(1) Load Balance Contribution Ratio (Expression (5))

$$R_b(p) = \frac{\sum_{i=1}^{p} \tau_i(p)}{\tau(p) \cdot p}$$

$$= \frac{4 \cdot (110 + 10)}{(110 + 10) \cdot 4}$$

$$= 1$$

(2) Virtual Parallelization Ratio (Expression (6-1))

$$R_p(p) = \frac{\sum_{i=1}^{p} \gamma_i(p)}{\tau(1)}$$

$$= \frac{110 + 110 + 110 + 110}{110 + 110 + 110 + 110}$$

$$= 1.000$$

(3) Acceleration Ratio (Expression (6-2))

$$A_p(p) = \frac{1}{1 - R_p(p)}$$

$$= \frac{1}{1 - 1}$$

$$= \infty$$

(4) Parallel Performance Impediment Factor Contribution Ratio (Expression (7))

$$R_{RED}(p) = \frac{\sum_{i=1}^{4} \chi_{i,RED}(p)}{\sum_{i=1}^{4} \tau_i(p)}$$

$$= \frac{0+0+0+0}{480}$$

$$= 0.0000$$

$$R_C(p) = \frac{\sum_{i=1}^{p} \chi_{i,C}(p)}{\sum_{i=1}^{p} \tau_i(p)}$$

$$= \frac{10+10+10+10}{480}$$

$$= 0.08333$$

(4-1) Parallel Efficiency (Expression (4-4))

$$E_p(p) = R_b(p) \cdot \frac{1}{R_p(p)} \cdot (1 - R_{RED}(p) - R_C(p))$$

$$= 1.000 \cdot \frac{1}{1.000} \cdot (1 - 0.0000 - 0.08333)$$

$$= 0.9167$$

(4-2) Parallel Efficiency (Expression (9-1))

$$E_p(4) = R_b(4) \cdot \frac{1}{R_p(4)} \cdot \frac{\sum_{i=1}^{p} \gamma_i(4)}{\sum_{i=1}^{p} \tau_i(4)}$$

$$= 1.000 \cdot \frac{1}{1000} \cdot \frac{440}{480}$$

$$= 0.9167$$

Figures 35, 36:
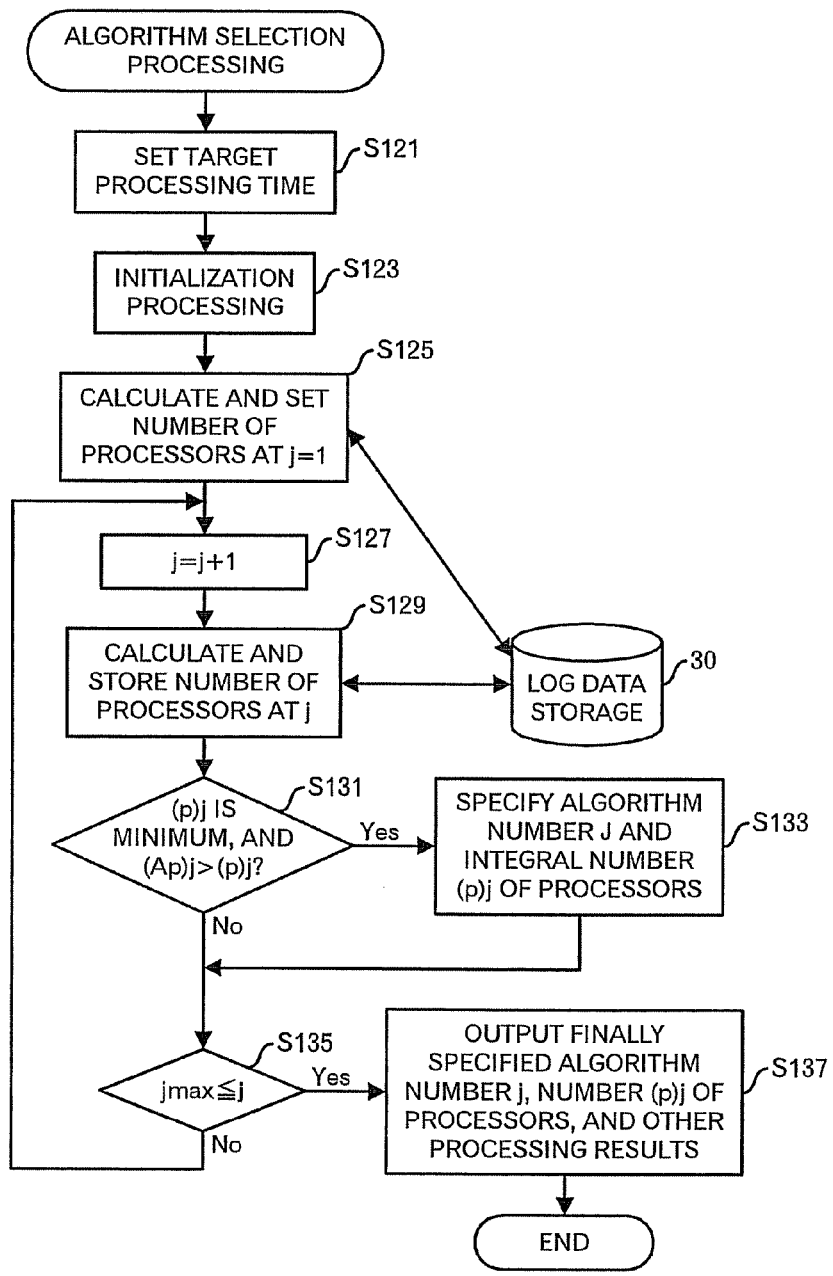
FIG. 35 is a drawing for comparison of parallel performance indexes between the algorithm unsuited for the parallel processing and the algorithm suited for the parallel processing.
FIG. 36 is a drawing showing a processing flow of an algorithm selection processing.

The above processing results are collected as shown in FIG. 35. When the number of the algorithm unsuited for the parallel processing is j=1, and the number of the algorithm suited for the parallel processing is j=2, the acceleration ratio is Ap=5.000 and is finite at j=1, and it is understood that even if processors are increased, five is a limitation in efficiency. On the other hand, at j=2, the acceleration ratio is Ap=∞, and there is a possibility that the larger the number of added processors is, the shorter the processing time is. Incidentally, the processing time τ is 110 at j=1, which is shorter than 120 at j=2, and accordingly, hitherto, there is a case where an algorithm of j=1 which is not suited for parallel processing is selected.

Then, in this embodiment, a processing shown in FIG. 36 is executed in the algorithm selection processor 26. First, a setting input of a target processing time $(\tau)_T$ by a programmer is accepted (step S121). Then, as an initial setting, an algorithm number $j_T$ is set to 1, and an optimum algorithm number $j_T$ is set to 1 (step S123). Besides, in the case of j=1, the number $(p)_1$ of processors necessary for achieving the target processing time $(\tau)_T$ is calculated by linear extrapolation (step S125). That is, $(p)_1=(\tau)_1/(\tau)_T/(E_p)_1+(p)_1+(p)_1$ is calculated by using the processing time of the algorithm number j=1 stored in the log data storage 30, and is stored in the storage device (step S125). Besides, with respect to an optimum algorithm, the number of required processors is set as $(p)_T=\text{INT}((p)_1+0.99)$. Further, $P_{min}=p_1$ is set.

Next, j is incremented by one (step S127). Then, the number $(p)_j$ of processors in the case of j is calculated by a following expression, and is stored in the storage device (step S129).

$$(p)_j=(\tau)_j/(\tau)_T/(E_p)_j+(p)_j$$

Then, it is confirmed whether $(p)_j<(p)_{min}$, and $(A_p)_j>(p)_j$ (step S131). That is, it is confirmed whether $(p)_j$ is minimum and the optimum number of processors is less than the acceleration ratio $(A_p)_j$ of the algorithm, that is, whether it is realizable. At the steps S125 and S129, since $(p)_j$ is simply calculated by the linear extrapolation, whether it is realizable is ensured here. In case of $(p)_j<(p)_{min}$ and $(A_p)_j>(p)_j$, the algorithm number j is set to $j_T$. That is, $j_T=j$. Besides, $(p)_T=\text{INT}((p)_j+0.99)$ is set (step S133).

After the step S131 or the step S133, it is confirmed whether j is not less than the algorithm number $j_{max}$ (step S135). That is, it is judged whether all algorithms are processed (step S135). If $j\geq j_{max}$, the algorithm number finally specified by $j_T$, the number $(p)_T$ of processors in that case, and other processing results (a set of j, $(p)_j$, $(Ap)_j$, $(\tau)_j$, etc.) are outputted to the output device 110 such as the display device (step S137). On the other hand, if $j<j_{max}$, the procedure returns to the step S127.

By doing so, it is possible to specify an algorithm in which the number of processors is small within a realizable range and the target processing time can be achieved. Besides, in addition to the algorithm, which is made optimum in this processing flow, it is possible to select an algorithm in which the number of processors is not largely different, and tuning can be easily made.

A specific description will be given of an example of two algorithms shown in FIG. 35. First, a target processing time $(\tau)_T$ is set. Next, by using $(E_p)_j$ and $(\tau)_j$ of the algorithms, the number $(p)_j$ of required processors is calculated by the linear extrapolation. In the processing flow shown in FIG. 36, in order to obtain $(p)_j$ by the linear extrapolation, $A_p(4)$ in which consideration is given to only the redundancy processing is introduced as an upper limit of the number of processors, and it is assumed that if $A_p(4)>(p)_j$, then $(p)_j$ can be applied. As a result, while limit performance of the algorithm unsuited for the parallel processing is 5.000, $(p)_j$ is 7.872, and it is understood that $(p)_j$ cannot be applied for the algorithm unsuited for the parallel processing. On the other hand, since limit performance of the algorithm suited for the parallel processing is ∞, there is a possibility that $(\tau)_T=50$ can be achieved by 6.618 processors. Accordingly, the algorithm $j_T=1$ suited for the parallel processing can be selected. A first aim in that case is $(p)_T=7$ obtained by rounding up 6.618. Until now, there are many cases where the algorithm having a short processing time and unsuited for the parallel processing is adopted by comparing τ=110 with 120. However, according to the processing flow of FIG. 36, at p=4, the algorithm having a long processing time and suited for the parallel processing can be selected.

G. Parallel Performance Evaluation Processing

In this embodiment, it is possible to prepare log data of parallel performance evaluation indexes of all processings in practical use. In this log data, if a certain specific processing is made a target, it becomes possible to obtain specifications (CPU performance, communication performance, I/O performance, performance of runtime library, etc.) necessary for a dedicated parallel computer system. If a processing by all applications is made a target, it becomes also possible to prepare specifications necessary for a general-purpose parallel computer system based on the log.

Figures 37, 38, 39:
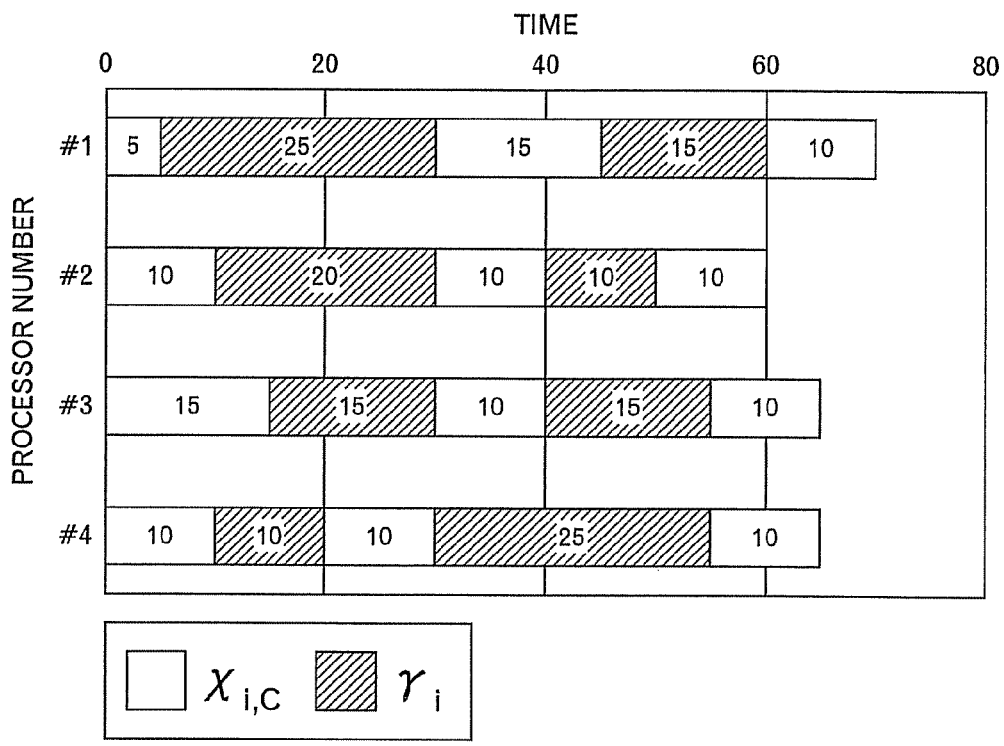
FIG. 37 is a drawing showing an example of log data of a parallel processing system.
FIG. 38 is a drawing showing a measurement result of processing times in a first example.
FIG. 39 is a drawing showing a calculation result of parallel performance evaluation indexes in the first example.

For example, in order to improve processing performances of processing numbers 1 to 4 shown in FIG. 37, it is understood that it is proper to raise communication performance, or to improve CPU performance and communication performance in a form that the ratio of both the performances is kept. The parallel performance evaluation processor 27 constitutes a table as shown in FIG. 37 from, for example, data stored in the log data storage 30, and outputs it to the output device 110 such as the display device. Besides, a processing may be performed such that in the parallel performance impediment factors, one exhibiting a relatively high value in any processings is highlighted. Besides, in order to improve the performance of processing 5, it is understood that not performance improvement by replacement of the system, but tuning of the application program is required. This is because only in the processing 5, the parallel performance impediment factor contribution ratio by the redundancy processing exhibits a large value, and the parallel performance evaluation processor 27 may extract a characteristic processing as well, to carry out a highlight display, for example.

As a method for determining the communication performance, it is appropriate that for example, the processing as described in the system replacement data processing is executed. That is, a magnification other than the magnification of the communication performance is fixed to 1, and the processing is executed until the target $E_p(4)$ is cleared.

Incidentally, if the communication performance is improved while attention is paid to patterns of the processing numbers 1 to 4 in which the number of processings is large, this system becomes a general-purpose parallel computer system. On the other hand, if a mechanism to reduce the redundancy processing is introduced into a computer system while attention is paid to the pattern of the processing number 5 in which the number of processings is small, it becomes a dedicated parallel computer system. Besides, if tuning of the application program of the processing number 5 is performed and the redundancy processing is reduced, the general-purpose parallel computer system of the processing numbers 1 to 5 is obtained by only improving the communication performance.

Conventionally, since the parallel performance of a parallel computer system is greatly changed according to the feature of parallel processing of an application program, it has not been easy to develop a parallel computer system. As a method for overcoming that, a method has been often used in which an application program is specified, a parallel performance is analyzed, and a parallel computer system suited for that is developed. However, in this method, if the application program is changed, there is a fear that a system, which cannot exhibit any parallel performance, is developed. According to this embodiment, since it becomes possible to prepare log data of parallel performance evaluation indexes of all processings in the practical use, if a certain specific processing is made a target on the basis of the log data, it becomes possible to prepare specifications (CPU performance, communication performance, I/O performance, performance of runtime library, etc.) necessary for a dedicated parallel computer system. Besides, if all processings are made targets, it becomes also possible to prepare specifications necessary for a general-purpose parallel computer system based on the log.

Besides, conventionally, whether or not means for quantitatively grasping the parallel performance impediment factors of the parallel computer system is incorporated, depends greatly on systems, and there is also a system which does not have any means for quantitatively grasping the parallel performance impediment factors. In this embodiment, as indicated by the expression (7), since it has a function to arbitrarily add a factor from a state where there is no parallel performance impediment factor, it is possible to raise evaluation accuracy by adding a factor measurement function at the time of upgrade of the system after selling.

Further, in conventional performance evaluation indexes, for example, flop/s, Mop/s, tpmc, etc., there is one, which can be applied, and one, which cannot be applied according to the kind of the application program. In this embodiment, since an index is expressed by a time ratio, it is effective for all application programs, and the performance evaluation can be suitably executed. Further, although some conventional parallel performance evaluation method can be applied to only a specific parallel processing, according to this embodiment, it can be applied to all parallel processings.

Although the embodiment of the invention has been described, by this, with respect to the parallel efficiency expressing the performance of the parallel processing, a ratio at which it is lowered can be expressed by the parallel performance evaluation indexes, that is, the load balance contribution ratio, the virtual parallelization ratio and the parallel performance impediment factor. The load balance contribution ratio is added to the parallel performance evaluation index, and it becomes possible to make a parallel performance evaluation of all parallel processings.

Besides, if the expression (8-2) is used, in the case where $R_p(p)$ is approximately 1, since the estimated value $\tau(1)$ is not necessary for the calculation of the parallel efficiency, it becomes possible to make an accurate (in the meaning that the estimated value $\tau(1)$ is not included) parallel performance evaluation for all parallel processings including the parallel processing by the grid or the cluster in which $\tau(1)$ can not be measured.

Further, if the expressions (9-1) and (9-2) are used, even in the case of $R_p(p)<1$, by estimating $\tau(1)$ for the calculation of the parallel efficiency, it becomes possible to make a parallel performance evaluation for all parallel processings including the parallel processing by the grid or the cluster in which $\tau(1)$ can not be measured.

The parallel processing impediment factor peculiar to the target parallel computer system can be introduced at any time in the form of the expression (7), and a detailed performance evaluation can be easily made. Further, the contribution ratio of the parallel performance impediment factor can be grasped by a percentage with respect to the parallel efficiency, and it becomes possible to make an intuitive parallel performance evaluation.

Besides, since the contribution of the load balance becomes clear by a numerical value as a ratio with respect to the parallel efficiency, the contribution of the load balance to the parallel efficiency, which has not been capable of being estimated until now, can be specifically indicated.

Besides, not only the parallel performance index is calculated and is exhibited, but also the number of processors performing efficient processing can be determined by using the parallel efficiency determined by the processing time measurement. Further, in view of the efficiency of parallel processing, it is possible to consider the increase or decrease of processors.

Further, it is possible to theoretically consider the introduction of a new parallel computer system different in performance specification. Besides, usage efficiency management in system operation can be made using the parallel performance evaluation index.

Although the embodiment of the invention has been described, the invention is not limited to this. For example, the functional block diagram of FIG. 19 is an example, and each functional block does not necessarily correspond to a program module. Besides, all of the processor number optimizer 21, the processor add-on estimation processor 22, the system replacement data processor 23, the operational efficiency data processor 24, the tuning processor 25, the algorithm selection processor 26, and the parallel performance evaluation processor 27 may not be provided, there is a case where all of them are provided, and there is also a case where none of them are provided. Further, there is also a case where they are provided in an arbitrary combination.

Calculation Example

The above-described embodiment can be applied to all parallel processings (a grid in a homo-structure in which memories, networks and CPU performances are the same, or a hetero-structure in which they are different from one another, a cluster or a distributed memory, or SMP (Symmetric MultiProcessing), SMP+ distributed memory, NUMA (NonUniform Memory Access), etc.). Hereinafter, calculation examples with respect to typical modes will be described.

(1) Grid in Homo-Structure, etc. ($\chi_{1,y}(1)=0$)

In the case where a processing is performed by a grid or a cluster, communication occurs since a network is used to assign a processing to each processor and to collect processing results, however, this does not occur when a processing is performed by one processor. Such a processing is a processing of $\chi_{1,y}(1)=0$. Here, it is assumed that a parallel performance impediment factor is only communication, and parallel performance of the processing of $\chi_{1,c}(1)=0$ is evaluated. For example, a description will be given of a case where a measurement result of elapsed time as shown in FIG. 38 is obtained.

Following calculations are carried out from the expression (3).

$$\tau_1(4)=5+25+15+15+10=70$$

$$\tau_2(4)=10+20+10+10+10=60$$

$$\tau_3(4)=15+15+10+15+10=65$$

$$\tau_4(4)=10+10+10+25+10=65$$

Following calculations are respectively carried out from the expressions (5), (6-1), (6-2) and (7).

$$R_b(4) = \frac{70+60+65+65}{70\times 4} = 0.9286$$

$$R_p(4) = \frac{40+30+30+35}{40+30+30+35} = 1.000$$

$$A_p(4) = \frac{1}{1-1} = \infty$$

$$R_C(4) = \frac{30+30+35+30}{260} = 0.4808$$

With respect to the parallel efficiency, following calculations are respectively carried out from the expressions (4-4), (4-5), (8-2), (9-1), and (9-2) in sequence.

$$E_p(4) = 0.9286 \times \frac{1}{1.000} \times (1 - 0.4808)$$
$$= 0.4821$$

$$E_p(4) = 0.9286 \times \frac{1}{1 - 1/\infty} \times (1 - 0.4808)$$
$$= 0.4821$$

$$E_p(4) = 0.9286 \times (1 - 0.4808)$$
$$= 0.4821$$

$$E_p(4) = 0.9286 \times \frac{1}{1.000} \times \frac{40 + 30 + 30 + 35}{70 + 60 + 65 + 65}$$
$$= 0.4822$$

$$E_p(4) = ((40 + 30 + 30 + 35) + 0)/(70 \times 4)$$
$$= 0.4821$$

The above calculated parallel performance evaluation indexes are collected as shown in FIG. 39. Since $A_p(p)=\infty$, the possibility of performance improvement is infinite when a parallel processing is performed by $p=\infty$ processors, however, an actual performance improvement $E_p(4) \cdot p$ at the time when a processor number $p=4$ is applied is 1.928. The reason is that the parallel efficiency $E_p(4)$ becomes 93% ($R_b(4)=0.9286$) by the load balance contribution ratio, and is further lowered by 48% ($Rc(4)=0.4808$) by communication.

(2) Grid in Homo-Structure, etc. ($\chi_{1,RED}(1) \neq 0$)

In numerical calculation, a parallel processing is often performed in the so-call data parallel in which an application program is copied to all processors, and indexes etc. of a loop processing are allocated, to respective processors to share the processing. In the data parallel, for example, a processing which can not be processed in parallel remains between loops. When this processing is performed by all processors, since the contents of the processing are the same, this is called a redundancy processing. The feature of the redundancy processing is that even in the case where a processing is not a parallel processing, $\chi_{1,RED}(1) \neq 0$ is always established for a necessary processing. Here, it is assumed that a parallel performance impediment factor is only a redundancy processing, and the parallel performance of a processing having $\chi_{1,RED}(1) \neq 0$ will be evaluated. For example, a description will be given of a case where a measurement result of elapsed time as shown in FIG. 40 is obtained.

Following calculations are carried out from the expression (3).

$$\tau_1(4) = 8 + 35 + 10 + 20 + 5 = 78$$

$$\tau_2(4) = 10 + 33 + 11 + 22 + 7 = 83$$

$$\tau_3(4) = 7 + 37 + 10 + 19 + 4 = 77$$

$$\tau_4(4) = 11 + 30 + 9 + 18 + 6 = 74$$

Following calculations are respectively carried out from the expression (5), (12-1), (6-1), (6-2) and (7).

$$R_b(4) = \frac{78 + 83 + 77 + 74}{83 \times 4}$$
$$= 0.9398$$

$$\chi_{1,RED}(1) = \frac{1}{4} \cdot (23 + 28 + 21 + 26)$$
$$= 24.5$$

$$R_p(4) = \frac{55 + 55 + 56 + 48}{(55 + 55 + 56 + 48) + 24.5}$$
$$= 0.8973$$

$$A_p(4) = \frac{1}{1 - 0.8973}$$
$$= 9.737$$

$$R_{RED}(4) = \frac{23 + 28 + 21 + 26}{78 + 83 + 77 + 74}$$
$$= 0.3141$$

With respect to the parallel efficiency, following calculations are respectively carried out from the expressions (4-4), (4-5), (9-1) and (9-2) in sequence.

$$E_p(4) = 0.9398 \times \frac{1}{0.8973} \times (1 - 0.3141)$$
$$= 0.7184$$

$$E_p(4) = 0.9398 \times \frac{1}{1 - 1/9.737} \times (1 - 0.3141)$$
$$= 0.7184$$

$$E_p(4) = 0.9398 \times \frac{1}{0.8973} \times \frac{55 + 55 + 56 + 48}{78 + 83 + 77 + 74}$$
$$= 0.7184$$

$$E_p(4) = ((55 + 55 + 56 + 48) + 24.5)/(83 \times 4)$$
$$= 0.7184$$

The above calculated parallel performance evaluation indexes are collected as shown in FIG. 41. Here, since $A_p(p)=9.737$, a parallel processing of $p>9$ is meaningless. An actual performance improvement $E_p \cdot p$ at the time when the number of processors, $p=4$, is applied is 2.874. The reason is that the parallel efficiency $E_p$ becomes 94% ($R_b(4)=0.9398$) by the load balance contribution ratio, and is further lowered by 31% ($R_{RED}(4)=0.3141$) by the redundancy processing.

(3) Grid in Homo-Structure, etc. ($\chi_{1,y}(1) \neq 0$: except redundancy Processing)

For example, a processing time of a communication library is constituted by a network communication and an operation. This operation time is treated as $\chi_{1,c}(1)$. Here, it is assumed that a parallel performance impediment factor is only communication, and the parallel performance of a processing of $\chi_{1,c}(1) \neq 0$ will be evaluated. For example, a description will be given of a case where a measurement result of elapsed time as shown in FIG. 42 is obtained.

Following calculations are carried out from the expression (3).

$$\tau_1(4) = 2 + 5 + 25 + 2 + 15 + 15 + 2 + 10 = 76$$

$$\tau_2(4) = 3 + 10 + 20 + 2 + 10 + 10 + 2 + 10 = 67$$

$$\tau_3(4) = 2 + 15 + 15 + 2 + 10 + 15 + 2 + 10 = 71$$

$$\tau_4(4) = 2 + 10 + 10 + 2 + 10 + 25 + 2 + 10 = 71$$

Following calculations are respectively carried out from the expression (5), (12-1), (6-1), (6-2) and (7).

$$R_b(4) = \frac{76 + 67 + 71 + 71}{76 \times 4}$$

-continued $$\chi_{1,C}(1) = \frac{1}{4} \cdot (6 + 7 + 6 + 6)$$

$$= 6.25$$

$$R_p(4) = \frac{40 + 30 + 30 + 35}{(40 + 30 + 30 + 35) + 6.25}$$

$$= 0.9557$$

$$A_p(4) = \frac{1}{1 - 0.9557}$$

$$= 22.6$$

$$R_C(4) = \frac{36 + 37 + 41 + 36}{285}$$

$$= 0.5263$$

With respect to the parallel efficiency, following calculations are respectively carried out from the expressions (4-4), (4-5), (9-1) and (9-2) in sequence.

$$E_p(4) = 0.9375 \times \frac{1}{0.9557} \times (1 - 0.5263)$$

$$= 0.4647$$

$$E_p(4) = 0.9375 \times \frac{1}{1 - 1/22.6} \times (1 - 0.5263)$$

$$= 0.4647$$

$$E_p(4) = 0.9375 \times \frac{1}{0.9557} \times \frac{40 + 30 + 30 + 35}{76 + 67 + 71 + 71}$$

$$= 0.4647$$

$$E_p(4) = ((40 + 30 + 30 + 35) + 6.25)/(76 \times 4)$$

$$= 0.4646$$

Figures 43, 44, 45:
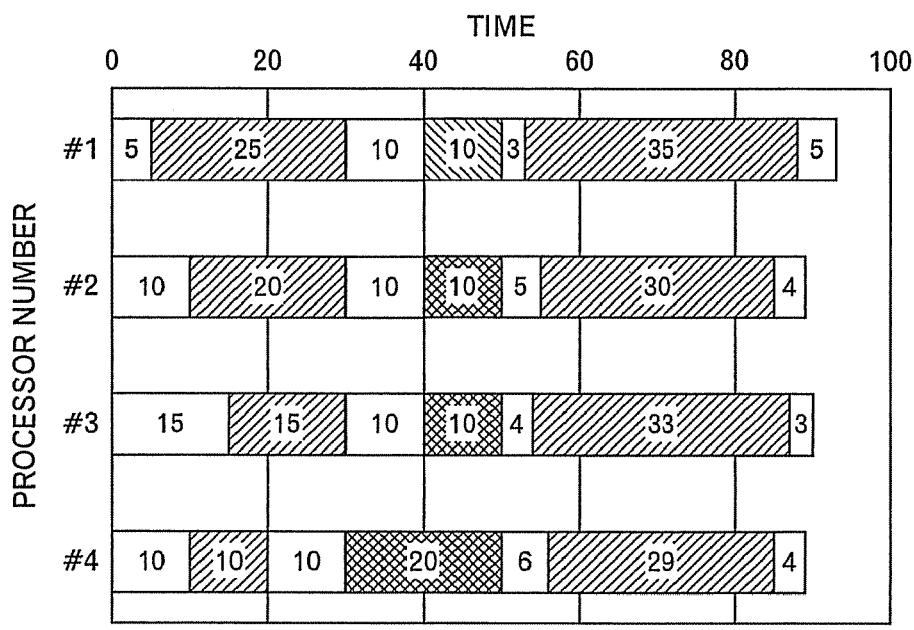
FIG. 43 is a drawing showing a calculation result of parallel performance evaluation indexes in the third example.
FIG. 44 is a drawing showing a measurement result of processing times in a fourth example.
FIG. 45 is a drawing showing a calculation result of parallel performance evaluation indexes in the fourth example.

The above calculated parallel performance evaluation indexes are collected as shown in FIG. 43. Here, since $A_p(p)=$ 22.57, a processing should be performed at p<22. An actual performance improvement $E_p \cdot p$ at the time when a processor number p=4 is applied is 1.859. The reason is that the parallel efficiency $E_p$ is lowered by 53% ($R_c$=0.5263) by communication. The load balance contribution ratio is 94% ($R_b(4)$= 0.9375), and the load balance is not a main factor to impede the parallel performance of this case. This is different from the example (1) in that $A_p(p)$ comes to have a finite value because of $\omega_{1,c} \neq 0$.

There is a case where an operation included in the communication processing is changed with the increase of processors. When this is regarded as $\chi_{i,c}(p)$ and is taken in the parallel performance evaluation, it becomes possible to integrate the number of operations, which varies according to the number of processors, into evaluation.

(4) Grid in Homo-Structure, etc. (in a Case where there is an Idling: also Called Wait)

In the case where a specific processor performs a processing, and other processors use the result, the other processors cannot start a next processing until the processing is ended. For example, this applies to a case where only the specific processor can access a database (DB) In FIG. 44, a processor #1 performs this processing ($\gamma'$). The other processors are in waiting states during the DB processing. It is possible to evaluate the parallel performance in the case where there is an idling processing while a CPU is made to wait as stated above. It is assumed that the measurement result of elapsed time as shown in FIG. 44 is obtained.

Following calculations are carried out from the expression (3).

$$\tau_1(4)=5+25+10+10+3+35+5=93$$

$$\tau_2(4)=10+20+10+10+5+30+4=89$$

$$\tau_3(4)=15+15+10+10+4+33+3=90$$

$$\tau_4(4)=10+10+10+20+6+29+4=89$$

Following calculations are respectively carried out from the expressions (5), (12-1), (6-1), (6-2) and (7).

$$R_b(4) = \frac{93 + 89 + 90 + 89}{93 \times 4}$$

$$= 0.9704$$

$$R_p(4) = \frac{80 + 50 + 48 + 39}{80 + 50 + 48 + 39}$$

$$= 1.000$$

$$A_p(4) = \frac{1}{1 - 1}$$

$$= \infty$$

$$R_C(4) = \frac{23 + 29 + 32 + 30}{361}$$

$$= 0.3158$$

$$R_W(4) = \frac{0 + 10 + 10 + 20}{361}$$

$$= 0.1108$$

With respect to the parallel efficiency, following calculations are respectively carried out from the expressions (4-4) (4-5), (8-2) (9-1) and (9-2) in sequence.

$$E_p(4) = 0.9704 \times \frac{1}{1.000} \times (1 - 0.3158 - 0.1108)$$

$$= 0.5564$$

$$E_p(4) = 0.9704 \times \frac{1}{1 - 1/\infty} \times (1 - 0.3158 - 0.1108)$$

$$= 0.5564$$

$$E_p(4) = 0.9704 \times (1 - 0.3158 - 0.1108)$$

$$= 0.5564$$

$$E_p(4) = 0.9704 \times \frac{1}{1.000} \times \frac{70 + 50 + 48 + 39}{361}$$

$$= 0.5564$$

$$E_p(4) = ((70 + 50 + 48 + 39) + 0)/(93 \times 4)$$

$$= 0.5565$$

The above calculated parallel performance evaluation indexes are collected as shown in FIG. 45. Since $A_p(4)=\infty$, the possibility of performance improvement at the time when the parallel processing is performed by p=∞ processors is infinite, however, an actual performance improvement $E_p \cdot p$ at the time when p=4 is applied is 2.226. The reason is that the parallel efficiency $E_p$ is lowered by 32% ($R_c(4)$=0.3158) by communication and is lowered by 11% ($R_w(4)$=0.1108) by idling. The load balance contribution ratio is 97% ($R_b(4)$= 0.97043), and the load balance is not a main factor to impede the parallel performance in this case.

(5) Grid in Homo-Structure, etc. (a Case where there is an Idling Since there is Another Processing)

Figures 46, 47:
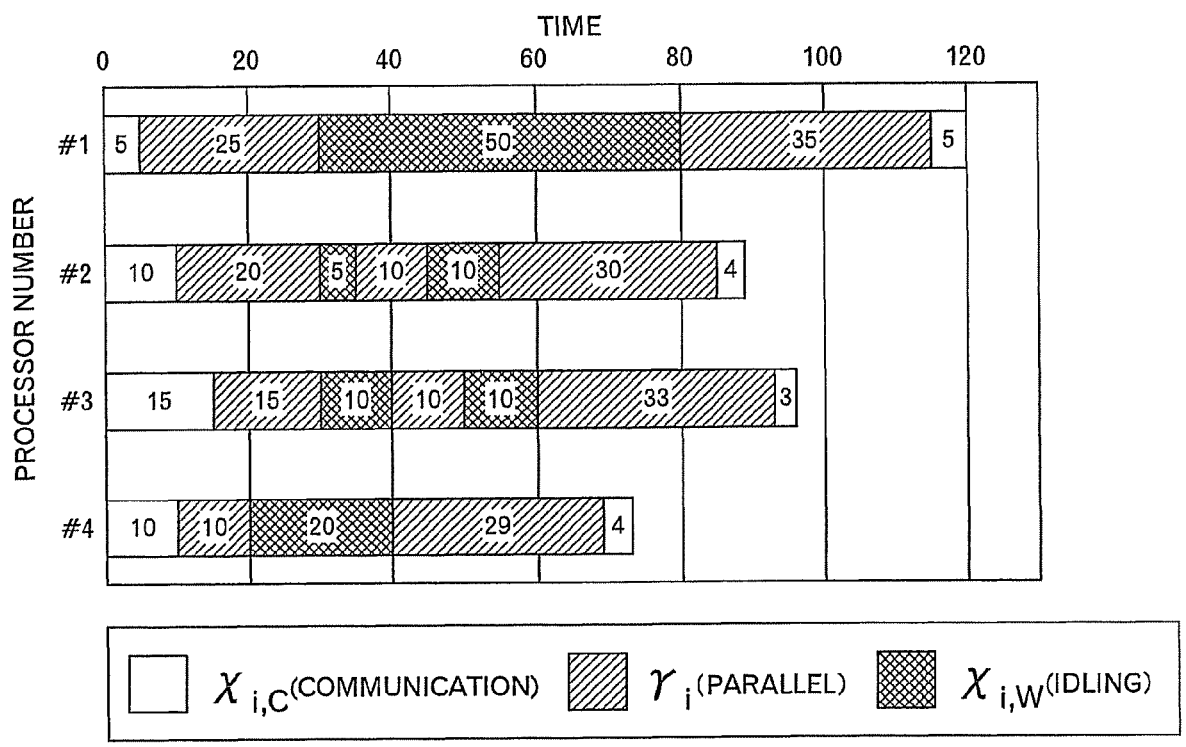
FIG. 46 is a drawing showing a measurement result of processing times in a fifth example.
FIG. 47 is a drawing showing a calculation result of parallel performance evaluation indexes in the fifth example.

In the case where a processing is performed in a grid or a cluster, each processor is seldom used only by its own processing, and in general, it coexists in plural processings. In that case, a waiting occurs by an interrupt of another processing. This is shown in FIG. 46. The parallel performance in the case where there is a waiting since another processing exists as stated above, will be evaluated. It is assumed that a measurement result of elapsed time as shown in FIG. 46 is obtained.

Following calculations are carried out from the expression (3).

$$\tau_1(4)=5+25+50+35+5=120$$

$$\tau_2(4)=10+20+5+10+10+30+4=89$$

$$\tau_3(4)=15+15+10+10+10+33+3=96$$

$$\tau_4(4)=10+10+20+29+4=73$$

Following calculations are respectively carried out from the expressions (5), (12-1), (6-1), (6-2) and (7).

$$R_b(4) = \frac{120+89+96+73}{120 \times 4}$$
$$= 0.7875$$

$$R_p(4) = \frac{60+60+58+39}{60+60+58+39}$$
$$= 1.000$$

$$A_p(4) = \frac{1}{1-1}$$
$$= \infty$$

$$R_C(4) = \frac{10+14+18+14}{378}$$
$$= 0.1481$$

$$R_W(4) = \frac{50+15+20+20}{378}$$
$$= 0.2778$$

With respect to the parallel efficiency, following calculations are respectively carried out from the expressions (4-4), (4-5), (8-2), (9-1) and (9-2) in sequence.

$$E_p(4) = 0.7875 \times \frac{1}{1.000} \times (1 - 0.1481 - 0.2778)$$

$$= 0.4521$$

$$E_p(4) = 0.7875 \times \frac{1}{1-1/\infty} \times (1 - 0.1418 - 0.2778)$$

$$= 0.4521$$

$$E_p(4) = 0.7875 \times (1 - 0.1418 - 0.2778)$$

$$= 0.4521$$

$$E_p(4) = 0.7875 \times \frac{1}{1.000} \times \frac{60+60+58+39}{378}$$

$$= 0.4521$$

$$E_p(4) = ((60+60+58+39)+0)/(120 \times 4)$$

$$= 0.4521$$

The above calculated parallel performance evaluation indexes are collected as shown in FIG. 47. Since $A_p(4)=\infty$, the possibility of performance improvement when the parallel processing is performed by $p=\infty$ processors is infinite, however, an actual performance improvement $E_p \cdot p$ at the time when p=4 is applied is 1.808. The reason is that the parallel efficiency $E_p$ becomes 79% ($R_b(4)=0.7875$) by the load balance contribution ratio, and is lowered by 28% ($R_w(4)=0.2778$) by the waiting of the time sharing, and is further lowered by 14% ($R_c=0.1418$) by the communication. Since $R_w(4)$ occurs by another processing, $R_b(4)$ becomes the load balance contribution ratio in which consideration is given to the whole system. In the case where another processing exists, it is necessary to pay attention to $R_b(4)$ and $R_w(4)$. Even if $R_b(4)=1$, if $R_w(4)$ is large, it means that a crowded system is used, and $E_p$ comes to have a low value. When the grid or the cluster processing is developed, by selecting the system so that $R_b(4)$ approaches 1 and $R_w$ becomes 0, it becomes possible to efficiently perform the parallel processing. Such is first understood by this embodiment.

Incidentally, as a method of distinguishing between a self-processing (target processing) and another processing (processing outside a target), there is a method in which a CPU time and an elapsed time are measured. In general, the CPU time is a time of only the self-processing, and the elapsed time is a time including the other processing. Accordingly, there is a case where the relation "waiting time for time sharing=elapsed time−CPU time" is established.

(6) Grid in Homo-Structure, etc. (Case of a Data Parallel Processing)

The data parallel processing is a parallel processing in which the procedures of the respective processors are identical and data are different, for example, data of 1000 items are divided into 250 items by four processors to perform processings. With respect to a processing which can not be processing in parallel, there is a case where data of all processors are made the same, that is, a redundancy processing is performed, and there is a case where the processing is performed by a certain processor, and a result is broadcasted to all processors. Here, the parallel performances of both will be evaluated.

[Data Parallel Processing Using Redundancy Processing]

Figures 48, 49:
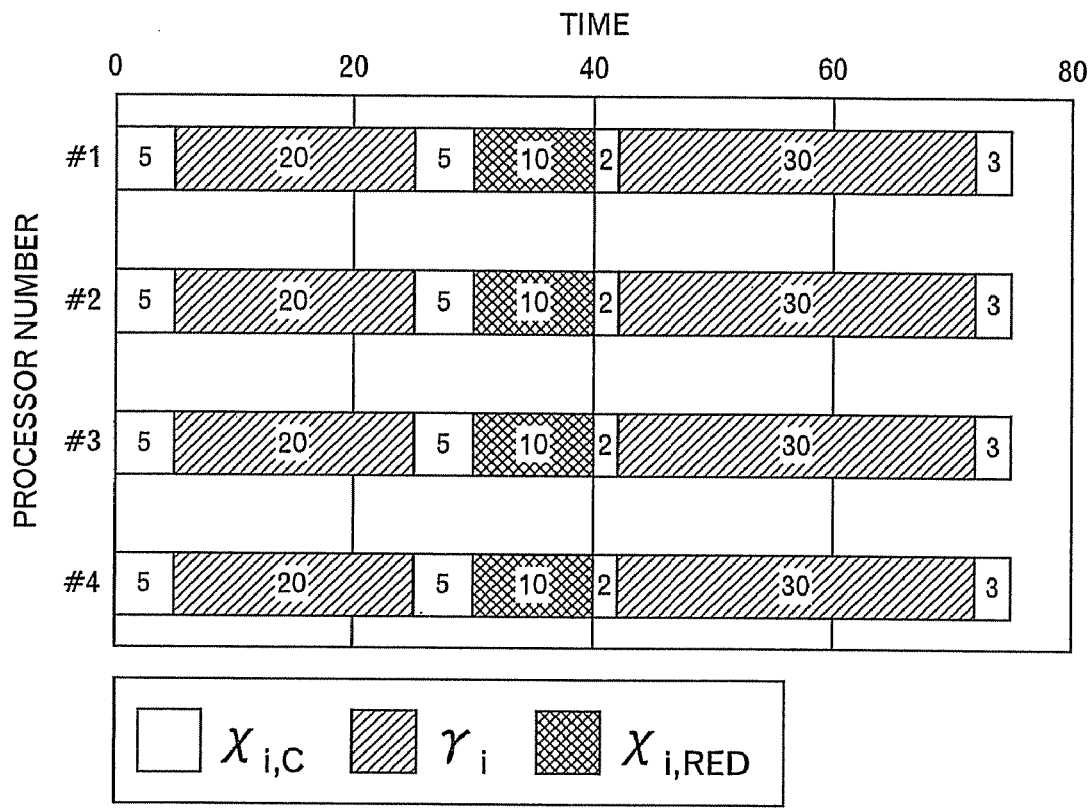
FIG. 48 is a drawing showing a measurement result of processing times in a sixth example (data parallel using redundancy processing)
FIG. 49 is a drawing showing a calculation result of parallel performance evaluation indexes in the sixth example (data parallel using redundancy processing)

It is assumed that a measurement result of elapsed time as shown in FIG. 48 is obtained. Besides, it is assumed that a processing time is $\chi_{1,c}=0$.

Following calculations are respectively carried out from the expressions (3), (5), (12-1), (6-1), (6-2) and (7).

$$\tau_1(4) = \tau_2(4) = \tau_3(4) = \tau_4(4) = 5+20+5+10+2+30+3 = 75$$

$$R_b(4) = \frac{75+75+75+75}{75 \times 4}$$
$$= 1.0000$$

$$\chi_{1,RED}(1) = \frac{1}{4} \cdot (10+10+10+10)$$
$$= 10.00$$

$$R_p(4) = \frac{50+50+50+50}{(50+50+50+50)+10}$$

-continued $$= 0.9524$$

$$A_p(4) = \frac{1}{1 - 0.9524}$$

$$= 21.01$$

$$R_{RED}(4) = \frac{10 + 10 + 10 + 10}{300}$$

$$= 0.1333$$

$$R_C(4) = \frac{15 + 15 + 15 + 15}{300}$$

$$= 0.2000$$

With respect to the parallel efficiency, following calculations are respectively carried out from the expressions (4-4), (4-5), (9-1), and (9-2) in sequence.

$$E_p(4) = 1.000 \times \frac{1}{0.9524} \times (1 - 0.1333 - 0.2000) = 0.7000$$

$$E_p(4) = 1.000 \times \frac{1}{1 - 1/21.01} \times (1 - 0.1333 - 0.2000) = 0.7000$$

$$E_p(4) = 1.000 \times \frac{1}{0.9524} \times \frac{50 + 50 + 50 + 50}{75 + 75 + 75 + 75} = 0.7000$$

$$E_p(4) = ((50 + 50 + 50 + 50) + 10)/(75 \times 4) = 0.7000$$

The above calculated parallel performance evaluation indexes are collected as shown in FIG. 49. Since $A_p(4)=21$, the number of processors should be selected within a range of $p \leqq 21$. An actual performance improvement $E_p \cdot p$ at the time when the number of processors, p=4, is applied is 2.800. The reason is that the parallel efficiency $E_p$ is lowered by 20% ($R_c=0.2000$) by communication and by 13% ($R_{RED}(4)=0.1333$) by redundancy processing.

[Data Parallel Processing in which a Portion, which can not be Processed in Parallel, is Processed by a Specific Processor]

Figures 50, 51:
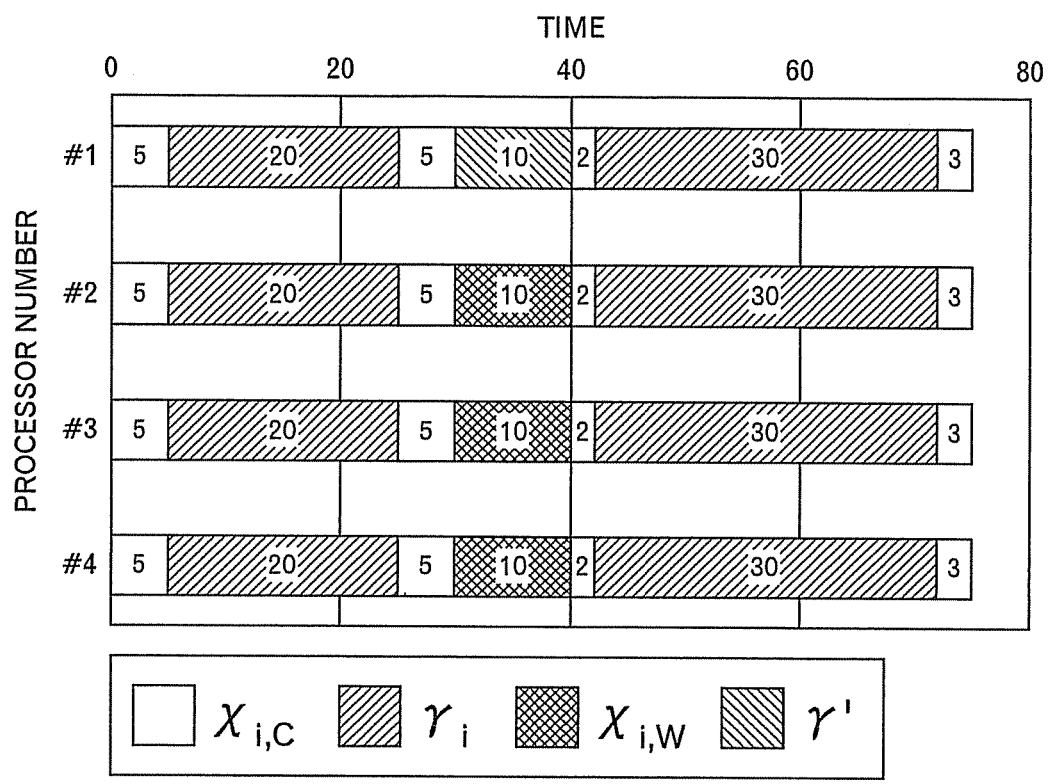
FIG. 50 is a drawing showing a measurement result of processing times in the sixth example (data parallel in which a portion which can not be processed in parallel is processed by a specific processor)
FIG. 51 is a drawing showing a calculation result of parallel performance evaluation indexes in the sixth example (data parallel in which the portion which can not be processed in parallel is processed by the specific processor)

There is a case where a portion, which can not be processed in parallel, is not redundancy-processed, but is processed by a specific processor. FIG. 50 shows a case where instead of the redundancy processing of FIG. 48, a processing for portion of γ' is performed by only the processor #1, and the result is broadcasted to the respective processors. Naturally, during that, the other processors wait for the result of the processor #1. Besides, here, although γ' is treated as a parallel processing, if it is added to the parallel processing impediment factor as a sequential processing, a more detailed parallel performance evaluation can be made. However, for that, it becomes necessary to judge whether the processing of γ' is a sequential processing or a parallel processing. It is assumed that a measurement result of elapsed time as shown in FIG. 50 is obtained. Besides, $\chi_{1,c}=0$ is assumed.

Following calculations are respectively carried out from the expressions (3), (5), (12-1), (6-1), (6-2) and (7).

$$\tau_1(4) = \tau_2(4) = \tau_3(4) = \tau_4(4) = 5 + 20 + 5 + 10 + 2 + 30 + 3 = 75$$

$$R_b(4) = \frac{75 + 75 + 75 + 75}{75 \times 4} = 1.0000$$

$$R_p(4) = \frac{50 + 50 + 50 + 50}{(50 + 50 + 50 + 50) + 0} = 1.000$$

$$A_p(4) = \frac{1}{1 - 1} = \infty$$

$$R_C(4) = \frac{15 + 15 + 15 + 15}{300} = 0.2000$$

$$R_W(4) = \frac{0 + 10 + 10 + 10}{300} = 0.1000$$

With respect to the parallel efficiency, following calculations are respectively carried out from the expressions (4-4), (4-5), (9-1) and (9-2) in sequence.

$$E_p(4) = 1.000 \times \frac{1}{1.000} \times (1 - 0.1000 - 0.2000) = 0.7000$$

$$E_p(4) = 1.000 \times \frac{1}{1 - 1/\infty} \times (1 - 0.1000 - 0.2000) = 0.7000$$

$$E_p(4) = 1.000 \times \frac{1}{1.000} \times \frac{60 + 50 + 50 + 50}{75 + 75 + 75 + 75} = 0.7000$$

$$E_p(4) = ((60 + 50 + 50 + 50) + 0)/(75 \times 4) = 0.7000$$

The above calculated parallel performance evaluation indexes are collected as shown in FIG. 51. Although the performance improvement at the time when the parallel processing is performed is infinite since $A_p(4)=\infty$, an actual performance improvement $E_p \cdot p$ at the time when p=4 is applied is 2.800. The reason is that the parallel efficiency $E_p$ is lowered by 20% ($R_c(4)=0.2000$) by communication, and by 10% ($R_w(4)=0.1000$) by waiting. Values of $R_p(4)$, $A_p(4)$, $R_{RED}(4)$, and $R_w$ are different between FIGS. 49 and 51. On the other hand, $R_b(4)$ and $E_p(4)$ become the same value. In FIG. 51, since the portion γ' which can not be processed in parallel is evaluated as the parallel processing, $R_p(4)=1$. Besides, the redundancy processings of the respective processors #2, 3, and 4 are changed to the waiting, and are substituted by the parallel performance impediment factor $R_w(4)$.

(7) Grid in Homo-Structure, etc. (Case of Control Parallel Processing)

Figures 52, 53:
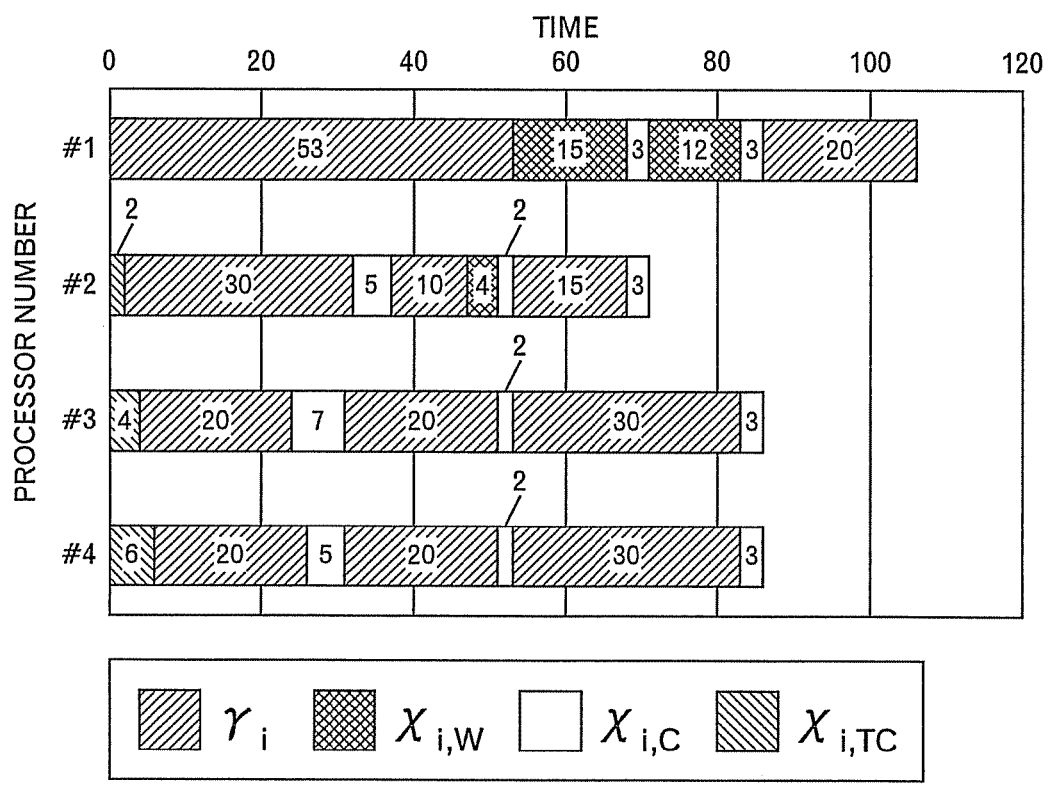
FIG. 52 is a drawing showing a measurement result of processing times in a seventh example.
FIG. 53 is a drawing showing a calculation result of parallel performance evaluation indexes in the seventh example.

In the control parallel processing, procedures of respective processors are normally different from each other. Thus, there often occurs a parallel processing in which procedure times of the respective processors are irregular. Here, the parallel performance of the control parallel will be evaluated. It is assumed that a measurement result of elapsed time as shown in FIG. 52 is obtained. Besides, $\chi_{1,c}=0$ is assumed.

Following calculations are carried out from the expression (3).

$$\tau_1(4)=53+15+3+12+3+20=106$$

$$\tau_2(4)=2+30+5+10+4+2+15+3=71$$

$$\tau_3(4)=4+20+7+20+2+30+3=86$$

$$\tau_4(4)=6+20+5+20+2+30+3=86$$

Following calculations are respectively carried out from the expressions (5), (6-1), (6-2), and (7).

$$R_b(4) = \frac{106 + 71 + 86 + 86}{106 \times 4} = 0.8231$$

$$R_p(4) = \frac{73 + 55 + 70 + 70}{73 + 55 + 70 + 70} = 1.000$$

$$A_p(4) = \frac{1}{1 - 1.000} = \infty$$

$$R_{TC}(4) = \frac{0+2+4+6}{349} = 0.0344$$

$$R_C(4) = \frac{6+10+12+10}{349} = 0.1089$$

$$R_W(4) = \frac{27+4+0+0}{349} = 0.0888$$

With respect to the parallel efficiency, following calculations are respectively carried out from the expressions (4-4), (4-5), (8-2) (9-1) and (9-2) in sequence.

$$E_p(4) = 0.8231 \times \frac{1}{1.000} \times (1 - 0.0344 - 0.1089 - 0.0888) = 0.6321$$

$$E_p(4) = 0.8231 \times \frac{1}{1-1/\infty} \times (1 - 0.0344 - 0.1089 - 0.0888) = 0.6321$$

$$E_p(4) = 0.8231 \times (1 - 0.0344 - 0.1089 - 0.0888) = 0.6321$$

$$E_p(4) = 0.8231 \times \frac{1}{1.000} \times \frac{73+55+70+70}{106+71+86+86} = 0.6321$$

$$E_p(4) = ((73+55+70+70) + 0) / (106 \times 4) = 0.6321$$

The above computed parallel performance evaluation indexes are collected as shown in FIG. 53. Although the performance improvement at the time when the parallel processing is performed is infinite since $A_p(4)=\infty$, an actual performance improvement $E_p \cdot p$ at the time when p=4 is applied is 2.528. The reason is that the parallel efficiency $E_p$ becomes 82% ($R_b(4)=0.8231$) by the load balance contribution ratio, and is further lowered by 23% ($R_{TC}(4)+R_c(4)+R_w(4)=0.0344+0.1089+0.0888$) in total by task generation, communication and waiting.

In order to improve the parallel performance, the parallel performance indexes are compared, and room for improvement is considered in descending order of influence on the lowering of the parallel performance. In the case of FIG. 53, this becomes order of $R_b(4)$, $R_c(4)$, $R_w(4)$, and $R_{TC}(4)$. If $R_b(4)=1$, then $E_p(4) \cdot p=3.071$ (=2.528/0.8231). Thus, for example, an attempt is made to change a processing schedule so that the processing time of the processor #1 becomes the same as that of another processor. Next room for improvement is a reduction of $R_c(4)$. As a reduction method, for example, it is conceivable to make a replacement by such hardware as to double the communication performance. In that case, calculations as set forth below are carried out.

First, following calculations are carried out from the expression (3).

$$\tau_1(4)=53+15+3/2+12+3/2+20=103$$

$$\tau_2(4)=2+30+5/2+10+4+2/2+15+3/2=66$$

$$\tau_3(4)=4+20+7/2+20+2/2+30+3/2=80$$

$$\tau_4(4)=6+20+5/2+20+2/2+30+3/2=81$$

Following calculations are respectively carried out from the expressions (5), (6-1), (6-2) and (7).

$$R_b(4) = \frac{103+66+80+81}{103 \times 4} = 0.8010$$

$$R_p(4) = \frac{73+55+70+70}{73+55+70+70} = 1.000$$

$$A_p(4) = \frac{1}{1-1.000} = \infty$$

$$R_{TC}(4) = \frac{0+2+4+6}{330} = 0.0364$$

$$R_C(4) = \frac{(6+10+12+10)/2}{330} = 0.0576$$

$$R_W(4) = \frac{27+4+0+0}{330} = 0.0939$$

With respect to the parallel efficiency, a following calculation is carried out from the expression (4-4).

$$E_p(4) = 0.8010 \times \frac{1}{1.000} \times (1 - 0.0364 - 0.0576 - 0.0939) = 0.6505$$

Further, a following calculation is also carried out.

$$E_p(4) \cdot p = 0.8010 \times \frac{1}{1.000} \times (1 - 0.0364 - 0.0576 - 0.0939) \cdot 4$$
$$= 0.6505 \cdot 4$$
$$= 2.602$$

If the performance of communication is improved as described above, and the load balance is changed to $R_b(4)=1$, a following calculation is carried out.

$$E_p(4) \cdot p = 1 \times \frac{1}{1.000} \times (1 - 0.0364 - 0.0576 - 0.0939) \cdot 4$$
$$= 0.8121 \cdot 4$$
$$= 3.248$$

As described in "E. tuning processing", in this embodiment, it is possible to predict the parallel performance at the time when the respective parallel performance impediment factors are tuned and improved. In conventional tuning, since a target value is made a processing time, there is a case where an impossible target value is set. On the other hand, in this embodiment, a reasonable target setting becomes possible by using $E_p$. Further, in this embodiment, since the parallel efficiency and the like can be calculated by one measurement result, it is possible to shorten a performance evaluation time at the tuning. Further, in the conventional tuning, when input data or a processing function is changed, the processing times measured up to that time with respect to the respective parallel performance impediment factors can not be used for the performance evaluation. Accordingly, independent parallel performance evaluation has been performed for respective input data or processing functions. In this embodiment, all of the performance evaluation indexes have the form of the ratio, and the parallel performances for different input data or processing functions can be compared.

(8) Grid in Homo-Structure, etc. (a Case Where a Master-Slave Processing is Performed in Control Parallel)

Figures 54, 55:
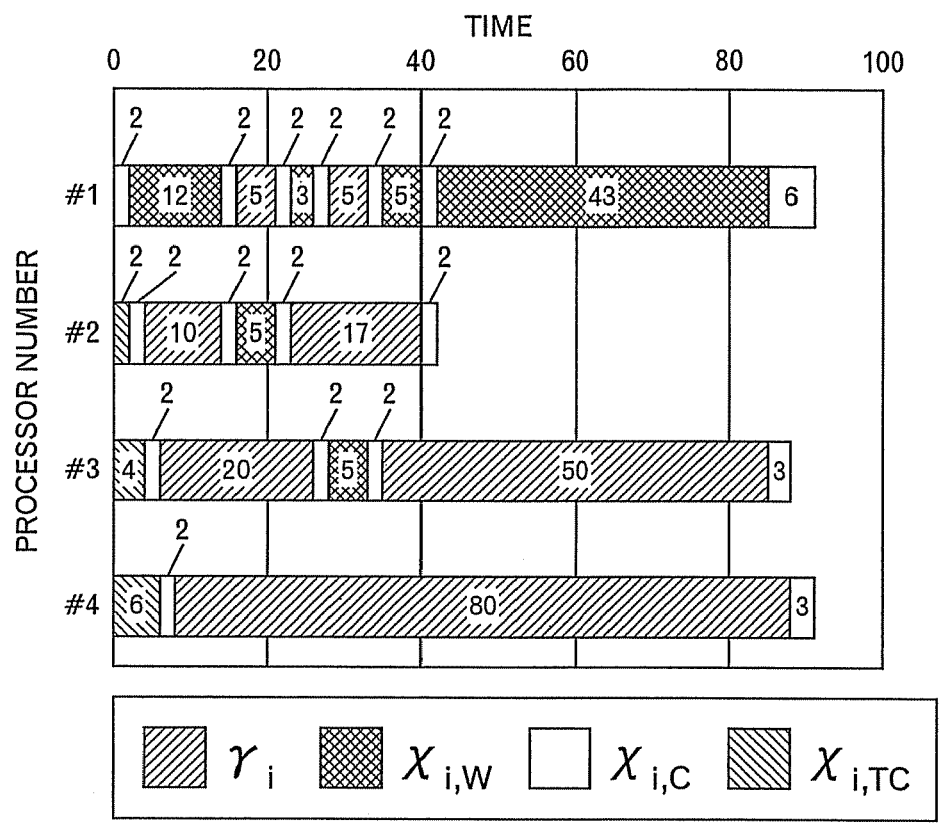
FIG. 54 is a drawing showing a measurement result of processing times in an eighth example.
FIG. 55 is a drawing showing a calculation result of parallel performance evaluation indexes in the eighth example.

In the control parallel processing, procedures of the respective processors are normally different from each other. In the case of a master-slave processing, one processor becomes a master to control other processors, and plural processors execute processings in accordance with its instructions. Here, parallel performance in the case where the processor #1 is the master processor will be evaluated. It is assumed that a measurement result of elapsed time as shown in FIG. 54 is obtained. Besides, $\chi_{1,c}=0$ is assumed.

Following calculations are carried out from the expression (3).

$$\tau_1(4)=2+12+2+5+2+3+2+5+2+5+2+43+6=91$$

$$\tau_2(4)=2+2+10+2+5+2+17+2=42$$

$$\tau_3(4)=4+2+20+2+5+2+50+3=88$$

$$\tau_4(4)=6+2+80+3=91$$

Following calculations are respectively carried out from the expressions (5), (6-1), (6-2) and (7).

$$R_b(4) = \frac{91+42+88+91}{91 \times 4} = 0.8571$$

$$R_p(4) = \frac{10+27+70+80}{10+27+70+80} = 1.000$$

$$A_p(4) = \frac{1}{1-1.000} = \infty$$

$$R_{TC}(4) = \frac{0+2+4+6}{312} = 0.0385$$

$$R_C(4) = \frac{18+8+9+5}{312} = 0.1282$$

$$R_W(4) = \frac{63+5+5+0}{312} = 0.2340$$

With respect to the parallel efficiency, following calculations are respectively carried out from the expressions (4-4), (4-5), (8-2) (9-1) and (9-2) in sequence.

$$E_p(4) = 0.8571 \times \frac{1}{1.000} \times (1-0.0385-0.1282-0.2340) = 0.5137$$

$$E_p(4) = 0.8571 \times \frac{1}{1-1/\infty} \times (1-0.0385-0.1282-0.2340) = 0.5137$$

$$E_p(4) = 0.8571 \times (1-0.0385-0.1282-0.2240) = 0.5137$$

$$E_p(4) = 0.8571 \times \frac{1}{1.000} \times \frac{10+27+70+80}{312} = 0.5137$$

$$E_p(4) = (10+27+70+80)+0)/(91\times 4) = 0.5137$$

The above calculated parallel performance evaluation indexes are collected as shown in FIG. 55. Since $A_p(4)=\infty$, the performance improvement at the time when the parallel processing is performed by $p=\infty$ processors is infinite, however, an actual performance improvement $E_p \cdot p$ at the time when $p=4$ is applied is 2.055. The reason is that the parallel efficiency $E_p$ becomes 86% ($R_b(4)=0.8571$) by the load balance contribution ratio, and is further lowered by 23% ($R_w(4)=0.2340$) by waiting, and by 17% ($R_{TC}(4)+R_c(4)=0.0385+0.1282$) in total by task generation and communication. In the case where the master-slave processing is performed, it is known that the waiting time of the master processor has an important influence on the whole processing. In this embodiment, the influence of the waiting on the performance is quantitatively grasped, and it is possible to judge whether the master-slave processing is effectively performed.

(9) Grid in Homo-Structure, etc. (Case of Mixture of Data Parallel and Control Parallel)

Figures 56, 57:
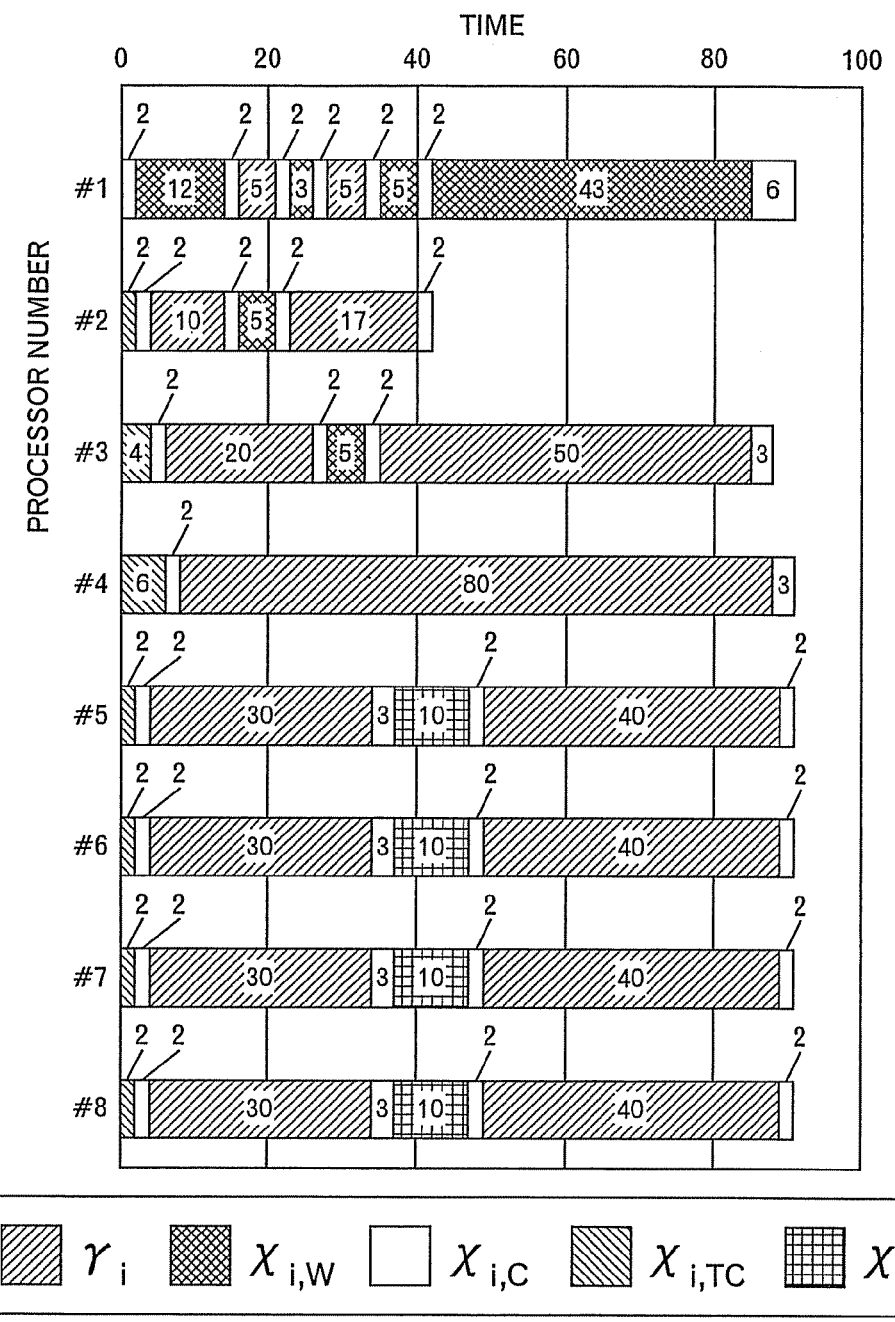
FIG. 56 is a drawing showing a measurement result of processing times in a ninth example.
FIG. 57 is a drawing showing a calculation result of parallel performance evaluation indexes in the ninth example.

As for a processing in which the data parallel and the control parallel are mixed, since it is difficult to make the load balance be kept, the processing is not used in normal operations. In this embodiment, it becomes possible to make a parallel performance evaluation in such a case as well. Since this embodiment provides the performance evaluation indexes for control of the processing, it provides a practical evaluation method for such a processing. Here, there is evaluated parallel performance in the case where processors #1 to #4 are operated in the control parallel, processors #5 to #8 are operated in the data parallel, and the processor #1 is made the master processor. It is assumed that a measurement result of elapsed time as shown in FIG. 56 is obtained. Besides, $\chi_{1,c}=0$ is assumed.

Following calculations are carried out from the expression (3).

$$\tau_1(8)=2+12+2+5+2+3+2+5+2+5+2+43+6=91$$

$$\tau_2(8)=2+2+10+2+5+2+17+2=42$$

$$\tau_3(8)=4+2+20+2+5+2+50+3=88$$

$$\tau_4(8)=6+2+80+3=91$$

$$\tau_5(8)=\tau_6(8)=\tau_7(8)=\tau_8(8)=2+2+30+3+10+2+40+2=91$$

Following calculations are respectively carried out from the expressions (5), (12-1), (6-1), (6-2) and (7).

$$R_b(8) = \frac{91+42+88+91+91+91+91+91}{91\times 8} = \frac{676}{728} = 0.9286$$

$$\chi_{1,RED}(1) = \frac{1}{4}\cdot(10+10+10+10) = 10$$

$$R_p(8) = \frac{10+27+70+80+70+70+70+70}{(10+27+70+80+70+70+70+70)+10} = \frac{467}{477} = 0.9790$$

$$A_p(8) = \frac{1}{1-0.9790} = 47.62$$

$$R_{RED}(8) = \frac{0+0+0+0+10+10+10+10}{676} = 0.0592$$

$$R_{TC}(8) = \frac{0+2+4+6+2+2+2+2}{676} = 0.0296$$

$$R_C(8) = \frac{18+8+9+5+9+9+9+9}{676} = 0.1124$$

$$R_W(8) = \frac{63+5+5+0+0+0+0+0}{676} = 0.1080$$

With respect to the parallel efficiency, following calculations are respectively carried out from the expressions (4-4), (4-5), (8-2), (9-1) and (9-2) in sequence.

$$E_p(8) = $$
$$0.9286 \times \frac{1}{0.9790} \times (1-0.0592-0.0296-0.1124-0.1080) = 0.6552$$

$$E_p(8) = 0.9286 \times \frac{1}{1-1/47.62} \times (1-0.0592-0.0296-0.1124-0.1080)$$
$$= 0.6552$$

$$E_p(8) = 0.9286 \times (1-0.0592-0.0296-0.1124-0.1080) = 0.6552$$

$$E_p(8) = 0.9286 \times \frac{1}{0.9790} \times \frac{467}{676} = 0.6553$$

$$E_p(8) = (467+10)/(91\times 8) = 0.6552$$

The above calculated parallel performance evaluation indexes are collected as shown in FIG. 57. Since $A_p(8)=47.62$, the parallel processing should be performed at $p<47$. An actual performance improvement $E_p \cdot p$ at the time when the number of processors, $p=8$, is applied is 5.242. The reason is that the parallel efficiency Ep becomes 93% ($R_b(8)$= 0.9286) by the load balance contribution ratio, and is further lowered by 11% ($R_w(8)$=0.1080) by waiting, by 11% ($R_c(8)$= 0.1124) by communication, and by 9% ($R_{RED}(8)$+$R_{TC}(8)$= 0.0592+0.0296) in total by redundancy processing and task creation. As stated above, this embodiment can be applied to the parallel processing system of the mixture of the data parallel and the control parallel.

(10) Case where there is a Redundancy Processing in Hetero-Structure of Grid etc. ($\chi_{1,RED} \neq 0$)

Figures 58, 59:
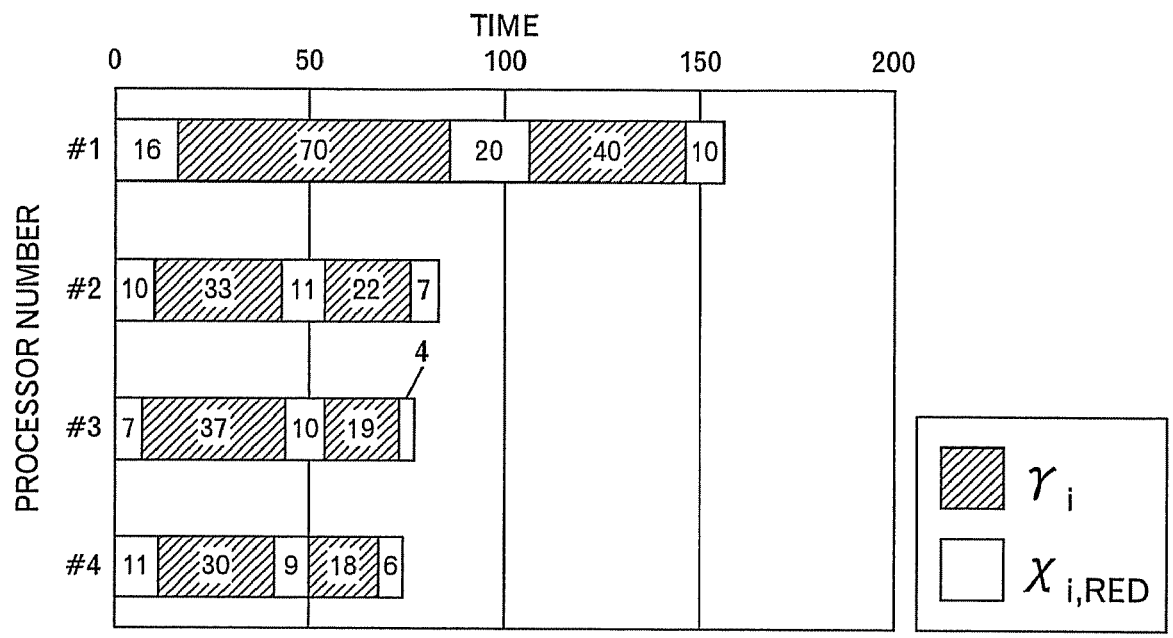
FIG. 58 is a drawing showing a measurement result of processing times in a tenth example.
FIG. 59 is a drawing showing a calculation result of parallel performance evaluation indexes in the tenth parallel example.

In many cases, processors connected through the grid or the cluster are different in CPU capability. This is called a hetero-structure. This embodiment can also be applied to the case of the hetero-structure. Here, in example (2), the parallel performance in the case where the processor #1 has half performance will be evaluated. It is assumed that a measurement result of elapsed time as shown in FIG. 58 is obtained.

Following calculations are carried out from the expression (3).

$$\tau_1(4)=16+70+20+40+10=156$$

$$\tau_2(4)=10+33+11+22+7=83$$

$$\tau_3(4)=7+37+10+19+4=77$$

$$\tau_4(4)=11+30+9+18+6=74$$

Following calculations are respectively carried out from the expressions (5), (12-1), (6-1), (6-2) and (7).

$$R_b(4) = \frac{156+83+77+74}{156 \times 4} = \frac{390}{624} = 0.6250$$

$$\chi_{1,RED}(1) = \frac{1}{4} \cdot (46+28+21+26) = 30.25$$

$$R_p(4) = \frac{110+55+56+48}{(110+55+56+48)+30.25} = \frac{269}{299.3} = 0.8988$$

$$A_p(4) = \frac{1}{1-0.8988} = 9.881$$

$$R_{RED}(4) = \frac{46+28+21+26}{156+83+77+74} = \frac{121}{390} = 0.3103$$

With respect to the parallel efficiency, following calculations are carried out from the expressions (4-4), (4-5), (9-1) and (9-2) in sequence.

$$E_p(4) = 0.6250 \times \frac{1}{0.8988} \times (1-0.3103) = 0.4796$$

$$E_p(4) = 0.6250 \times \frac{1}{1-1/9.881} \times (1-0.3103) = 0.4796$$

$$E_p(4) = 0.6250 \times \frac{1}{0.8988} \times \frac{269}{390} = 0.4796$$

$$E_p(4) = (269+30.25)/(156 \times 4) = 0.4796$$

The above calculated parallel performance evaluation indexes are collected as shown in FIG. 59. Since $A_p(4)$= 9.881, a parallel processing at p>9 is meaningless. An actual performance improvement $E_p \cdot p$ at the time when the number of processors, p=4, are applied is 1.918. The reason is that the parallel efficiency $E_p$ becomes 63% ($R_b(4)$=0.6250) by the load balance contribution ratio, and is further lowered by 31% ($R_{RED}(4)$=0.3103) by redundancy processing. As compared with FIG. 41, it is understood that the load balance contribution ratio $R_b(4)$ is lowered from 0.9398 to 0.6250. The difference of the processor #1 as shown in FIG. 41 and FIG. 59 is reflected in the performance evaluation index $R_b(4)$ and this result is caused. In general, when equally divided tasks are processed by processors different in CPU capability, the load balance is lost. In this embodiment, this can be detected by $R_b(4)$.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A parallel efficiency calculation method for calculating a parallel efficiency of a parallel computer system, comprising:
    measuring, by the parallel computer system, for each processor i of p processors included in the parallel computer system, a processing time $y_i(p)$ of parallel calculation portions executed in the processor i, and processing times $x_{i,j}(p)$ of respective parallel performance impediment factors j, each of which is a factor corresponding to an impediment to a parallel performance;
    obtaining, by a computer connected with the parallel computer system, the processing time $y_i(p)$ and the processing times $x_{i,j}(p)$ from the parallel computer system;
    calculating, by the computer, a load balance contribution ratio $Rb(p)$ by dividing a first total sum, with respect to the p processors and the respective parallel performance impediment factors j, of the proceccing time $y_i(p)$ and the processing times $x_{i,j}(p)$ by a product of p and a maximum value of sums, with respect to each the processor i, of the processing time $y_i(p)$ and th processing times $x_{i,j}(p)$;
    calculating, by the computer, for each parallel performance impediment factor j, a parallel performance impediment factor contribution ratio $Rj(p)$ representing a ratio of a sum of the processing times $x_{i,j}(p)$ of the parallel performance impediment factor j with respect to the p processors to the first total sum; and
    calculating, by the computer, a parallel efficiency $Ep(p)$ by $$E_P(p) = R_b(p) \cdot \left(1 - \sum_{j=1}^{jOthers} R_j(p)\right).$$

2. The parallel efficiency calculation method as set forth in claim 1, wherein said processing time is represented by a number of sampling times.

3. The parallel efficiency calculation method as set forth in claim 1, further comprising calculating, by the computer, an auxiliary index by multiplying the calculated parallel efficiency by p.

4. The parallel efficiency calculation method as set forth in claim 1, further comprising:
    setting, by the computer, a target parallel efficiency; and
    calculating, by the computer, an optimum number of processors by dividing a product of the calculated parallel efficiency and p by said target parallel efficiency.

5. The parallel efficiency calculation method as set forth in claim 1, further comprising:
    setting, by the computer, a working time representing a period that each processor operates, and a predicted parallel efficiency when system expansion is planned for the parallel computer system; and calculating, by the computer, an acceleration ratio in case of said system expansion by dividing a sum of a second total sum, with respect to all processing, of products of the calculated parallel efficiency and the first total sum, and a product of the predicted parallel efficiency and a third total sum of working times with respect to processors added to the parallel computer system for the system expansion by a fourth total sum of working times with respect to the p processors.

6. The parallel efficiency calculation method as set forth in claim 1, further comprising:
   setting, by the computer, a ratio of a performance of a new parallel computer system to be introduced as a substitute for said parallel computer system to a performance of the parallel computer system; and
   calculating, by the computer, an estimated parallel efficiency by using said ratio.

7. The parallel efficiency calculation method as set forth in claim 1, further comprising calculating, by using the computer, a system operational efficiency by dividing a fifth total sum, with respect to all processing, of products of the calculated parallel efficiency and the first total sum by a sixth total sum, with respect to the p processors, of working times, each of which represents a period that each processor operates.

8. The parallel efficiency calculation method as set forth in claim 1, further comprising:
   setting, by the computer, a target processing time;
   calculating, by the computer, a target parallel efficiency by using said target processing time; and
   confirming, by the computer, propriety of said target parallel efficiency.

9. The parallel efficiency calculation method as set forth in claim 8, further comprising:
   calculating, by using the computer, in a case where said propriety of said target parallel efficiency is confirmed, a parallel efficiency after execution of tuning; and
   comparing, by the computer, said parallel efficiency after said execution of said tuning with said target parallel efficiency.

10. The parallel efficiency calculation method as set forth in claim 1, further comprising:
    setting, by the computer, a target processing time;
    calculating, by the computer, an estimated value of the number of required processors for each of a plurality of algorithms used in a parallel program executed in the parallel computer system by using parallel efficiencies for the plurality of algorithms; and
    extracting, by the computer, an algorithm in which said estimated value of said number of required processors is less than a value representing an ideal upper limit value of parallel performance when infinite processors execute the parallel program by the algorithm of the plurality of algorithms and becomes a minimum value among estimated values calculated for the plurality of algorithms.

11. A computer-readable storage medium storing thereon a program which, when executed by a computer system, causes the computer system to execute a procedure to calculate a parallel efficiency of a parallel computer system, said procedure comprising:
    causing the parallel computer system to measure for each processor i of p processors included in the parallel computer system, a processing time $y_i(p)$ of parallel calculation portions executed in the processor i, and processing times $x_{i,j}(p)$ of respective parallel performance impediment factors j, each of which is a factor corresponding to an impediment to a parallel performance;
    causing a computer connected with the parallel computer system to obtain the processing time $y_i(p)$ and the processing times $x_{i,j}(p)$ from the parallel computer system;
    causing the computer to calculate a load balance contribution ratio $Rb(p)$ by dividing a first total sum, with respect to the p processors and the respective parallel performance impediment factors j, of the processing time $y_i(p)$ and the processing times $x_{i,j}(p)$ by a product of p and a maximum value of sums, with respect to each the processor i of the processing time $y_i(p)$ and the processing times $x_{i,j}(p)$;
    causing the computer to calculate, for each parallel performance impediment factor j, a parallel performance impediment factor contribution ratio $Rj(p)$ representing a ratio of a sum of the processing times $x_{i,j}(p)$ of the parallel performance impediment factor j with respect to the p processors to the first total sum; and
    causing the computer to calculate, by the computer, a parallel efficiency $Ep(p)$ by $$E_P(p) = R_b(p) \cdot \left(1 - \sum_{j=1}^{jOthers} R_j(p)\right).$$

12. A computer system comprising:
    a parallel computer system including p processors; and
    a computer connected with the parallel computer system,
    wherein the parallel computer system measures, for each processor i of the p processors, a processing time $y_i(p)$ of parallel calculation portions executed in the processor i, and processing times $x_{i,j}(p)$ of respective parallel performance impediment factors j, each of which is a factor corresponding to an impediment to a parallel performance,
    wherein the computer comprises:
      a storage device;
      a unit to obtain and store into the storage device, the processing time $y_i(p)$ and the processing times $x_{i,j}(p)$ from the parallel computer system;
      a first calculation unit to calculate a load balance contribution ratio $Rb(p)$ by dividing a first total sum, with respect to the p processors and the respective parallel performance impediment factors j, of the processing time $y_i(p)$ and the processing times $x_{i,j}(p)$ by a product of p and a maximum value of sums, with respect to each the processor i, of the processing time $y_i(p)$ and the processing times $x_{i,j}(p)$;
      a second calculation unit to calculate, for each parallel performance impediment factor j, a parallel performance impediment factor contribution ratio $Rj(p)$ representing a ratio of a sum of the processing times $x_{i,j}(p)$ of the parallel performance imediment factor j with respect to the p processors to the first total sum; and
      a third calculation unit to calculate a parallel efficiency $Ep(p)$ by $$E_P(p) = R_b(p) \cdot \left(1 - \sum_{j=1}^{jOthers} R_j(p)\right).$$

* * * * *

UNITED STATES PATENT AND TRADEMARK OFFICE
CERTIFICATE OF CORRECTION

PATENT NO. : 8,255,442 B2
APPLICATION NO. : 12/508760
DATED : August 28, 2012
INVENTOR(S) : Shigeo Orii Page 1 of 1

It is certified that error appears in the above-identified patent and that said Letters Patent is hereby corrected as shown below:

Column 64, Line 31, In Claim 1, delete "proceccing" and insert -- processing --, therefor.
Column 64, Line 34, In Claim 1, delete "th" and insert -- the --, therefor.
Column 66, Line 53, In Claim 12, delete "imediment" and insert -- impediment --, therefor.

Signed and Sealed this
Twentieth Day of November, 2012

David J. Kappos
*Director of the United States Patent and Trademark Office*